(12) United States Patent
Hayashi

(10) Patent No.: US 8,179,576 B2
(45) Date of Patent: May 15, 2012

(54) IMAGE PROCESSING APPARATUS

(75) Inventor: Koji Hayashi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 769 days.

(21) Appl. No.: 12/275,625

(22) Filed: Nov. 21, 2008

(65) Prior Publication Data

US 2009/0141295 A1    Jun. 4, 2009

(30) Foreign Application Priority Data

Nov. 29, 2007   (JP) ................................ 2007-309343

(51) Int. Cl.
   *G03F 3/08*  (2006.01)
   *H04N 1/60*  (2006.01)
   *G06K 9/00*  (2006.01)

(52) U.S. Cl. .......... 358/520; 358/521; 358/1.9; 382/167

(58) Field of Classification Search .................. 358/1.9, 358/520, 518, 521, 530, 3.23, 1.16, 3, 27; 382/162, 167, 165, 274, 305
See application file for complete search history.

(56) References Cited

U.S. PATENT DOCUMENTS

| | | | | |
|---|---|---|---|---|
| 6,055,071 A * | 4/2000 | Kuwata et al. | ............... | 358/501 |
| 6,268,867 B1 * | 7/2001 | Sato et al. | ..................... | 345/589 |
| 6,330,076 B1 * | 12/2001 | Imaizumi et al. | ............... | 358/1.9 |
| 6,721,066 B2 * | 4/2004 | Hirota et al. | ................... | 358/1.9 |
| 6,992,796 B1 * | 1/2006 | Taka et al. | ...................... | 358/1.9 |
| 7,133,154 B2 * | 11/2006 | Sugiyama | ........................ | 358/1.9 |
| 7,525,688 B2 * | 4/2009 | Matsushima | .................... | 358/1.9 |
| 2003/0053689 A1 * | 3/2003 | Watanabe et al. | ............. | 382/167 |
| 2003/0099397 A1 * | 5/2003 | Matsugu et al. | .............. | 382/173 |
| 2005/0259286 A1 * | 11/2005 | Iwaki | .............................. | 358/1.9 |
| 2005/0270584 A1 * | 12/2005 | Trifonov et al. | ............. | 358/3.26 |
| 2006/0164700 A1 | 7/2006 | Hayashi | | |
| 2008/0309994 A1 * | 12/2008 | Komatsu | ........................ | 358/505 |
| 2009/0185205 A1 * | 7/2009 | Nakajima | ...................... | 358/1.9 |

FOREIGN PATENT DOCUMENTS

| | | |
|---|---|---|
| JP | 2006-238408 | 9/2006 |
| JP | 4115098 | 4/2008 |

* cited by examiner

*Primary Examiner* — Madelein A Nguyen
(74) *Attorney, Agent, or Firm* — Oblon, Spivak, McClelland, Maier & Neustadt, L.L.P.

(57) ABSTRACT

A color correction unit corrects a color of an image signal. A reference data storing unit stores reference data corresponding to patches in a reference chart. A correction parameter generating unit generates image processing parameters based on the reference data and values of the reference chart. An intermediate result storing unit stores intermediate calculation results calculated in a stepwise manner to obtain the image processing parameters. A determination information storing unit stores recalculation determination information for determining whether to recalculate the intermediate calculation results.

10 Claims, 47 Drawing Sheets

FIG. 8

| 0  | -1 | 0  |
|----|----|----|
| -1 | 4  | -1 |
| 0  | -1 | 0  |

FIG. 9A

| 1 | 1 | 1 | 1 | 1 |
|---|---|---|---|---|
| 1 | 1 | 1 | 1 | 1 |
| 0 | 0 | 0 | 0 | 0 |
| −1 | −1 | −1 | −1 | −1 |
| −1 | −1 | −1 | −1 | −1 |

FIG. 9B

| 1 | 1 | 0 | −1 | −1 |
|---|---|---|----|----|
| 1 | 1 | 0 | −1 | −1 |
| 1 | 1 | 0 | −1 | −1 |
| 1 | 1 | 0 | −1 | −1 |
| 1 | 1 | 0 | −1 | −1 |

FIG. 9C

| 0 | 1 | 1 | 1 | 1 |
|---|---|---|---|---|
| 1 | 0 | 1 | 1 | 1 |
| −1 | 0 | 0 | 1 | 1 |
| −1 | −1 | −1 | 0 | 1 |
| −1 | −1 | −1 | −1 | 0 |

FIG. 9D

| 1 | 1 | 1 | 1 | 0 |
|---|---|---|---|---|
| 1 | 1 | 1 | 0 | −1 |
| 1 | 1 | 0 | 0 | −1 |
| 1 | 0 | −1 | −1 | −1 |
| 0 | −1 | −1 | −1 | −1 |

FIG. 29

SCANNER CALIBRATION [END]

CALIBRATION [EXECUTE] [RESET TO ORIGINAL VALUE]

SELECT DATA FOR CORRECTION

SELECT REFERENCE VALUE [FACTORY SETTING VALUE] [FIXED VALUE (IN ROM)]

SELECT CURRENT VALUE [READ VALUE] [FACTORY SETTING VALUE]

FIG. 30

CHANGE SCREEN

SCANNER CALIBRATION [ ] [INDEX]

[4] FACTORY SETTING VALUE         PAGE 10

FACTORY SETTING VALUE

| | RED | GREEN | BLUE |
|---|---|---|---|
| PATCH-1 | 255 | 255 | 0 |
| PATCH-2 | 128 | 255 | 0 |
| PATCH-3 | 64 | 255 | 0 |
| PATCH-4 | 0 | 255 | 0 |
| PATCH-5 | 0 | 255 | 128 |
| PATCH-6 | 0 | 255 | 255 |
| PATCH-7 | 0 | 128 | 255 |
| PATCH-8 | 0 | 0 | 255 |

[BACK] [NEXT]

FIG. 31

SCANNER CALIBRATION    INDEX

4 READ VALUE    CHANGE SCREEN    PAGE 14

READ VALUE

| | RED | GREEN | BLUE |
|---|---|---|---|
| PATCH-1 | 255 | 250 | 0 |
| PATCH-2 | 128 | 255 | 10 |
| PATCH-3 | 70 | 255 | 0 |
| PATCH-4 | 0 | 255 | 5 |
| PATCH-5 | 0 | 250 | 128 |
| PATCH-6 | 0 | 255 | 255 |
| PATCH-7 | 0 | 120 | 255 |
| PATCH-8 | 0 | 0 | 245 |

BACK    NEXT

FIG. 32

SCANNER CALIBRATION    INDEX

4 CORRECTION COEFFICIENT    CHANGE SCREEN    PAGE 18

| | CORRECTION COEFFICIENT [%] | | CORRECTION COEFFICIENT [%] |
|---|---|---|---|
| PATCH-1 | 75 | PATCH-9 | 75 |
| PATCH-2 | 75 | PATCH-10 | 75 |
| PATCH-3 | 75 | PATCH-11 | 75 |
| PATCH-4 | 75 | PATCH-12 | 75 |
| PATCH-5 | 75 | PATCH-13 | 75 |
| PATCH-6 | 75 | PATCH-14 | 75 |
| PATCH-7 | 75 | PATCH-15 | 75 |
| PATCH-8 | 75 | PATCH-16 | 75 |

BACK    NEXT

| READ VALUE/ COLOR (MAX 255) | BLUE SIGNAL | GREEN SIGNAL | RED SIGNAL | YELLOW COEFFICIENT FOR ACC | INPUT FOR YELLOW | REMARKS |
|---|---|---|---|---|---|---|
| 1. WHITE | 240 | 240 | 240 | 1.0 | 240 | |
| 2. YELLOW | 40 | 200 | 200 | 1.0 | 180 | |
| 3. RED | 10 | 10 | 160 | 0.8 | 128 | |
| 4. MAGENTA | 60 | 20 | 160 | 0.8 | 128 | |
| 5. BLUE | 60 | 20 | 30 | 0.9 | 27 | |
| 6. CYAN | 160 | 80 | 10 | 1.0 | 10 | |
| 9. GREEN | 30 | 60 | 10 | 1.0 | 10 | |
| 10. GRAY | 20 | 20 | 20 | 1.0 | 20 | |
| 11. BLACK | 0 | 0 | 0 | 1.0 | 0 | |

FIG. 39

| READ VALUE/ COLOR/ (MAX 255) | BLUE SIGNAL | GREEN SIGNAL | RED SIGNAL | RED COEFFICIENT FOR ACC | INPUT FOR CYAN | REMARKS |
|---|---|---|---|---|---|---|
| 1. WHITE | 240 | 240 | 240 | 1.0 | 240 | |
| 2. YELLOW | 40 | 200 | 200 | 0.9 | 180 | |
| 3. RED | 10 | 10 | 160 | 0.8 | 128 | |
| 4. MAGENTA | 60 | 20 | 160 | 0.8 | 128 | |
| 5. COLOR-1 BETWEEN MAGENTA AND BLUE | 60 | 20 | 120 | 1.1 | 132 | |
| 6. COLOR-2 BETWEEN MAGENTA AND BLUE | 60 | 20 | 80 | 1.1 | 88 | |
| 7. BLUE | 60 | 20 | 30 | 0.9 | 27 | |
| 8. CYAN | 150 | 50 | 10 | 1.0 | 10 | |
| 9. GREEN | 30 | 60 | 10 | 1.1 | 11 | |
| 10. GRAY | 5 | 5 | 5 | 1.0 | 5 | |
| 11. BLACK | 0 | 0 | 0 | 1.0 | 0 | |

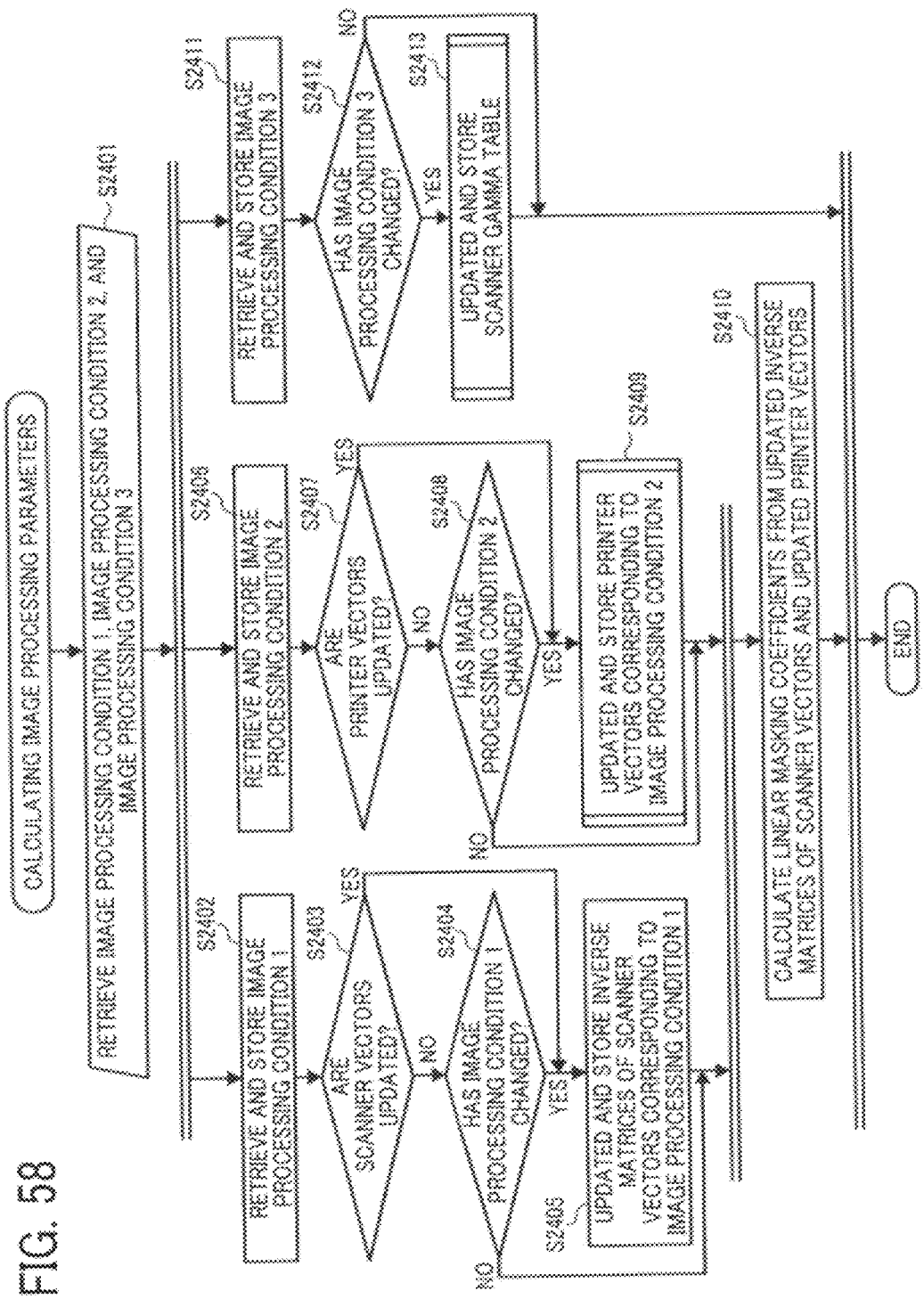

IMAGE PROCESSING APPARATUS

CROSS-REFERENCE TO RELATED APPLICATIONS

The present application claims priority to and incorporates by reference the entire contents of Japanese priority document 2007-309343 filed in Japan on Nov. 29, 2007.

BACKGROUND OF THE INVENTION

1. Field of the Invention

The present invention relates to an image processing apparatus that includes a scanning device for reading image data and that can work in tandem with another image processing apparatus to jointly print the image data.

2. Description of the Related Art

Typically, spectroscopic characteristics of an image processing apparatus undergo unique fluctuation with time. That is, in each image processing apparatus, spectral sensitivities of charged coupled devices (CCDs) of a scanning device or spectral sensitivities of infrared cut filters, which are used to cut infrared light component, undergo fluctuation with time. Moreover, the scanning optical system of the scanning device also deteriorates with time. Thus, when the scanning devices of a plurality of image processing apparatuses are used to read image data from a same color original, there is a possibility that read values of the image data are different for each scanning device. Thus, the quality of image signals output by each scanning device is different. As a result, the colors displayed in an image processing apparatus after reading the color original and the colors of the image data printed on a recording medium may not be identical.

Japanese Patent Application Laid-open No. 2006-238408 discloses a technique to reduce the machine difference in scanning devices. For that, image processing parameters are set by using a reference chart of a plurality of color images each having a different gradation level.

However, in an image processing apparatus, the memory space used to maintain information regarding the recalculation time for generating the image processing parameters or information regarding intermediate calculation results obtained while generating the image processing parameters is usually limited. Thus, the functions that can be implemented depending on the most suitable image processing parameters are restricted to only a few functions.

SUMMARY OF THE INVENTION

It is an object of the present invention to at least partially solve the problems in the conventional technology.

According to one aspect of the present invention, there is provided an image processing apparatus including a color correction unit that performs a conversion of a gradation-converted image signal obtained by using a gradation conversion table of an image-signal conversion unit that performs a gradation conversion of an input image signal from an image reading unit that optically reads an image of an original, and corrects a color of the image signal according to a plurality of hue areas formed by boundary surfaces formed along a brightness axis in parallel in a color space; a reference data storing unit that stores therein reference data corresponding to patches in a reference chart including a plurality of achromatic patches with different gradation levels and a plurality of chromatic patches with different hues; a correction parameter generating unit that generates image processing parameters, based on the reference data and values of the reference chart obtained by the image reading unit reading the reference chart; an intermediate result storing unit that stores intermediate calculation results calculated at each predetermined operation in a stepwise manner to obtain the image processing parameters in a volatile memory; and a determination information storing unit that stores therein recalculation determination information for determining whether to recalculate the intermediate calculation results. The intermediate result storing unit recalculates the intermediate calculation results based on the recalculation determination information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a diagram of an exemplary kernel of a Laplacian filter;

FIG. 9A is a diagram of an exemplary kernel of an edge level detecting filter for a sub-scanning direction;

FIG. 9B is a diagram of an exemplary kernel of an edge level detecting filter for a main scanning direction;

FIGS. 9C and 9D are diagrams of exemplary kernels of edge level detecting filters for oblique directions;

FIG. 29 is a diagram of an exemplary scanner calibration screen displayed on the liquid crystal display;

FIG. 30 is a diagram of factory setting values displayed on the liquid crystal display;

FIG. 31 is a diagram of read values displayed on the liquid crystal display;

FIG. 32 is a diagram of correction coefficients displayed on the liquid crystal display;

FIG. 39 is a scanner gamma conversion table of exemplary read reference values of chromatic patches and achromatic patches used for the correction of cyan toner;

FIG. 58 is a flowchart for explaining a process of calculating image processing parameters corresponding to predetermined image processing conditions.

DETAILED DESCRIPTION OF THE PREFERRED EMBODIMENTS

Exemplary embodiments of the present invention are described in detail below with reference to the accompanying drawings. The present invention is not limited to these exemplary embodiments.

Figure 1:
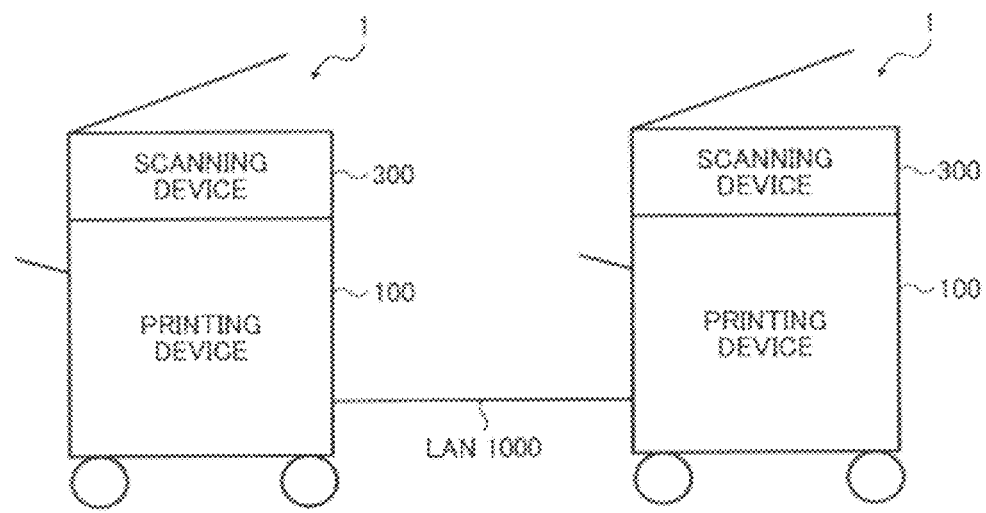
FIG. 1 is a schematic diagram of an image processing system according to an embodiment of the present invention.

FIG. 1 is a schematic diagram of an image processing system according to an embodiment of the present invention. The image processing system includes two image processing apparatuses 1. Each image processing apparatus 1 is assumed to be an electrophotographic color multifunction product (MFP) that has a plurality of functionalities such as copying, facsimile (FAX), printing, scanning, and image delivery.

The image processing apparatuses 1 are connected to each other via a local area network (LAN) cable 1000 for data communication. Thus, depending on the situation, one of the image processing apparatuses 1 can act as a primary image processing apparatus, while the other image processing apparatus 1 can act as a secondary forming apparatus with respect to the primary image processing apparatus. For example, to perform large-quantity copying of an original in a short period of time, first, image data of the original can be obtained by using a scanning device 300 of one image processing apparatus 1 and can be sent to the other image processing apparatus 1. Then, a printing device 100 of each image processing apparatus 1 can simultaneously output copies of the image data to save time. This function is herein referred to as a joint output function.

However, in the image processing system, due to problems such as fluctuation in spectral sensitivities of CCDs in the scanning devices 300, or fluctuation in spectral sensitivities of infrared cut filters in the image processing apparatuses 1, or temporal deterioration of scanning optical systems of the scanning devices 300, there is a possibility that each scanning device 300 has different read values of image data of the same original. Thus, even if the same original is read by each scanning device 300, the resultant image signals output by the scanning devices 300 may be different. That causes a difference between the colors output for display and colors output by printing. To solve such problems, given below is the description of setting image processing parameters that allow reduction in the machine difference in the scanning devices 300 as well as improvement in the printer adjustment accuracy.

Figure 2:
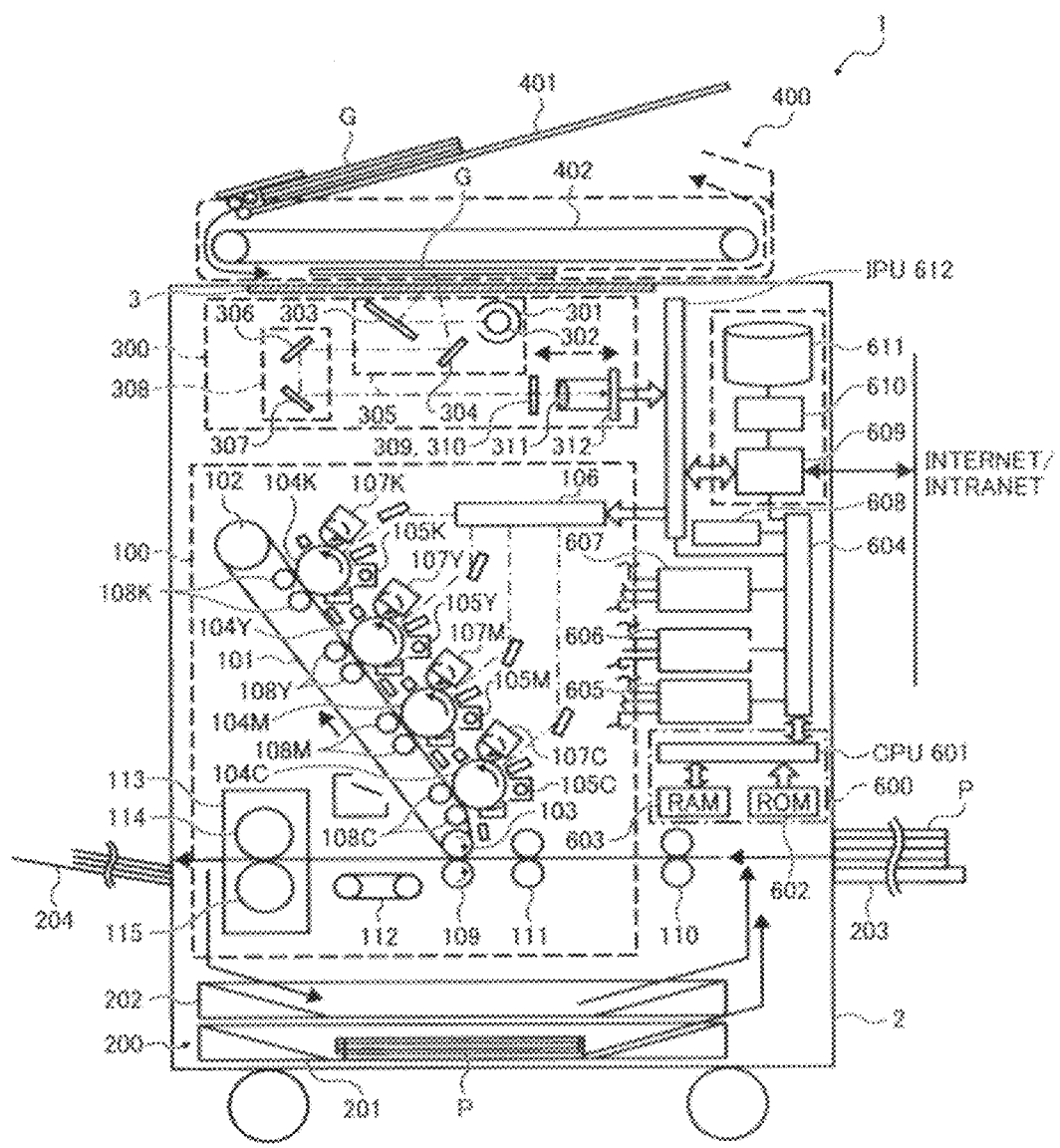
FIG. 2 is a front view for explaining an exemplary configuration of an image processing apparatus in the image processing system.

FIG. 2 is a front view for explaining an exemplary configuration of the image processing apparatus 1. The image processing apparatus 1 includes the printing device 100 as an image forming device, a sheet feeding unit 200, and the scanning device 300 as an image reading unit arranged inside a housing 2. An exposure glass 3 is placed on the top surface of the housing 2. The scanning device 300 lies beneath the exposure glass 3. An auto document feeder (ADF) 400 is arranged above the exposure glass 3. In the ADF 400, a plurality of originals G is stacked on a platen 401. The ADF 400 feeds a single original G at a time from the stack to an original conveying belt 402, which conveys the fed original G to a reading position on the exposure glass 3. The scanning device 300 can read the original placed at the reading position. The originals G read by the scanning device 300 are discharged to a discharge tray (not shown) via the original conveying belt 402.

The sheet feeding unit 200 includes a sheet tray 201, a sheet inverting unit 202, and a conveying roller (not shown). A plurality of sheets P of a recording medium is stacked in the sheet tray 201. The sheet feeding unit 200 feeds a single sheet P at a time to the printing device 100. After the printing device 100 prints image on one side of the fed sheet P, the sheet inverting unit 202 inverts the sheet P and sends it back to the printing device 100. Thus, the printing device 100 can print image data on the other side of the sheet P. Meanwhile, a manual sheet feeding tray 203 is attached to a side of the housing 2 for manual feeding of the sheets P. The sheet feeding unit 200 conveys the sheets P fed from the manual sheet feeding tray 203 to the printing device 100.

After forming an image on a sheet P, it is discharged to a catch tray 204 attached to the housing 2 on the opposite side of the manual sheet feeding tray 203.

The printing device 100 is arranged substantially in the central portion of the housing 2. Moreover, a loop-like intermediate transfer belt 101 having a predetermined length is arranged in an oblique direction substantially in the central portion of the printing device 100. The intermediate transfer belt 101 is stretched around a driving roller 102 and a secondary transfer roller 103, and is rotated in clockwise direction. Four photosensitive drums 104K, 104Y, 104M, and 104C are arranged along the intermediate transfer belt 101. The photosensitive drums 104K, 104Y, 104M, and 104C are image carrying members such as optical photoconductor (OPC) drums that have a diameter of about 30 millimeters and carry a toner image of black, yellow, magenta, and cyan, respectively. Each of the photosensitive drums 104K, 104Y, 104M, and 104C is a part of an image forming unit. The image forming unit with respect to the photosensitive drum 104K includes a charging unit 105K that uniformly charges the surface of the photosensitive drum 104K, a developing unit 107K that provides black toner to develop an electrostatic latent image on the photosensitive drum 104K into a black toner image, a primary bias roller 108K that is used to apply a primary transfer bias voltage to the intermediate transfer belt 101, a cleaning unit (not shown) that removes residual toner from the surface of the photosensitive drum 104K after the primary transfer of black toner image, and a neutralizing unit (not shown) that neutralizes the photosensitive drum 104K after the primary transfer of black toner image. Except for the color of toner, the image forming units with respect to the photosensitive drums 104Y, 104M, and 104C also have an identical structure. A laser optical system 106 is arranged above the four image forming units and irradiates each of the uniformly charged photosensitive drums 104K, 104Y, 104M, and 104C with a laser beam to form an electrostatic latent image thereon.

More particularly, after the charging unit 105K uniformly charges the surface of the photosensitive drum 104K, the laser optical system 106 irradiates the photosensitive drum 104K with a laser beam modulated by black color data to form an electrostatic latent image thereon. Subsequently, the developing unit 107K develops the electrostatic latent image into a black toner image by supplying black toner to the photosensitive drum 104K. The primary bias roller 108K is used to apply the primary transfer bias voltage to the intermediate transfer belt 101 such that the black toner image on the photosensitive drum 104K is primary-transferred on the intermediate transfer belt 101. In an identical manner, a yellow toner image, a magenta toner image, and a cyan toner image are formed on the photosensitive drums 104Y, 104M, and 104C, respectively, and are sequentially primary-transferred on the intermediate transfer belt 101. The four toner images are superimposed on the intermediate transfer belt 101 to form a four color toner image.

In the printing device 100, a secondary transfer backup roller 109 is arranged opposite to the secondary transfer roller 103 such that the intermediate transfer belt 101 is sandwiched therebetween to form a secondary transfer nip. The sheet P fed from the sheet feeding unit 200 is conveyed to the secondary transfer nip via a pair of conveying rollers 110 and a pair of registration rollers 111. More particularly, the pair of registration rollers 111 conveys the sheet P to the secondary transfer nip at the same timing when the four color toner image formed on the intermediate transfer belt 101 reaches the secondary transfer nip.

The secondary transfer roller 103 is used to apply a secondary transfer bias voltage to the intermediate transfer belt 101 such that the four color toner image is transferred from the intermediate transfer belt 101 to the sheet P at the secondary transfer nip. The four-color toner image and the white color of the sheet P results in formation of a full-color toner image on the sheet P.

Subsequently, the sheet P is conveyed to a fixing unit 113 via a sheet conveying belt 112. The fixing unit 113 includes a heating roller 114 that is heated to a predetermined temperature and a pressure roller 115 that is pressure-abutted against the heating roller 114 to form a fixing nip. Upon reaching the fixing nip, the sheet P is subjected to heat and pressure such that the full-color toner image is fixed on the sheet P. Subsequently, the sheet P is discharged to the catch tray 204.

Figure 3:
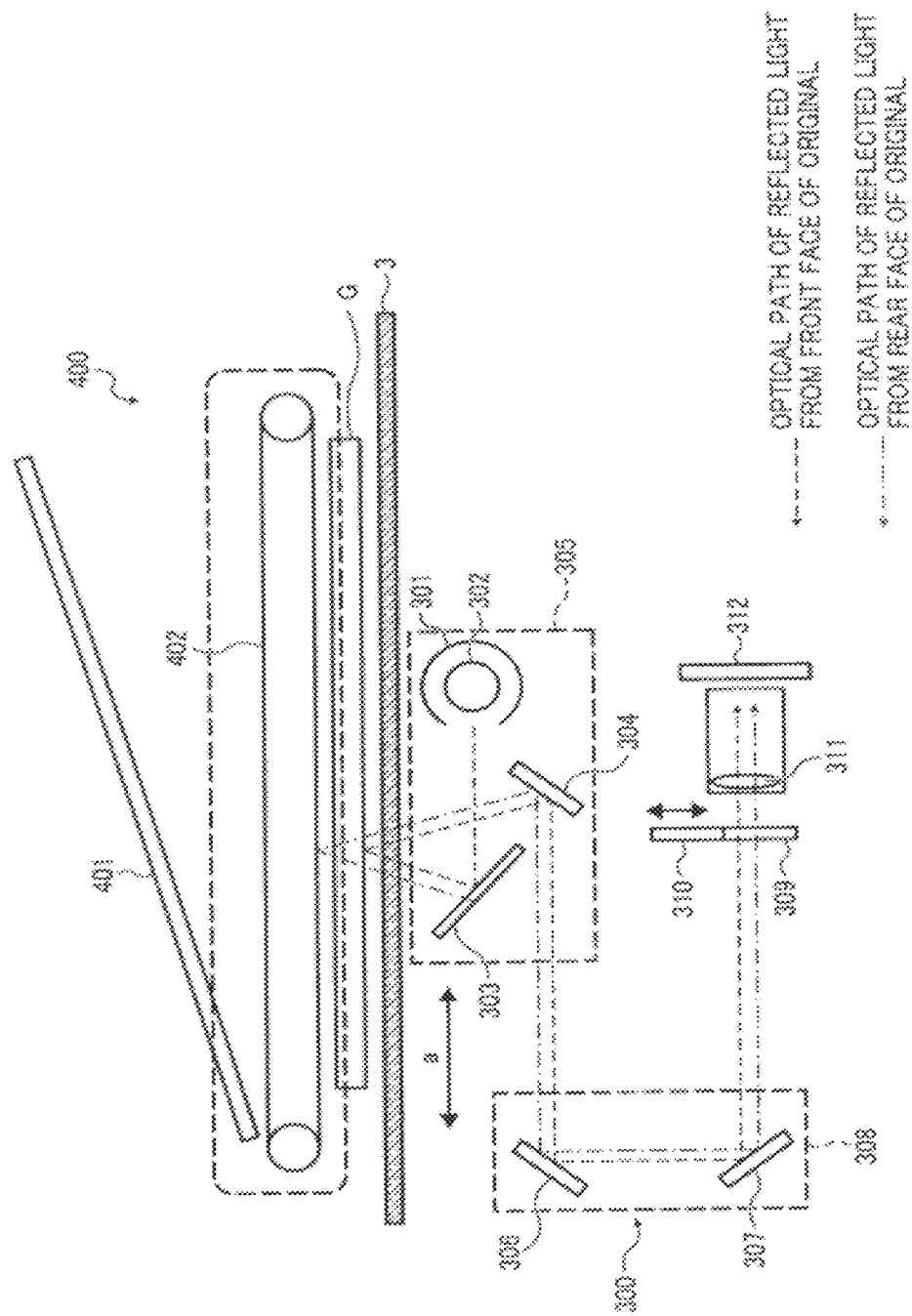
FIG. 3 is an enlarged view of a scanning device and an automatic document feeder (ADF) in the image processing apparatus.

FIG. 3 is an enlarged view of the scanning device 300 and the ADF 400. The scanning device 300 includes a first carriage 305, a second carriage 308, two switchable infrared cut filters 309 and 310, a lens 311, and a CCD 312 as a photoelectric conversion element. The first carriage 305 includes a halogen lamp 302 with a lamp shade 301, a first mirror 303, and a second mirror 304. The second carriage 308 includes a third mirror 306 and a fourth mirror 307. The first carriage 305 and the second carriage 308 move back and forth in a sub-scanning direction 'a' at separate predetermined speeds. The first mirror 303 reflects a light emitted by the halogen lamp 302 to the original G or a white reference plate (not shown). That is, the original G is irradiated with the light from the halogen lamp 302. Subsequently, the light reflected from the original G sequentially reflects from the second mirror 304, the third mirror 306, and the fourth mirror 307, and eventually falls on the lens 311 via either one of the infrared cut filters 309 and 310 that cut the infrared rays. The lens 311 then focuses the reflected light without infrared rays on the CCD 312. The CCD 312 reads an image on the original G by performing photoelectric conversion and outputs image data in the form of analog image signals.

Figure 4:
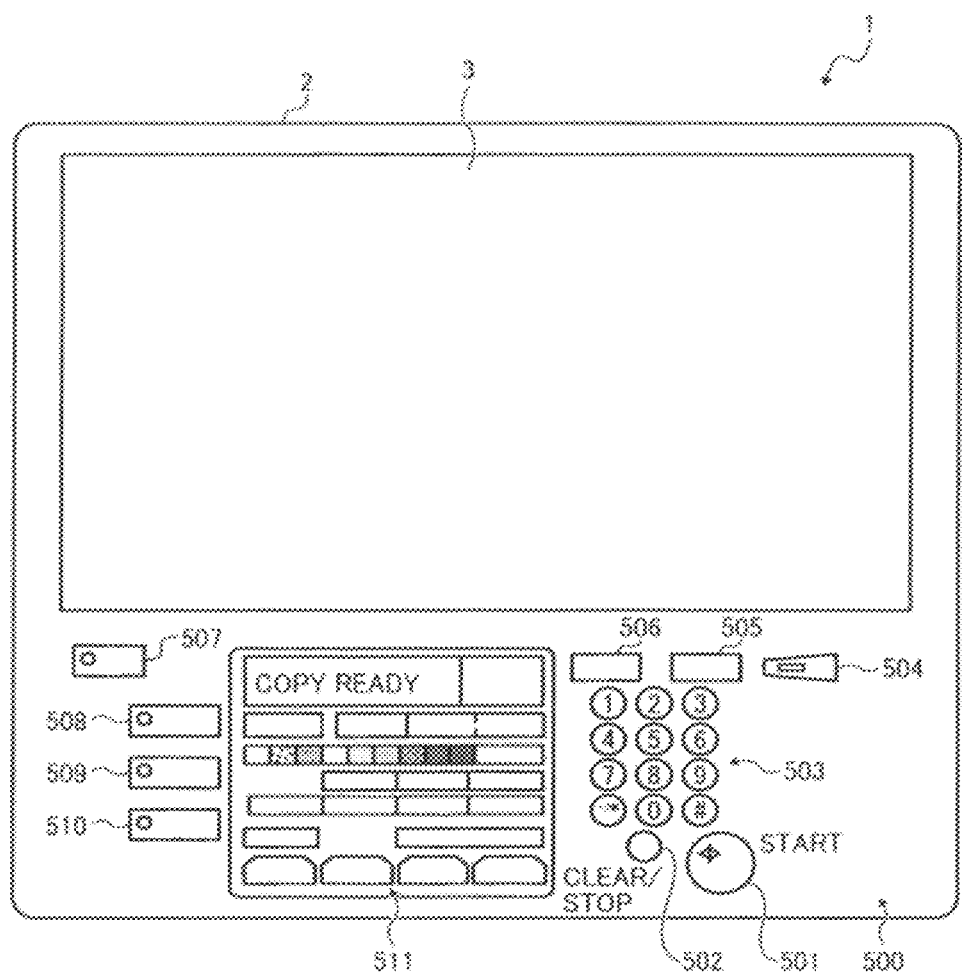
FIG. 4 is a diagram of an operating panel arranged on the top surface of the image processing apparatus.

FIG. 4 is a diagram of an operating panel 500 that is arranged on the top surface of the housing 2. The operating panel 500 includes a start key 501, a clear/stop key 502, a numeric keypad 503, an interrupt key 504, a memory call key 505, a pre-heat/mode clear key 506, a color adjustment/registration key 507, a program key 508, an option key 509, an area processing key 510, and a liquid crystal display 511.

Figure 5:
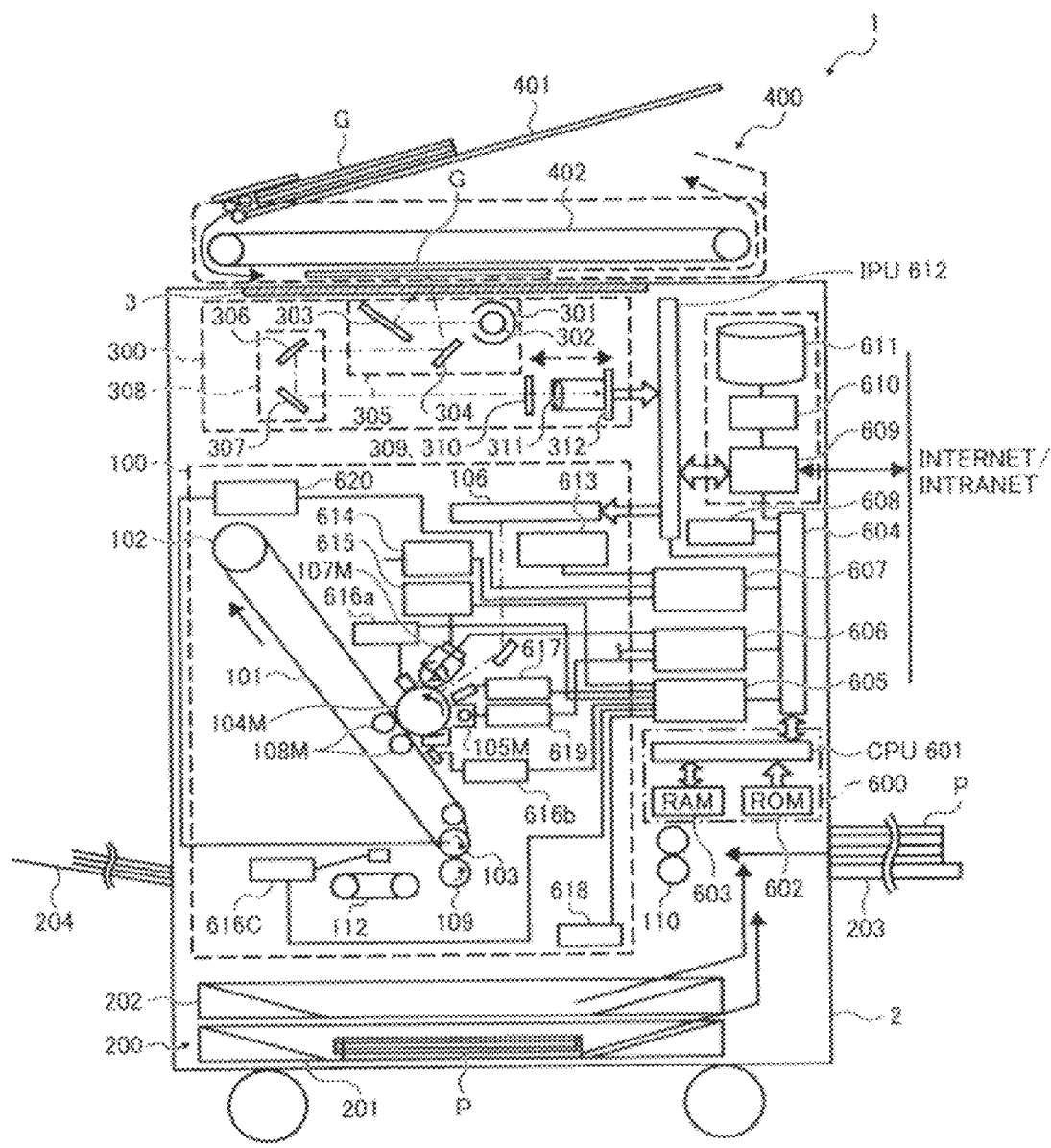
FIG. 5 is a schematic diagram for explaining a control system of the image processing apparatus.

FIG. 5 is a schematic diagram for explaining a control system of the image processing apparatus 1. The image processing apparatus 1 is controlled by a system controller 600 that includes a central processing unit (CPU) 601, a read only memory (ROM) 602 for storing various computer programs and data, and a random access memory (RAM) 603 used as a work memory of the CPU 601. An input-output (I/O) interface 604 connects the system controller 600 to a plurality of circuits, namely, a sensor control unit 605, a power supply/bias control unit 606, a driving control unit 607, an operation control unit 608, a communication control unit 609, a storage device control unit 610, a storage device 611, an IPU 612, a laser optical system driving unit 613, and a toner refilling unit 614.

The sensor control unit 605 is connected to a plurality of sensors, namely, a magnetic permeability sensor 615 that is arranged in each of the developing units 107K, 107Y, 107M, and 107C, optical sensors 616a to 616c, a potential sensor 617, and an environmental sensor 618. The sensor control unit 605 receives sensor signals from the abovementioned sensors and transfers those sensor signals to the CPU 601 via the I/O interface 604. The optical sensor 616a is arranged opposite to the photosensitive drums 104K, 104Y, 104M, and 104C, and is used to detect the amount of toner attached to each of the photosensitive drums 104K, 104Y, 104M, and 104C. The optical sensor 616b is arranged opposite to the intermediate transfer belt 101 and close to the photosensitive drums 104K, 104Y, 104M, and 104C, and is used to detect the amount of toner attached to the intermediate transfer belt 101. The optical sensor 616c is arranged opposite to the sheet conveying belt 112 and is used to detect the amount of toner attached to the sheet conveying belt 112.

More particularly, the optical sensor 616a is arranged close to but outside of image areas in an axial direction of the photosensitive drums 104K, 104Y, 104M, and 104C. Moreover, the optical sensor 616a is fabricated from a light emitting device (not shown) such as a light emitting diode and a light receiving element (not shown) such as a photo sensor. The optical sensor 616a detects, for each toner color, the amount of toner deposition in a toner image of a detection pattern latent image formed on the photosensitive drums 104K, 104Y, 104M, and 104C, and the amount of toner deposition in the background portion. The optical sensor 616a also detects residual voltage after neutralization of each of the photosensitive drums 104K, 104Y, 104M, and 104C. Subsequently, the optical sensor 616a outputs sensor signals to the sensor control unit 605. Upon receiving the sensor signals, the sensor control unit 605 obtains a ratio of the deposition amount of toner in the detected pattern toner image and the amount of toner in the background for each toner color, compares the obtained ratio with a standard value, detects the fluctuation in the image density based on the comparison result, and corrects control values regarding each toner color set in the optical sensor 616a. Meanwhile, from a practical perspective, it is sufficient to arrange the optical sensor 616a in either one of the photosensitive drums 104K, 104Y, 104M, and 104C. Moreover, it is sufficient to detect the deposition amount of toner by any one of the optical sensors 616a to 616c.

The magnetic permeability sensor 615 is arranged in each of the developing units 107K, 107Y, 107M, and 107C, and, based on the variation in the magnetic permeability of the corresponding developer, detects the toner concentration in the corresponding developer. The sensor control unit 605 receives the sensor signals from the magnetic permeability sensor 615, compares the toner concentration in each developer with a standard concentration, and, when the toner concentration in any developer is determined to have decreased below a predetermined amount, sends a signal to the toner refilling unit 614 for refilling the toner in that developer. Subsequently, the toner refilling unit 614 refills the toner based on the amount specified in the signal.

The potential sensor 617 detects the surface potential of each of the photosensitive drums 104K, 104Y, 104M, and 104C and sends sensor signals to the sensor control unit 605.

The power supply/bias control unit 606 controls the supply of power to the developing units 107K, 107Y, 107M, and 107C, and to a power supply circuit 619. The power supply circuit 619 supplies a predetermined discharge voltage for transfer to the charging units 105K, 105Y, 105M, and 105C, supplies a predetermined developing bias voltage to the developing units 107K, 107Y, 107M, and 107C, and supplies a primary transfer bias voltage to the primary bias rollers 108K, 108Y, 108M, and 108C, and to the charging units 105K, 105Y, 105M, and 105C.

The driving control unit 607 controls the driving of the laser optical system driving unit 613 that regulates the laser output of the laser optical system 106, a transfer belt rotating unit 620 that rotates the intermediate transfer belt 101, and the toner refilling unit 614. The operation control unit 608 follows instructions from the CPU 601 and obtains information of operations performed on the operating panel 500, controls illumination of lamps, and performs display control on the liquid crystal display 511.

The communication control unit 609 is connected to a network such as Internet or intranet for external communication. The storage device 611 can be a hard disk drive (HDD) in which the storage device control unit 610 stores various information such as image data of scanned originals G.

Figure 6:
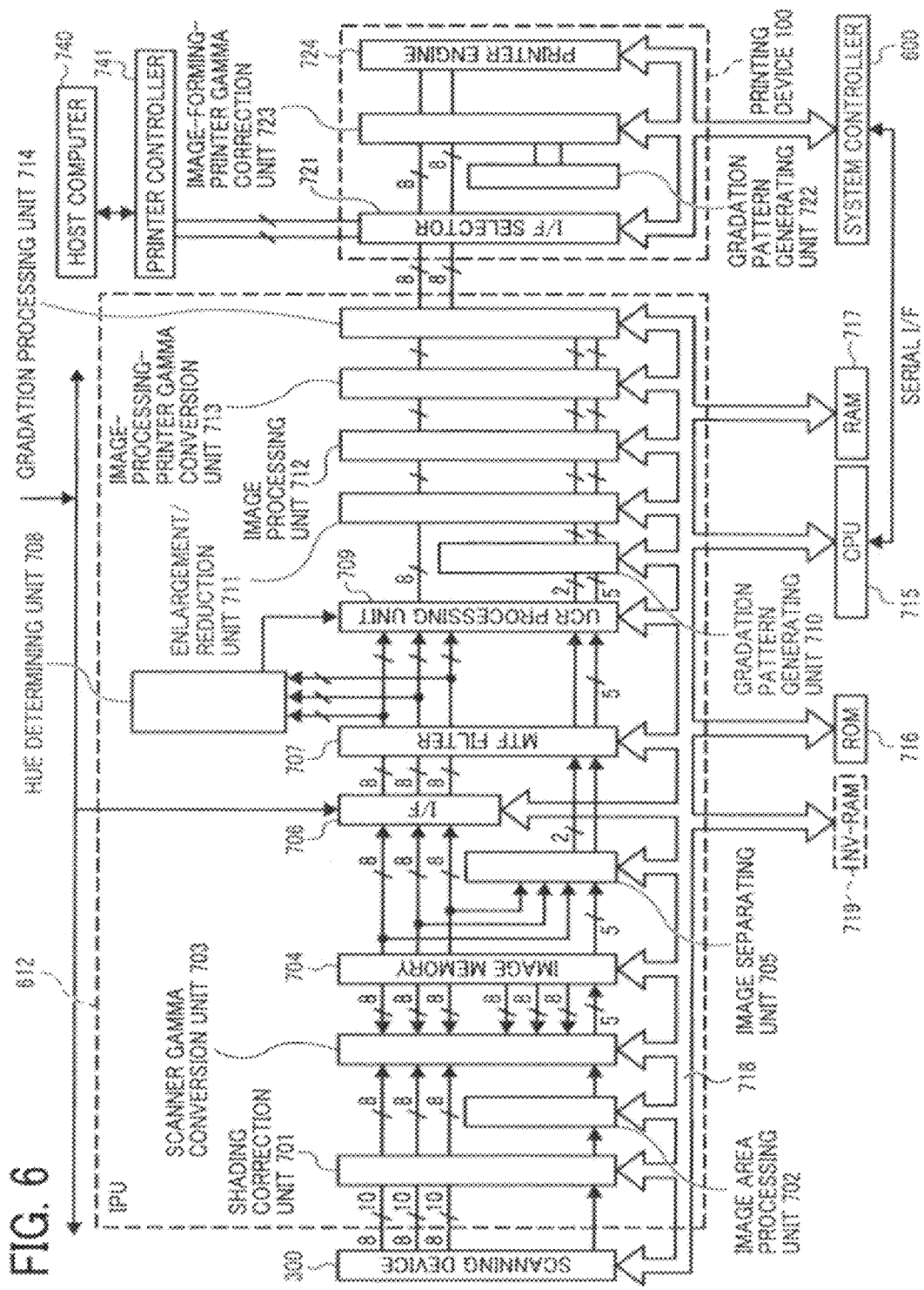
FIG. 6 is an exemplary circuit block diagram of an image processing unit (IPU) and a printing device in the image processing apparatus.

FIG. 6 is an exemplary circuit block diagram of the IPU 612 and the printing device 100. The IPU 612 includes a shading correction unit 701, an image area processing unit 702, a scanner gamma conversion unit 703, an image memory 704, an image separating unit 705, an interface (I/F) 706, an MTF filter 707, a hue determining unit 708, a color-conversion under-color-removal processing unit 709 (hereinafter, "UCR processing unit 709"), a gradation pattern generating unit 710, an enlargement/reduction unit 711, an image processing unit 712, an image-processing-printer gamma conversion unit 713 (a first image signal converting unit 713), a gradation processing unit 714, a CPU 715, a ROM 716, and a volatile RAM 717, a non volatile RAM (NV-RAM) 719. The abovementioned components are interconnected by a bus 718.

The printing device 100 includes an I/F selector 721, a gradation pattern generating unit 722, an image-forming-printer gamma correction unit 723 (a second image signal converting unit 723), and a printer engine 724.

The CPU 715 is connected to the ROM 716 and the RAM 717 via the bus 718 and is also connected to the system controller 600 via a serial I/F. The CPU 715 receives various commands and information from the operating panel 500 via the system controller 600. Upon receiving information such as image quality mode, image density, image area, and the like, the CPU 715 appropriately sets parameters to the components of the IPU 612.

When an original G is placed on the exposure glass 3, the scanning device 300 first performs color separation of the original G to separate red (R), green (G), and blue (B) colors. Then, the scanning device 300 performs, e.g., 10-bit reading of the original G to obtain image signals and sends the image signals to the shading correction unit 701.

Subsequently, the shading correction unit 701 corrects the unevenness in the image signals in a main scanning direction and sends, e.g., 8-bit image signals to the scanner gamma conversion unit 703.

The image area processing unit 702 generates an image area signal for determining which area in the original G corresponds to currently-processed image data. Based on the image area signal, the image area processing unit 702 sets image processing parameters used in subsequent processing. The image area processing unit 702 determines, based on each specified image area, image processing parameter (e.g., a color correction coefficient, a space filter, or a gradation conversion table) most suitable to each type of original G (e.g., a character type, a silver halide photograph (printing paper) type, a printed original type, an ink jet type, a highlight pen type, a map type, or a thermal transfer original type).

Upon receiving the 8-bit image signals, the scanner gamma conversion unit 703 converts reflectance data into brightness data and stores the data in the image memory 704. The image signals after scanner gamma conversion are also stored in the image memory 704 and are output to the MTF filter 707 via the image separating unit 705 and the I/F 706. The image separating unit 705 distinguishes a character portion from a photograph portion, distinguishes a chromatic color portion from an achromatic color portion, and outputs the result to the MTF filter 707.

The MTF filter 707 performs processing for changing the frequency characteristics of the image signals. For example, based on a user request, the MTF filter 707 performs edge reinforcement to obtain a sharply-define image or smoothing to obtain a soft image. Moreover, the MTF filter 707 performs edge reinforcement corresponding to the edge level of each of the R, G, and B image signals. For example, the MTF filter 707 performs edge reinforcement for character edges but not for dot images.

Figure 7:
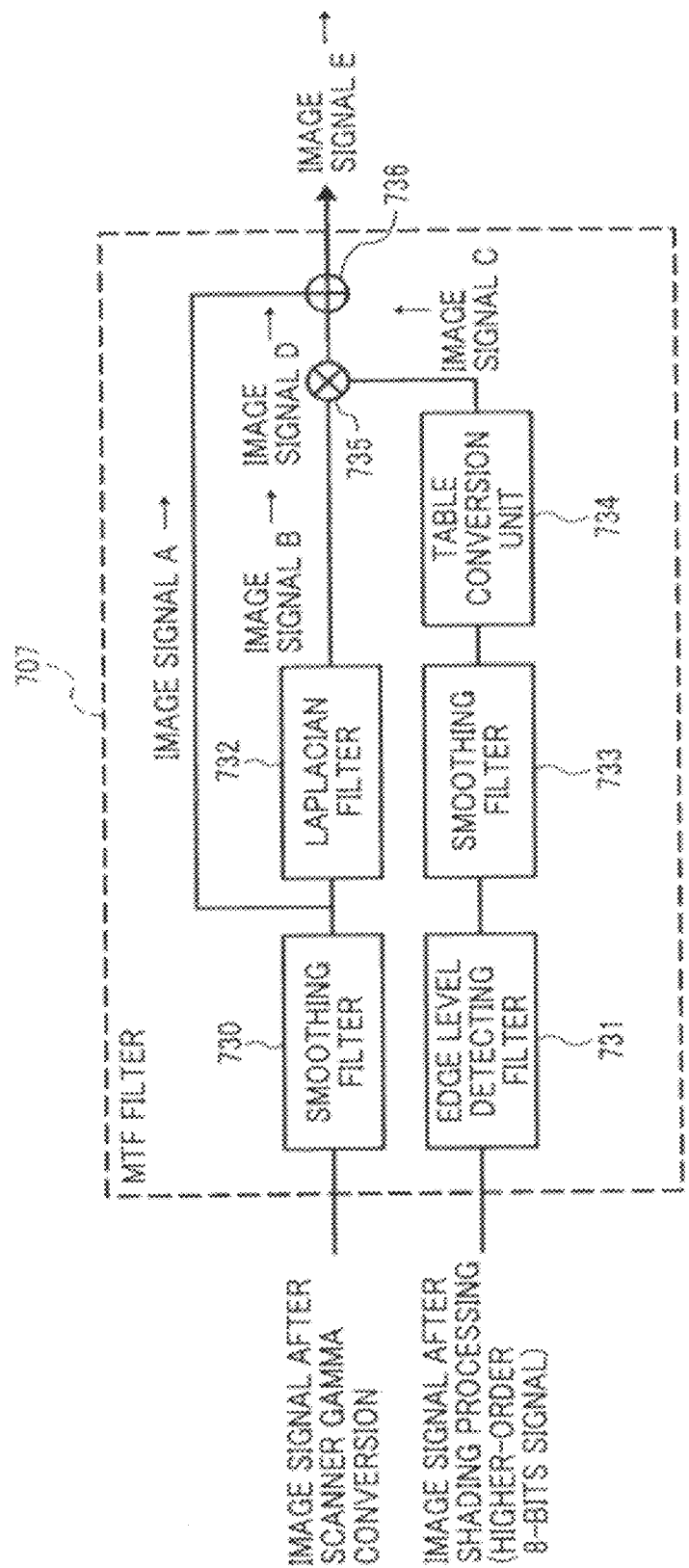
FIG. 7 is an exemplary circuit block diagram of a modulation transfer function (MTF) filter in the IPU.

FIG. 7 is an exemplary circuit block diagram of the MTF filter 707. The MTF filter 707 includes smoothing filters 730 and 733, an edge level detecting filter 731, a Laplacian filter 732, a table conversion unit 734, an integrator 735 and an adder 736. The smoothing filter 730 performs smoothing of the image signals, which are converted from reflectance linear to brightness linear by the scanner gamma conversion unit 703, to obtain image signals A by using coefficients shown in Table 1. The image signals A are then output to the Laplacian filter 732 and the adder 736.

TABLE 1

| (1/18)x | | | | |
|---|---|---|---|---|
| 0 | 1 | 2 | 1 | 0 |
| 1 | 2 | 4 | 2 | 1 |
| 0 | 1 | 2 | 1 | 0 |

Figure 8:
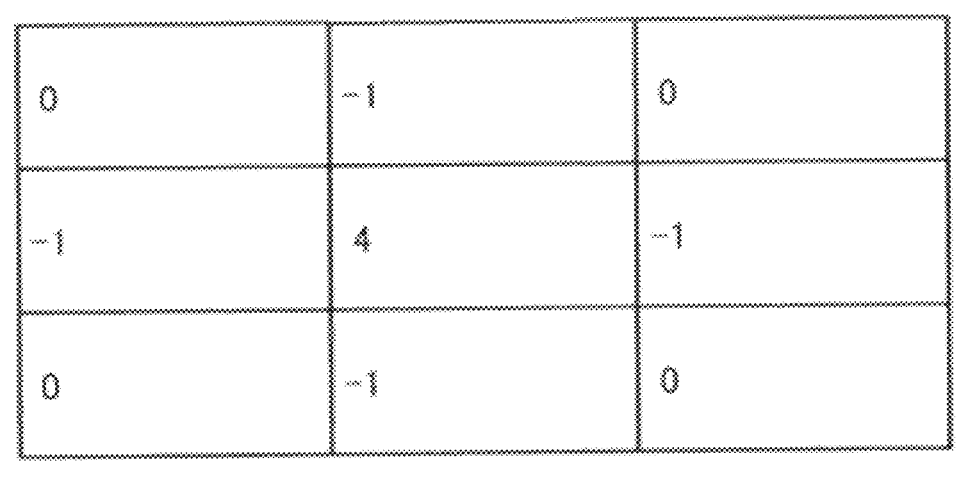

The Laplacian filter 732 uses a 3×3 kernel as shown in FIG. 8 and extracts differential components of the image signals A to obtain image signals B and sends the image signals B to the integrator 735.

From among 10-bit image signals that do not undergo gamma conversion by the scanner gamma conversion unit 703, e.g., a higher-order 8-bit component is input to the edge level detecting filter 731 for edge level detection. The edge level detecting filter 731 uses an edge level detection kernel for the sub-scanning direction (see FIG. 9A), an edge level detection kernel for the main scanning direction (see FIG. 9B), and edge level detection kernels for oblique directions (see FIGS. 9C and 9D) to perform edge level detection and outputs the maximum edge level from among the detected edge levels to the smoothing filter 733.

The smoothing filter 733 performs smoothing of the received edge level by using, e.g., coefficients in Table 2 given below to reduce the effect of a difference in the photographic sensitivity of even number pixels and odd number pixels of the scanning device 300. The smoothing filter 733 then outputs the edge level to the table conversion unit 734.

TABLE 2

| (1/4)x | | |
|---|---|---|
| 1 | 2 | 1 |

Figure 10:
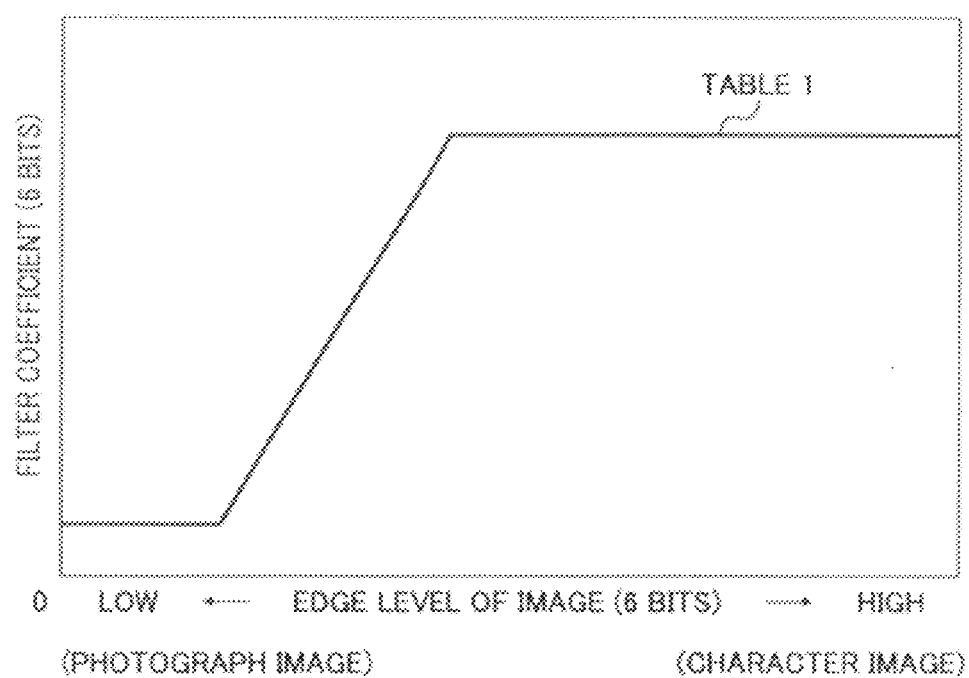
FIG. 10 is a graph for explaining an exemplary table conversion of edge levels by using a table conversion circuit.

The table conversion unit 734 performs table conversion with respect to the received edge level to obtain image signals C and outputs the image signals C to the integrator 735. More particularly, the table conversion unit 734 uses a table value to specify color strength (i.e., color contrast, color density, etc.) of lines and points as well as smoothness of the dot image portion. FIG. 10 is a graph for explaining an exemplary table conversion of edge levels by using a table conversion circuit. Meanwhile, the edge level is maximum when a black line or a black point is drawn on a white background. On the other hand, the edge level decreases as the pixel boundaries become smoother as in the case of fine-printed halftone dots, a silver halide photograph, or a thermal transfer original.

The integrator 735 takes a product of the edge level converted by the table conversion unit 734 (image signals B) and the output value of the Laplacian filter 732 (image signals C) to obtain image signals D, and outputs the image signals D to the adder 736. The adder 736 takes an addition of the image signals D and the image signals A to obtain image signals E, and outputs the image signals E to the hue determining unit 708 and the UCR processing unit 709.

The UCR processing unit 709 includes a color correction processing unit (not shown) and a UCR unit (not shown). The color correction processing unit corrects the difference in color separation characteristics of an input system and spectroscopic characteristics of color materials of an output system to calculate the amount of yellow, magenta (M), and cyan (C) necessary for accurate color reproduction. The UCR unit replaces the overlapping portions of yellow, magenta, and cyan with black (K). The method of such color correction is described with reference to a color space diagrams shown in FIGS. 11 to 13.

Figure 11:
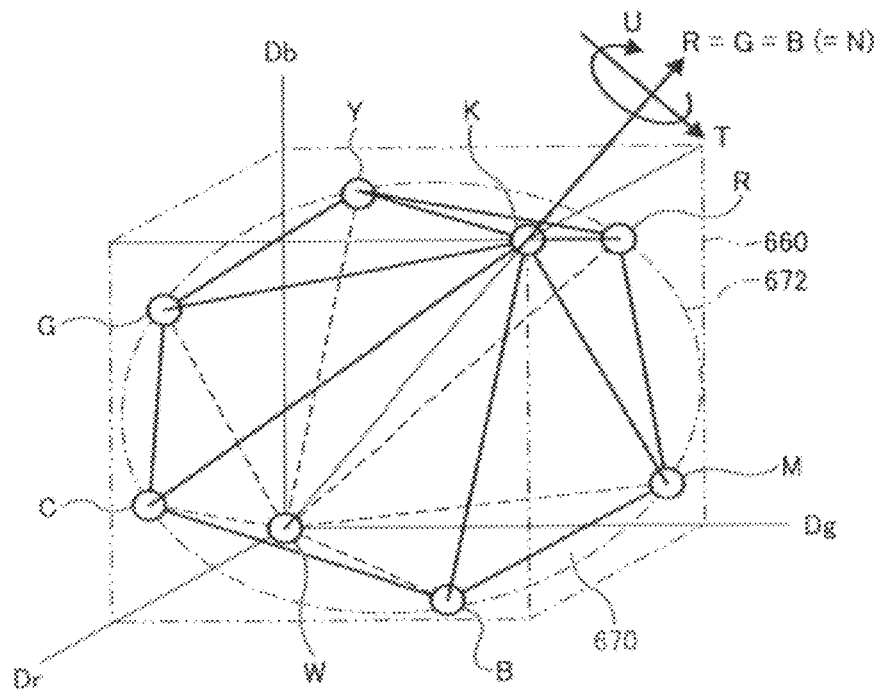
FIGS. 11 to 13 are color space diagrams for explaining color correction.

In FIG. 11, the color correction is performed by dividing color spaces (R, G, B) on a surface that radially extends around an achromatic axis N (R=G=B(≡N axis)). The color saturation varies along an axis T perpendicular to the achromatic axis N. The hue varies along a rotation direction U around the achromatic axis N in a plane parallel to the axis T. Thus, all points in a plane parallel to the axis T and along the rotation direction U have a color with a hue determined by the rotation direction U.

Points C, M, and Y in FIG. 11 represent points of maximum color saturation in printer primary colors of cyan, magenta, and yellow, respectively. Similarly, points R, G, B represent points of maximum color saturation in printer secondary colors of red, blue, and green, respectively. A printer color reproduction area 672 is a substantially spherical area formed by connecting the points C, M, Y, R, G, and B, and points W and K with curves. Thus, the inside portion of the printer color reproduction area 672 includes colors that can be output by the printing device 100. A signal color region 660 is a region from which a signal color with respect to the color image signal can be obtained.

To simplify the process of color correction, the image processing apparatus 1 recognizes a printer color reproduction area 670 as the printer color reproduction area 672. The printer color reproduction area 670 is a dodecahedron area formed by connecting the points C, M, Y, R, G, B, W, and K with straight lines. Even if the printer color reproduction area 670 is used for color correction, there is no substantial error in a color correction amount X.

Figure 12:
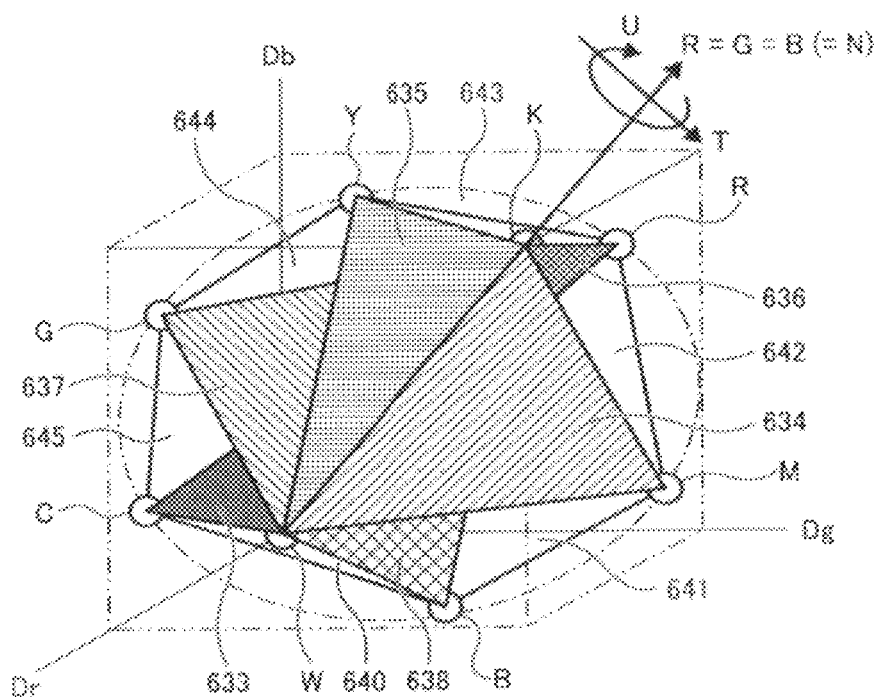
Figure 13:
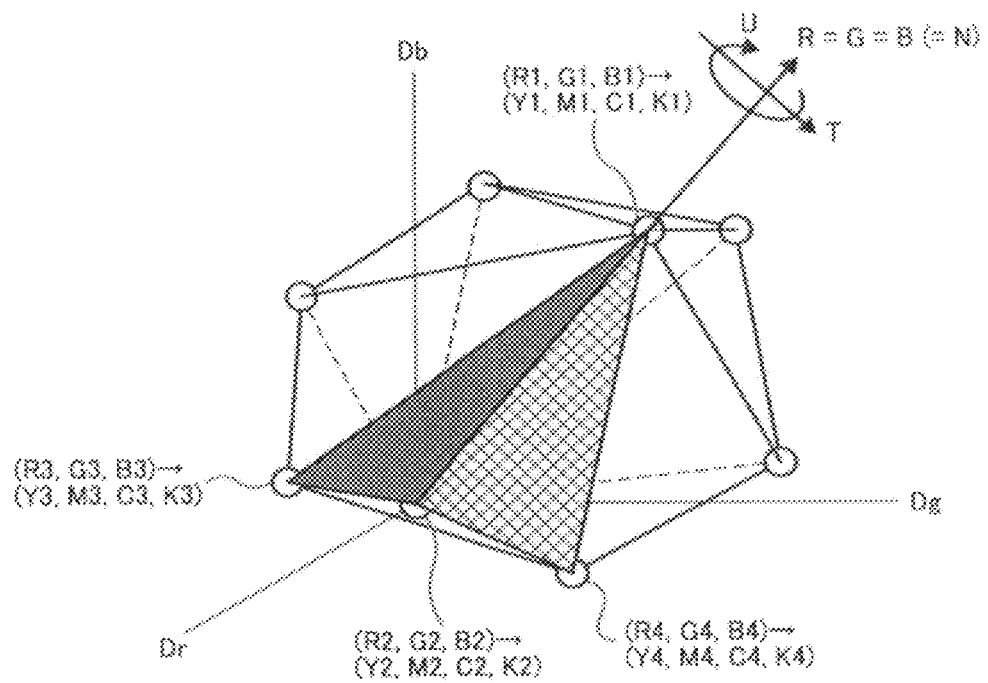

In FIGS. 12 and 13, the color space is shown divided into a plurality of hue areas. A 'C boundary surface 633' is a plane defined by the points C, W, and K. Similarly, 'i' boundary surfaces 634 to 638 are planes defined by the points i, W and K (i=M, Y, R, G, B, respectively). Thus, the color space is divided by the boundary surfaces 634 to 638 into a CB hue area 640, a BM hue area 641, an MR hue area 642, an RY hue area 643, an YG hue area 644, and a GC hue area 645.

Given below is the description of a method of determining hue of image data by using the hue determining unit 708.

In the hue determination method in a three dimensional color space, a hue evaluation value Fx is calculated for each color from the image data and, based on the hue evaluation value Fx, a hue area code of each hue area including a signal color is determined.

A theoretical method of deriving the hue evaluation value Fx is described below. It is assumed that color coordinates representing the points C, M, Y, R, G, B, W, K are (Dir, Dig, Dib) (i=c, m, y, r, g, b, w, k). Thus, the color coordinates corresponding to the point C are (Dcr, Dcg, Dcb). Then, the C boundary surface 633 is represented, e.g., by Equations (1) to (6) given below.

$$(Dcg-Dcb) \cdot Dr+(Dcb-Dcr) \cdot Dg+(Dcr-Dcg) \cdot Db=0 \quad (1)$$

$$(Dmg-Dmb) \cdot Dr+(Dmb-Dmr) \cdot Dg+(Dmr-Dmg) \cdot Db=0 \quad (2)$$

$$(Dyg-Dyb) \cdot Dr+(Dyb-Dyr) \cdot Dg+(Dyr-Dyg) \cdot Db=0 \quad (3)$$

$$(Drg-Drb) \cdot Dr+(Drb-Drr) \cdot Dg+(Drr-Drg) \cdot Db=0 \quad (4)$$

$$(Dgg-Dgb) \cdot Dr+(Dgb-Dgr) \cdot Dg+(Dgr-Dgg) \cdot Db=0 \quad (5)$$

$$(Dbg-Dbb) \cdot Dr+(Dbb-Dbr) \cdot Dg+(Dbr-Dbg) \cdot Db=0 \quad (6)$$

The C boundary surface 633 divides the color space into two areas, namely, an area including the CB hue area 640 and an area including the GC hue area 645. Similarly, each of the boundary surfaces 634 to 638 divides the color space into two areas. Thus, based on which of the two areas formed by each of the boundary surfaces 633 to 638 includes a color image signal, it becomes possible to determine the hue area that includes the color image signal. In other words, based on plus and minus of a value obtained by substituting color image signals (Dr, Dg, Db) in Equations (1) to (6), it is possible to determine the hue area that includes the color image signal. The hue evaluation value Fx for each color is determined by using Equations (1) to (6). That is, the left sides of Equations (1) to (6) are assumed to be hue evaluation values Fc, Fm, Fy, Fr, Fg, and Fb, respectively.

Therefore, for the hue determination in a three-dimensional space, the hue evaluation value Fx for each color determined by Equations (7) to (12) is calculated.

$$Fc=(Dcg-Dcb) \cdot Dr+(Dcb-Dcr) \cdot Dg+(Dcr-Dcg) \cdot Db \quad (7)$$

$$Fm=(Dmg-Dmb) \cdot Dr+(Dmb-Dmr) \cdot Dg+(Dmr-Dmg) \cdot Db \quad (8)$$

$$Fy=(Dyg-Dyb) \cdot Dr+(Dyb-Dyr) \cdot Dg+(Dyr-Dyg) \cdot Db \quad (9)$$

$$Fr=(Drg-Drb) \cdot Dr+(Drb-Drr) \cdot Dg+(Drr-Drg) \cdot Db \quad (10)$$

$$Fg=(Dgg-Dgb) \cdot Dr+(Dgb-Dgr) \cdot Dg+(Dgr-Dgg) \cdot Db \quad (11)$$

$$Fb=(Dbg-Dbb) \cdot Dr+(Dbb-Dbr) \cdot Dg+(Dbr-Dbg) \cdot Db \quad (12)$$

For example, when the hue evaluation values Fc and Fg calculated at an arbitrary point (Dr, Dg, Db) in a color space satisfy a condition 'Fc≦0 and Fb>0', the point is included in the CB hue area as shown in Table 3 given below.

TABLE 3

| Conditions for hue evaluation coefficient | Hue area code |
|---|---|
| Fc ≦ 0 and Fb > 0 | 0 {CB Hue area} |
| Fc ≦ 0 and Fm > 0 | 1 {BM Hue area} |
| Fm ≦ 0 and Fr > 0 | 2 {MR Hue area} |
| Fr ≦ 0 and Fy > 0 | 3 {RY Hue area} |
| Fy ≦ 0 and Fg > 0 | 4 {YG Hue area} |
| Fg ≦ 0 and Fg > 0 | 5 {GC Hue area} |

As described above, each hue area is defined by the corresponding hue evaluation value Fx. Thus, the conditions for the hue evaluation value Fx corresponding to each hue area code in Table 3 are conditions that are determined by above-mentioned Equations.

Meanwhile in Table 3, although color coordinates on the N axis are assumed to lie in the GC hue area, the color coordinates can also lie in other hue areas. The hue evaluation value Fx changes depending on an actual value of (Dir, Dig, Dib) (i=c, m, y, r, g, b, w, k). Thus, based on the hue evaluation value Fx, it is possible to vary the conditions for the hue evaluation value Fx corresponding to each hue area code in Table 3.

Given below is the description with reference to FIGS. 14 and 15 of a method of mapping a three-dimensional color space to a two-dimensional plane and using color coordinates of a color image signal in the two-dimensional plane to determine the hue area that includes the color image signal.

Figure 15:
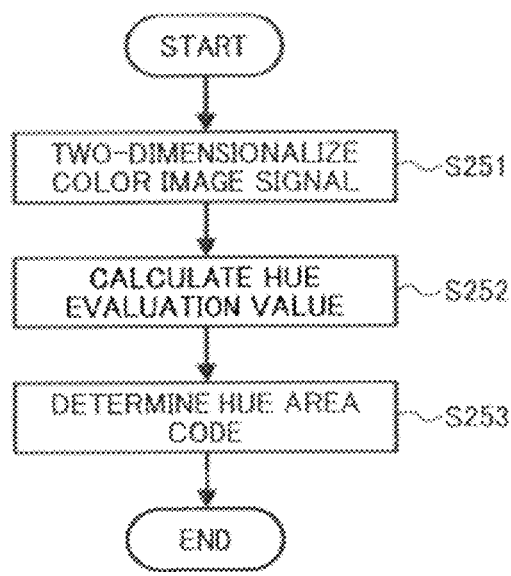
FIG. 15 is a flowchart for explaining a process of hue determination.

FIG. 15 is a flowchart for explaining a process of hue determination. The hue determining unit 708 receives a color image signal and performs two-dimensionalization of the value of the color image signal (Step S251). That is, the value of the color image signal is substituted in Equations (13) and (14) given below to obtain a difference GR and a difference BG.

$$GR=Dg-Dr \quad (13)$$

$$BG=Db-Dg \quad (14)$$

As a result, the coordinates (Dr, Dg, Db) in a color space of the color image signal are converted into the coordinates (GR, BG) in a color plane.

Figure 14:
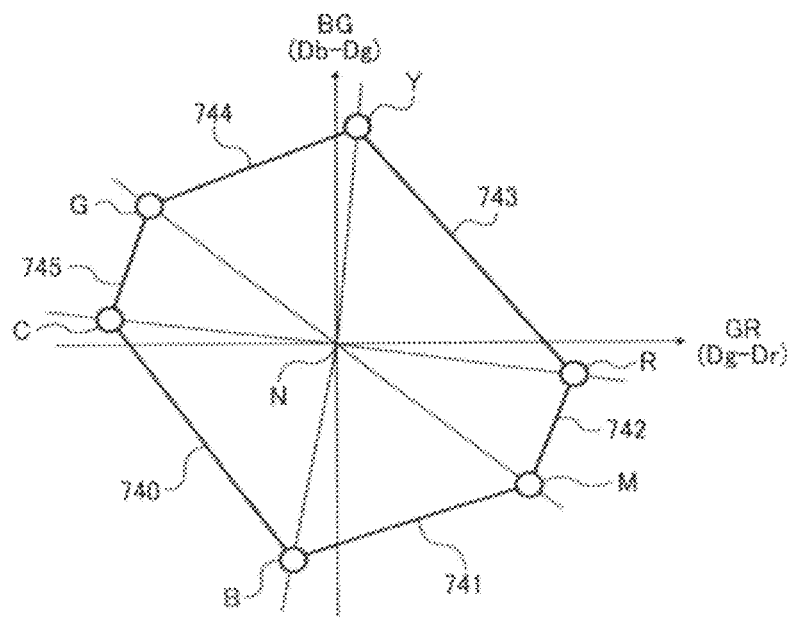
FIG. 14 is a diagram of a color plane for explaining color correction.

FIG. 14 is a diagram of a two-dimensional plane to which a color image signal is to be mapped. In FIG. 14, a straight line 'Dg-Dr' is assumed to be a GR axis and a straight line 'Db-Dg' is assumed to be a BG axis. The GR axis and the BR axis are mutually perpendicular.

The point (Dr, Dg, Db) on the color space are mapped to the color plane in FIG. 14 by using Equation (15) given below. More particularly, a point (Dnr, Dng, Dnb) on the N axis in the color space are mapped to a point (Dng-Dnr, Dnb-Dng) in the color plane in FIG. 14. Since Dnr=Dng=Dnb is established, Equation (15) is obtained as follows:

$$(Dng-Dnr, Dnb-Dng)=(0,0) \quad (15)$$

In this way, all points on the N axis are mapped to an origin n in the color plane in FIG. 14. Moreover, the points C, M, Y, R, G, and B in the color space are arranged around the origin n as shown in FIG. 14. Thus, the hue areas 640 to 645 shown in FIG. 12 are mapped to areas 740 to 745 in the color plane in FIG. 14. The areas 740 to 745 are divided by straight lines that connect the N axis to the points C, M, Y, R, G, and B, respectively.

Reverting to the flowchart in FIG. 15, the difference GR, the difference BG, and a hue evaluation value Fx' (x=c, m, y, r, g, b) are calculated based on the color values of the input color image signal (Step S252). Subsequently, based on the hue evaluation value Fx', the difference GR, and the difference BG, Table 4 given below is used to determine a hue area code of a hue area that includes a signal color (Step S253).

TABLE 4

| Conditions for hue evaluation coefficient Fx' | Hue area code |
|---|---|
| BG ≦ fc' and BG > fb' | 0 {CB hue area color space} |
| BG ≦ fb' and BG < fm' | 1 {BM hue area color space} |
| BG ≧ fm' and BG < fr' | 2 {MR hue area color space} |
| BG ≧ fr' and BG < fy' | 3 {RY hue area color space} |
| BG ≧ fy' and BG > fg' | 4 {YG hue area color space} |
| BG ≦ fg' and BG ≧ fc' | 5 {GC hue area color space} |

A method of deriving the hue evaluation value Fx' is described below. In the color plane shown in FIG. 14, the straight lines connecting the point N to the points C, M, Y, R, G, and B, respectively (i.e., a straight line NC, a straight line NM, a straight line NY, a straight line NR, a straight line NG, and a straight line NB) are represented by Equations (16) to (21), respectively.

$$BG=(Dcb-Dcg)/(Dcg-Dcr) \cdot GR \text{ (where, Dcg-Dcr} \neq 0) \quad (16)$$

$$BG=(Dmb=Dmg)/(Dmg-Dmr) \cdot GR \text{ (where, Dmg-Dmr} \neq 0) \quad (17)$$

$$BG=(Dyb-Dyg)/(Dyg-Dyr) \cdot GR \text{ (where, Dyg-Dyr} \neq 0) \quad (18)$$

$$BG=(Drb-Drg)/(Drg-Drr) \cdot GR \text{ (where, Drg-Drr} \neq 0) \quad (19)$$

$$BG=(Dgb-Dgg)/(Dgg-Dgr) \cdot GR \text{ (where, Dgg-Dgr} \neq 0) \quad (20)$$

$$BG=(Dbb-Dbg)/(Dbg-Dbr) \cdot GR \text{ (where, Dbg-Dbr} \neq 0) \quad (21)$$

From a magnitude correlation between the BG value obtained by substituting the GR value of the color image signal in Equations (16) to (21) and the actual BG value of the color image signal, a positional relation can be obtained between a straight line determined by each Equation and a point corresponding to a color image signal. Thus, based on the abovementioned magnitude relation, it is possible to determine the hue area that includes the color image signal.

Based on Equations (16) to (21), the hue evaluation value Fx' is determined as given in Equations (22) to (27).

$$Fc'=(Dcb-Dcg)/(Dcg-Dcr) \cdot GR \quad (22)$$

$$Fm'=(Dmb-Dmg)/(Dmg-Dmr) \cdot GR \quad (23)$$

$$Fy'=(Dyb-Dyg)/(Dyg-Dyr) \cdot GR \quad (24)$$

$$Fr'=(Drb-Drg)/(Drg-Drr) \cdot GR \quad (25)$$

$$Fg'=(Dgb-Dgg)/(Dgg-Dgr) \cdot GR \quad (26)$$

$$Fb'=(Dbb-Dbg)/(Dbg-Dbr) \cdot GR \quad (27)$$

That is, Equations (22) to (27) are obtained by replacing the left sides of Equations (16) to (21) to Fc', Fm', Fy', Fr', Fg', and Fb', respectively.

For example, when the hue evaluation values Fc' and Fb' calculated from an arbitrary point (GR, BG) in a color plane satisfy a condition "BG≦Fc' and BG>Fb'", then the point (GR, BG) is included in the CB hue area as shown in Table 4 given above.

Figure 16:
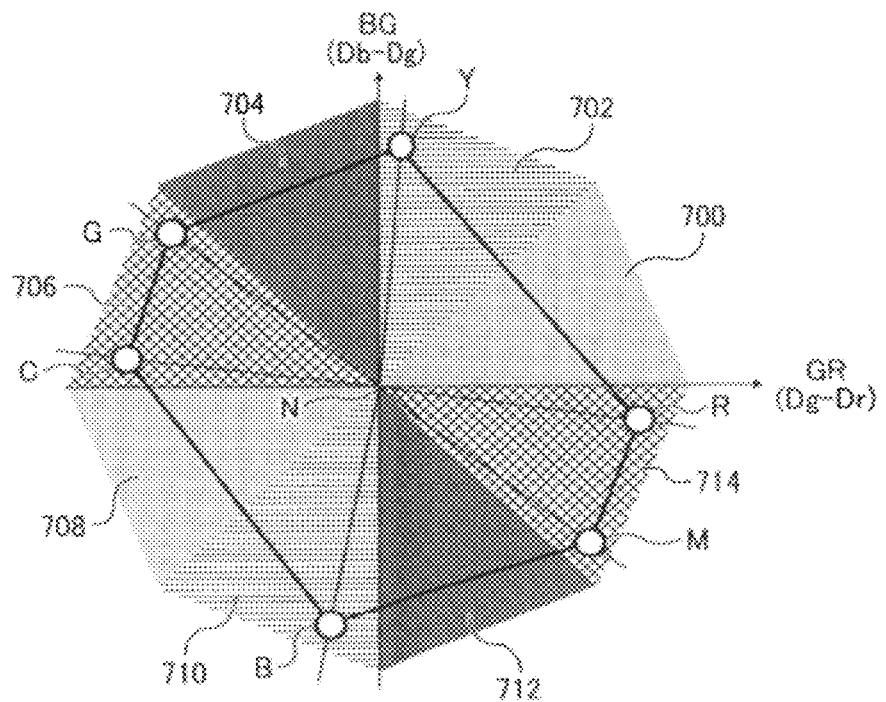
FIG. 16 is a diagram of a color plane for explaining color correction.

Thus, the conditions for the hue evaluation value Fx' corresponding to each hue area code in Table 4 are conditions that are determined by abovementioned Equations. The conditions for the hue evaluation value Fx' are set in advance in Table 4. That allows the hue determining unit 708 to identify a condition satisfied by the difference BG and the hue evaluation value Fx' and select a hue area code corresponding to that condition. FIG. 16 is a diagram of the color plane with corresponding hue areas.

Meanwhile, in Table 4, although color coordinates on the N axis are assumed to lie in the GC hue area, the color coordinates cal also lie in other hue areas.

Moreover, the hue evaluation value Fx' changes depending on the actual value of (Dir, Dig, Dib) (i=c, m, y, r, g, b, w, k). Thus, based on the hue evaluation value Fx', it is possible to vary the conditions for the hue evaluation value corresponding to each hue area code in Table 4.

Furthermore, although Equations (13) and (14) are used to convert the color image signal (Dr, Dg, Db) to the value (GR, BG) in the color plane, it is also possible to use Equations (28) and (29) given below.

$$GR=Ri \cdot Dr+Gi \cdot Dg+B1 \cdot Db \quad (28)$$

$$BG=Rj \cdot Dr+Gj \cdot Dg+Bj \cdot Db \quad (29)$$

where, Ri=Gi=Bi=0 and Rj=Gj=Bj=0.

The hue determining unit 708 determines hue areas of the divided color space to which input image signals (R, G, B) belong and performs color correction with masking coefficients set in advance for each color space by using Equation (30) given below.

$$\begin{pmatrix} Y(\text{hue}) \\ M(\text{hue}) \\ C(\text{hue}) \\ K(\text{hue}) \end{pmatrix} = \begin{pmatrix} aYB(\text{hue}) & aYG(\text{hue}) & aYR(\text{hue}) & aY(\text{hue}) \\ aMB(\text{hue}) & aMG(\text{hue}) & aMR(\text{hue}) & aM(\text{hue}) \\ aCB(\text{hue}) & aCG(\text{hue}) & aCR(\text{hue}) & aC(\text{hue}) \\ aKB(\text{hue}) & aKG(\text{hue}) & aKR(\text{hue}) & aK(\text{hue}) \end{pmatrix} \begin{pmatrix} B(\text{hue}) \\ G(\text{hue}) \\ R(\text{hue}) \\ 1 \end{pmatrix} \quad (30)$$

In that case, linear processing of masking coefficients (e.g., density adjustment or color balance adjustment) is performed as per the requirement. Meanwhile, a division point referred hereinafter is a point at which a boundary surface intersects with a side (e.g., the point G in FIG. 11). For example, in the case of a green hue, Equation (31) is obtained.

$$\begin{pmatrix} Y(G) \\ M(G) \\ C(G) \\ K(G) \end{pmatrix} = \begin{pmatrix} aYB(G) & aYG(G) & aYR(G) & aY(G) \\ aMB(G) & aMG(G) & aMR(G) & aM(G) \\ aCB(G) & aCG(G) & aCR(G) & aC(G) \\ aKB(G) & aKG(G) & aKR(G) & aK(G) \end{pmatrix} \begin{pmatrix} B(G) \\ G(G) \\ R(G) \\ 1 \end{pmatrix} \quad (31)$$

In Equation (31), the left side P (hue) (P=C, M, Y, and K; hue=hues R, G, B, Y, M, C, K, and W) is referred to as a printer vector, the right side S (hue) (S=B, G, R; hue=hues R, G, B, Y, M, C, K, W) is referred to as a scanner vector, and aPS (hue) (P=C, M, Y, K; S=B, G, R) is referred to as a linear masking coefficient for each hue.

Usually, the linear masking coefficients aPS (hue) (P=Y, M, C, K; S=R, G, B, constant) of each color space is calculated by using Equation (32) given below. For that, the R, G, B values at four points, namely, two points (R1, G1, B1) and (R2, G2, B2) on the achromatic axis N and two points (R3, G3, B3) and (R4, G4, B4) on two boundary surfaces not on the achromatic axis N are determined in advance. Similarly, recording values (C1, M1, Y1, K1), (C2, M2, Y2, K2), (C3, M3, Y3, K3), and (C4, M4, Y4, K4) of developing units for C, M, Y, and K (i.e., the developing units 107K, 107Y, 107M, and 107C) that are suitable for color reproduction are also determined in advance.

$$\begin{pmatrix} aYB(3\text{-}4) & aYG(3\text{-}4) & aYR(3\text{-}4) & aY(3\text{-}4) \\ aMB(3\text{-}4) & aMG(3\text{-}4) & aMR(3\text{-}4) & aM(3\text{-}4) \\ aCB(3\text{-}4) & aCG(3\text{-}4) & aCR(3\text{-}4) & aC(3\text{-}4) \\ aKB(3\text{-}4) & aKG(3\text{-}4) & aKR(3\text{-}4) & aK(3\text{-}4) \end{pmatrix} = \quad (32)$$

$$\begin{pmatrix} Y(1) & Y(2) & Y(3) & Y(4) \\ M(1) & M(2) & M(3) & M(4) \\ C(1) & C(2) & C(3) & C(4) \\ K(1) & K(2) & K(3) & K(4) \end{pmatrix} \begin{pmatrix} B(1) & B(2) & B(3) & B(4) \\ G(1) & G(2) & G(3) & G(4) \\ R(1) & R(2) & R(3) & R(4) \\ 1 & 1 & 1 & 1 \end{pmatrix}^{-1}$$

Equation (32) is obtained by multiplying Equation (33) with Matrix 35, which is an inverse matrix of Matrix 34, and interchanging the right side and the left side.

$$\begin{pmatrix} Y(1) & Y(2) & Y(3) & Y(4) \\ M(1) & M(2) & M(3) & M(4) \\ C(1) & C(2) & C(3) & C(4) \\ K(1) & K(2) & K(3) & K(4) \end{pmatrix} = \quad (33)$$

$$\begin{pmatrix} aYB(3\text{-}4) & aYG(3\text{-}4) & aYR(3\text{-}4) & aY(3\text{-}4) \\ aMB(3\text{-}4) & aMG(3\text{-}4) & aMR(3\text{-}4) & aM(3\text{-}4) \\ aCB(3\text{-}4) & aCG(3\text{-}4) & aCR(3\text{-}4) & aC(3\text{-}4) \\ aKB(3\text{-}4) & aKG(3\text{-}4) & aKR(3\text{-}4) & aK(3\text{-}4) \end{pmatrix}$$

$$\begin{pmatrix} B(1) & B(2) & B(3) & B(4) \\ G(1) & G(2) & G(3) & G(4) \\ R(1) & R(2) & R(3) & R(4) \\ 1 & 1 & 1 & 1 \end{pmatrix}$$

$$\begin{pmatrix} B(1) & B(2) & B(3) & B(4) \\ G(1) & G(2) & G(3) & G(4) \\ R(1) & R(2) & R(3) & R(4) \\ 1 & 1 & 1 & 1 \end{pmatrix} \quad (34)$$

$$\begin{pmatrix} B(1) & B(2) & B(3) & B(4) \\ G(1) & G(2) & G(3) & G(4) \\ R(1) & R(2) & R(3) & R(4) \\ 1 & 1 & 1 & 1 \end{pmatrix}^{-1} \quad (35)$$

In Equation (33), aXY (3-4) represents a masking coefficient established in a color area between a hue 3 and a hue 4. Recording values of C, M, Y, and K at each point are equivalent achromatic concentration conversion values prior to the UCR processing.

To simplify the following description, it is assumed that the equivalent achromatic concentration conversion values are calculated for a white point and a black point on the achromatic axis N. Assume that a maximum value from among the equivalent achromatic concentration conversion values is Xmax. Then, the values for the white point and the black point have following relations.

In the case of a white point:

$$R1=G1=B1=C1=M1=Y1=0 \geq K1$$

In the case of a black point:

$$R1=G1=B1=C1=M1=Y1=X\text{max} \geq K2$$

It is preferable that two points on different boundary surfaces are taken into consideration at which the minimum recording value of the developing units for C, M, Y, and K is zero and the maximum recording value is Xmax. That is, the two points can be recorded on the corresponding boundary surfaces and that have the highest color saturation. In that case, following conditions are established.

$$\text{Min}(C3,M3,Y3)=0 \geq K3$$

$$\text{Max}(C3,M3,Y3)=X\text{max}$$

$$\text{Min}(C4,M4,Y4)=0 \geq K4$$

$$\text{Max}(C4,M4,Y4)=X\text{max}$$

If a recording value of the developing unit for K is determined from among the minimum values of the developing units for C, M, and Y in the following manner, then it is also possible to control a UCR ratio.

In the case of a UCR ratio of 100%: K=Min(C, M, Y)
In the case of a UCR ratio of 70%: K=Min(C, M, Y)×0.7

To divide the color spaces (R, G, B) into six boundary surfaces as shown in FIG. 11, the R, G, and B values of at least the points C, M, Y, R, G, B, W, and K, and recording values of the developing units for C, M, Y, and K most suitable for the color reproduction are determined in advance and, based on the values, masking coefficients of the corresponding color spaces are calculated. The masking coefficients can be stored in a memory unit such as a ROM or a RAM. During the process of color correction, an appropriate masking coefficient can be selected based on a color determined in the hue determination.

The UCR processing unit 709 performs color correction by using following equations.

$$Y'=Y-\alpha \cdot \min(Y,M,C)$$

$$M'=M-\alpha \cdot \min(Y,M,C)$$

$$C'=C-\alpha \cdot \min(Y,M,C)$$

$$Bk=\alpha \cdot \min(Y,M,C)$$

In the above equations, 'α' is a coefficient that determines the amount of UCR. When α=1, a UCR processing of 100% is performed. The value of 'α' can be constant. For example, if the value of 'a' in an area of high color density is set closer to 1 and the value of 'a' in a highlighted area (an area with low image density) is set closer to 0, then it is possible to perform smoothing of an image in the highlighted area.

The masking coefficients are different for each of the 14 hues, 12 of which are obtained by dividing the hues of R, G, B, Y, M, and C, and remaining two are the hues of W, and K.

The hue determining unit 708 determines the hues to which the image data read by the scanning device 300 belongs and then outputs the result to the UCR processing unit 709.

Based on that result, the UCR processing unit 709 selects masking coefficients for the corresponding hues and performs color correction.

Subsequently, the enlargement/reduction unit 711 performs vertical and horizontal enlargement/reduction on the image data. The image processing unit 712 performs repeat processing on the enlarged/reduced image data and outputs the image data to the image-processing-printer gamma conversion unit 713.

The image-processing-printer gamma conversion unit 713 performs correction of the image signals based on an image quality mode such as a character mode or a photograph mode. Moreover, the image-processing-printer gamma conversion unit 713 can simultaneously perform other processing such as background skipping in which the background of an original is automatically skipped. The image-processing-printer gamma conversion unit 713 includes a plurality of (e.g., ten) gradation conversion tables (image signal conversion tables), each corresponding to an image area signal generated by the image processing unit 712. The image-processing-printer gamma conversion unit 713 selects, from a plurality of image processing parameters, a gradation conversion table that is most suitable to each type of original (e.g., a character type, a silver halide photograph (printing paper) type, a printed original type, an ink jet type, a highlight pen type, a map type, or a thermal transfer original type), corrects the image signals depending on the image quality mode, and outputs the image data to the gradation processing unit 714.

The gradation processing unit 714 then performs dither processing on the image data and outputs the image data to the I/F selector 721 of the printing device 100.

More particularly, the gradation processing unit 714 can select a dither processing of an arbitrary size from among a 1×1 no-dither processing to dither processing by m×n pixels (where, m and n are positive integers). For example, the gradation processing unit 714 performs dither processing by using up to 36 pixels. The size of dither processing by using 36 pixels can be, e.g., a 6×6 kernel of 6 pixels in the main scanning direction and 6 pixels in the sub-scanning direction or an 18×2 kernel of 18 pixels in the main scanning direction and 2 pixels in the sub-scanning direction.

The printing device 100 is connected to the IPU 612 via the I/F selector 721. The I/F selector 721 has a switching function by which it can output the image data read by the scanning device 300 to an external image processing apparatus for processing or output the image data from an external host computer 740 or an external image processing apparatus to the printing device 100. Meanwhile, the I/F selector 721 receives image data from the host computer 740 via a printer controller 741.

The image-forming-printer gamma correction unit 723 converts the image signals from the I/F selector 721 by using a gradation conversion table and outputs the image signals to a laser modulating unit (not shown) of the printer engine 724.

Thus, when image signals from the host computer 740 are input to the I/F selector 721 via the printer controller 741, the image-forming-printer gamma correction unit 723 performs gradation conversion and the printer engine 724 performs image formation. In this way, the image processing apparatus 1 functions as a printer.

During image processing in the image processing apparatus 1, the CPU 715 uses the RAM 717 as a work memory based on a computer program in the ROM 716 and controls the components of the IPU 612. More particularly, the CPU 715 is connected to the system controller 600 via a serial I/F (not shown) and receives commands about, e.g., image quality mode, color density, or image area from the operating panel 500 via the system controller 600. Then, the CPU 715 sets various parameters in the IPU 612 based on the received commands such that the IPU 612 can perform image processing.

The gradation pattern generating unit 710 of the IPU 612 and the gradation pattern generating unit 722 of the printing device 100 generate gradation patterns to be used by the IPU 612 and the printing device 100, respectively.

Figure 17:
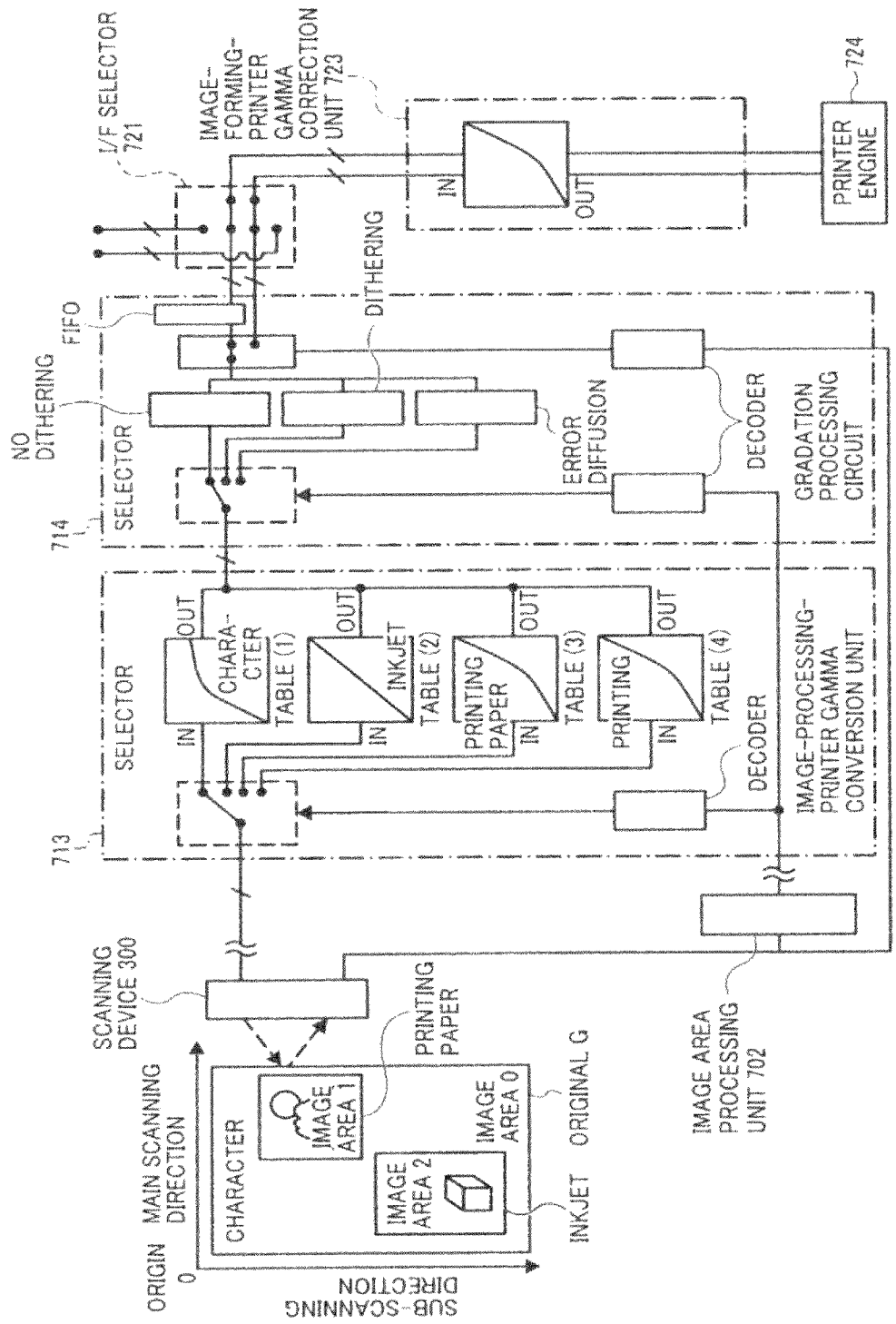
FIG. 17 is a diagram for explaining the concept of image area processing performed by an image area determining unit shown in FIG. 6.

As described above, the image area processing unit 702 generates an image area signal for determining which area in the original G corresponds to currently-processed image data. Based on the image area signal, the image area processing unit 702 sets image processing parameters used in subsequent processing. FIG. 17 is a diagram for explaining the concept of image area processing performed by the image area processing unit 702. Consider a case when the scanning device 300 reads an original G that includes a plurality of image areas such as a character area 0, a printing paper area 1, and an ink jet area 2. Then, the image area processing unit 702 compares information of image areas specified on the original G with information of read positions obtained during image reading and accordingly generates an image area signal. As shown for the image-processing-printer gamma conversion unit 713 and the gradation processing unit 714 in FIG. 17, the IPU 612 uses the image area signal and varies image processing parameters used by the scanner gamma conversion unit 703, the MTF filter 707, the UCR processing unit 709, the image processing unit 712, the image-processing-printer gamma conversion unit 713, and the gradation processing unit 714.

For example, the image-processing-printer gamma conversion unit 713 uses a decoder to decode the image area signal received from the image area processing unit 702 and uses a selector to select a table from a plurality of gradation conversion tables (e.g., a character gradation conversion table 1, an ink jet gradation conversion table 2, a printing paper gradation conversion table 3, and a printing gradation conversion table 4). In the example shown in FIG. 17, the image-processing-printer gamma conversion unit 713 selects the character gradation conversion table 1 for the character area 0, the printing paper gradation conversion table 3 for the printing paper area 1, and the ink jet gradation conversion table 2 for the ink jet area 2.

Similarly, the gradation processing unit 714 also uses a decoder to decode the image area signal and, based on the decoded image area signal, uses a selector to determine the type of gradation processing to be performed on the image signals that are subjected to gradation conversion by the image-processing-printer gamma conversion unit 713. The types of gradation processing are, e.g., processing without using a dithering, processing using dithering, and error diffusion processing. The gradation processing unit 714 performs error diffusion processing on an inkjet original G or an inkjet area of an original G.

More particularly, based on the read position information, the gradation processing unit 714 uses the decoder and selects a line 1 or a line 2 for the image signals after gradation processing. The line 1 or the line 2 is selected for each pixel in the sub-scanning direction. The gradation processing unit 714 temporarily stores the data for the line 1 in a first in first out (FIFO) memory arranged at the downstream of the selector and outputs the data for the line 1 and the line 2 to the I/F selector 721 by reducing the pixel frequency to half.

Figure 18:
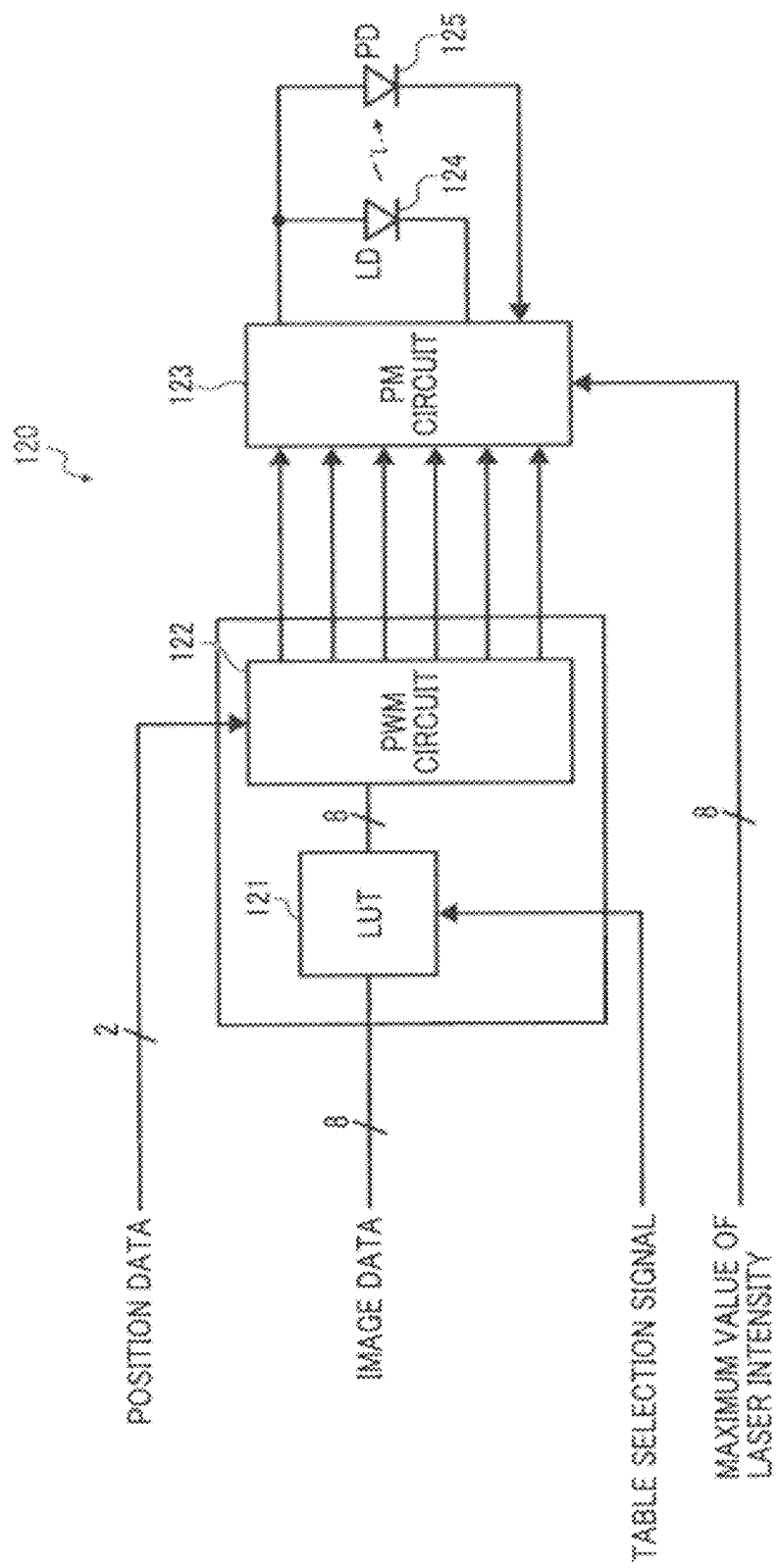
FIG. 18 is an exemplary circuit block diagram of a laser modulation unit in the printing device.

FIG. 18 is an exemplary circuit block diagram of a laser modulation unit 120 in the laser optical system 106 of the printing device 100. The laser modulation unit 120 includes a lookup table (LUT) 121, a pulse width modulation (PWM) circuit 122, and a power modulation (PM) circuit 123. In this laser modulation unit 120, the writing frequency is about 18.6 megahertz and the scanning time per pixel is about 53.8 nanoseconds.

The LUT 121 receives 8-bit image data for gamma conversion. Upon performing gamma conversion, the LUT 121 outputs the image data to the PWM circuit 122. Based on the higher-order 3-bit signals of the 8-bit image data, the PWM circuit 122 converts the image data to 8-valued pulse width and outputs the pulse width to the PM circuit 123. The PM circuit 123 performs 32-valued power modulation based on the lower-order 5-bit signals of the 8-bit image data. The PM circuit 123 is connected to a laser diode (LD) 124 and a photo detector (PD) 125. The PM circuit 123 causes the LD 124 to emit light corresponding to the modulated signals, monitors the intensity of emission from the LD 124 based on a monitor signal from the PD 125, and corrects the intensity of emission for each dot. Meanwhile, it is possible to vary the maximum value of the laser light intensity from the LD 124 to eight bits (256 levels) independent of the image signals.

In the case 600 dots per inch (DPI) and pixel size of 42.3 micrometers, the beam diameter of laser light emitted from the LD 124 is about 50 micrometers in the main scanning direction and about 60 micrometers in the sub-scanning direction. The beam diameter is defined as the width of the beam when the beam intensity during a stationary state is attenuated to $1/e2$ of the maximum beam intensity.

The laser modulation unit 120 is arranged corresponding to the image data of the line 1 and the line 2 described with reference to FIG. 17. The image data of the line 1 and line 2 is synchronized and scanned on the photosensitive drums 104K, 104Y, 104M, and 104C along the main scanning direction.

Figure 19:
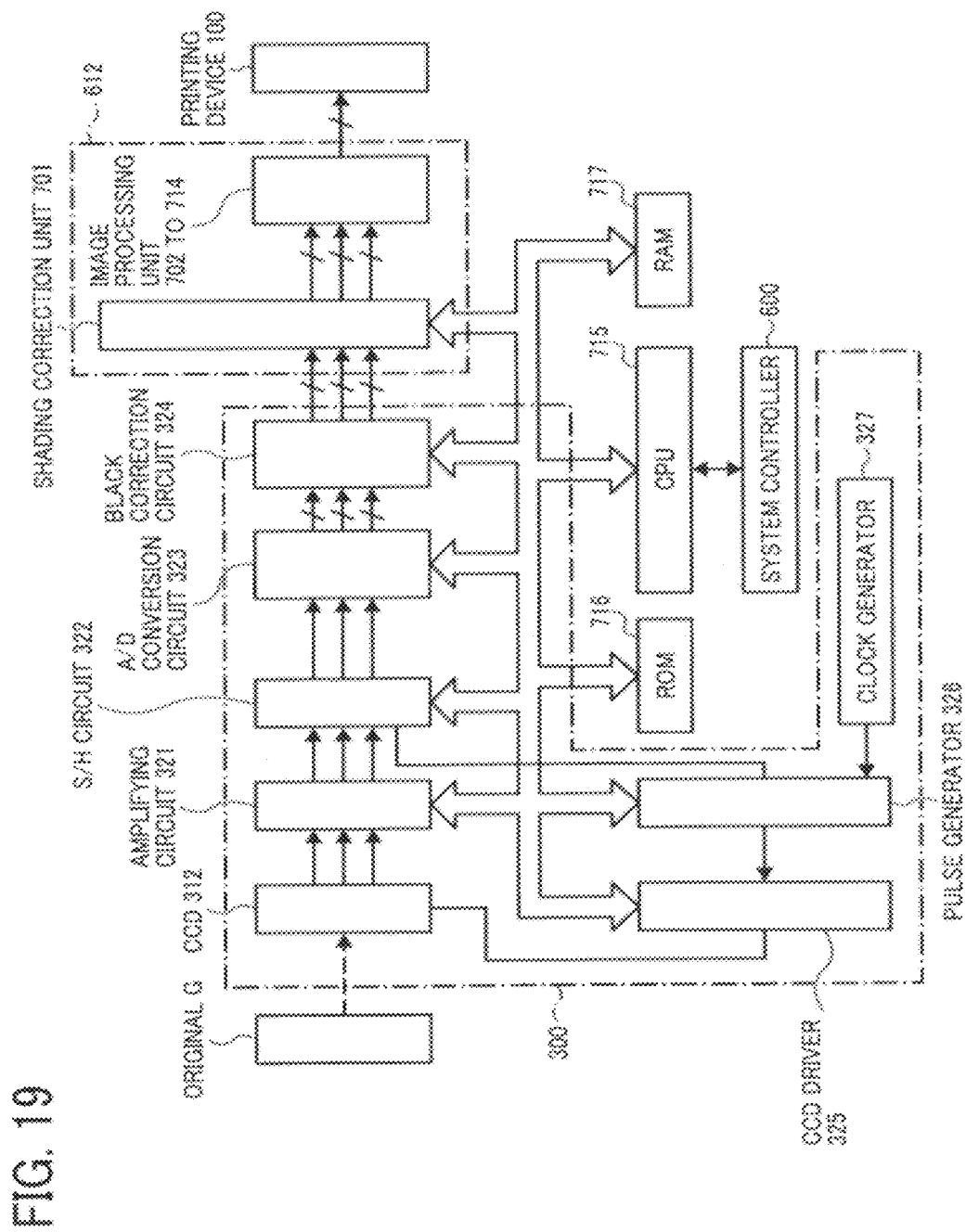
FIG. 19 is an exemplary circuit block diagram of the scanning device.

FIG. 19 is an exemplary circuit block diagram of the scanning device 300. The scanning device 300 includes the CCD 312, an amplifying circuit 321, a sample hold (S/H) circuit 322, an analog-to-digital (A/D) conversion circuit 323, a black correction circuit 324, a CCD driver 325, a pulse generator 326, and a clock generator 327.

As described with reference to FIG. 3, the halogen lamp 302 in the scanning device 300 irradiates an original G. The CCD 312 then uses an RGB filter to perform color separation of the reflected light from the original G, reads an image on the original G, and outputs an analog image signal to the amplifying circuit 321. The CCD driver 325 supplies a pulse signal for driving the CCD 312. The pulse generator 326 generates a pulse source required to drive the CCD driver 325 by using a clock signal oscillated by the clock generator 327, which includes a crystal oscillator, as a reference signal. Moreover, the pulse generator 326 supplies a timing signal required by the S/H circuit 322 to sample-hold the analog image signal.

The amplifying circuit 321 amplifies the analog image signal to a predetermined level and outputs the amplified signal to the S/H circuit 322. The S/H circuit 322 sample-holds the amplified signal and outputs the sample-held signal to the A/D conversion circuit 323. The A/D conversion circuit 323 converts the sample-held to, e.g., an 8-bit digital signal and outputs the digital signal to the black correction circuit 324. The black correction circuit 324 reduces the fluctuation in black level (i.e., an electric signal at small amount of light) between chips and between pixels of the CCD 312 with respect to the digital signal such that the black portion in the image data does not have linear stripes or unevenness. The black correction circuit 324 then outputs the image data to the shading correction unit 701 of the IPU 612.

Figure 20:
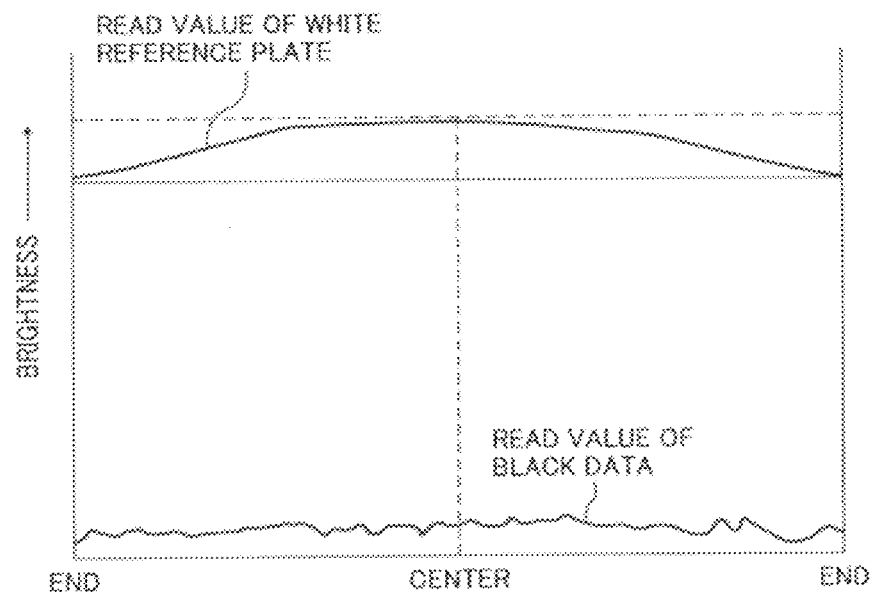
FIG. 20 is a graph for explaining white level correction and black level correction performed by a shading correction unit shown in FIG. 19.

The shading correction unit 701 corrects white level (i.e., an electric signal at large amount of light) by correcting the sensitivity fluctuation in the irradiation system, the optical system, and the CCD 312 based on white color data obtained when the scanning device 300 is moved to a position of a uniform white reference plate and irradiated (see FIG. 20).

The image data output from the shading correction unit 701 is subjected to image processing starting from the image area processing unit 702 to the gradation processing unit 714. Subsequently, the printing device 100 records and prints the image data. Meanwhile, the CPU 715 controls the abovementioned components based on programs and data stored in the ROM 716 and the RAM 717.

Figure 21:
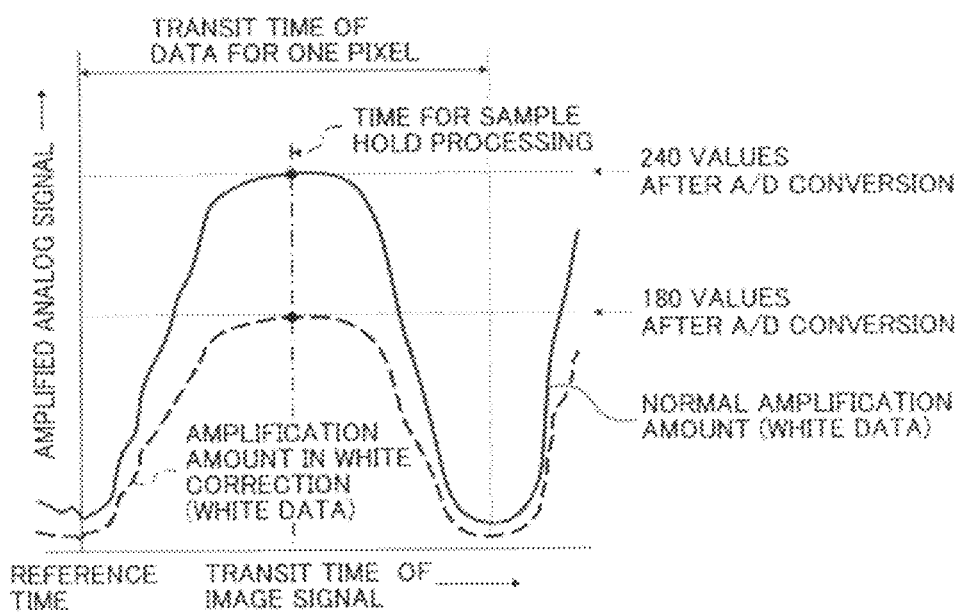
FIG. 21 is a graph for explaining a sample-hold processing performed by a sample hold (S/H) circuit shown in FIG. 6.

The amount of amplification by the amplifying circuit 321 is determined such that, with respect to a specific image density on an original G, the output value of the A/D conversion circuit 323 is maintained at a desired level. For example, during a normal copying operation, 240 values in an 8-bit signal value are obtained for an image density of 0.05 (reflectivity of 0.891) on an original G. Moreover, the gain from amplification is reduced such that the sensitivity during shading correction increases. The reason for taking such a measure is that because the amplification ratio during a normal copying operation gets saturated at 255 values when reflected light is high and when an image signal toner has the size exceeding 255 values in 8-bit signal, error occurs in shading correction. FIG. 21 is a graph for explaining a case when an image reading signal amplified by the amplifying circuit 321 is sample-held by the S/H circuit 322. In FIG. 21, the horizontal axis represents time when the amplified analog image signal passes through the S/H circuit 322 and the vertical axis represents the magnitude of the amplified analog signal. The analog signal is sample-held for a predetermined sample-hold time and then sent to the A/D conversion circuit 323. The image signal in FIG. 21 is a signal for which the white level is read and the amplified image signal has, e.g., 240 values after A/D conversion during a copying operation and 180 values during a white correction operation.

While using the joint output function as described above, the image processing apparatus 1 performs scanner calibration described below at least once in advance.

Figure 22:
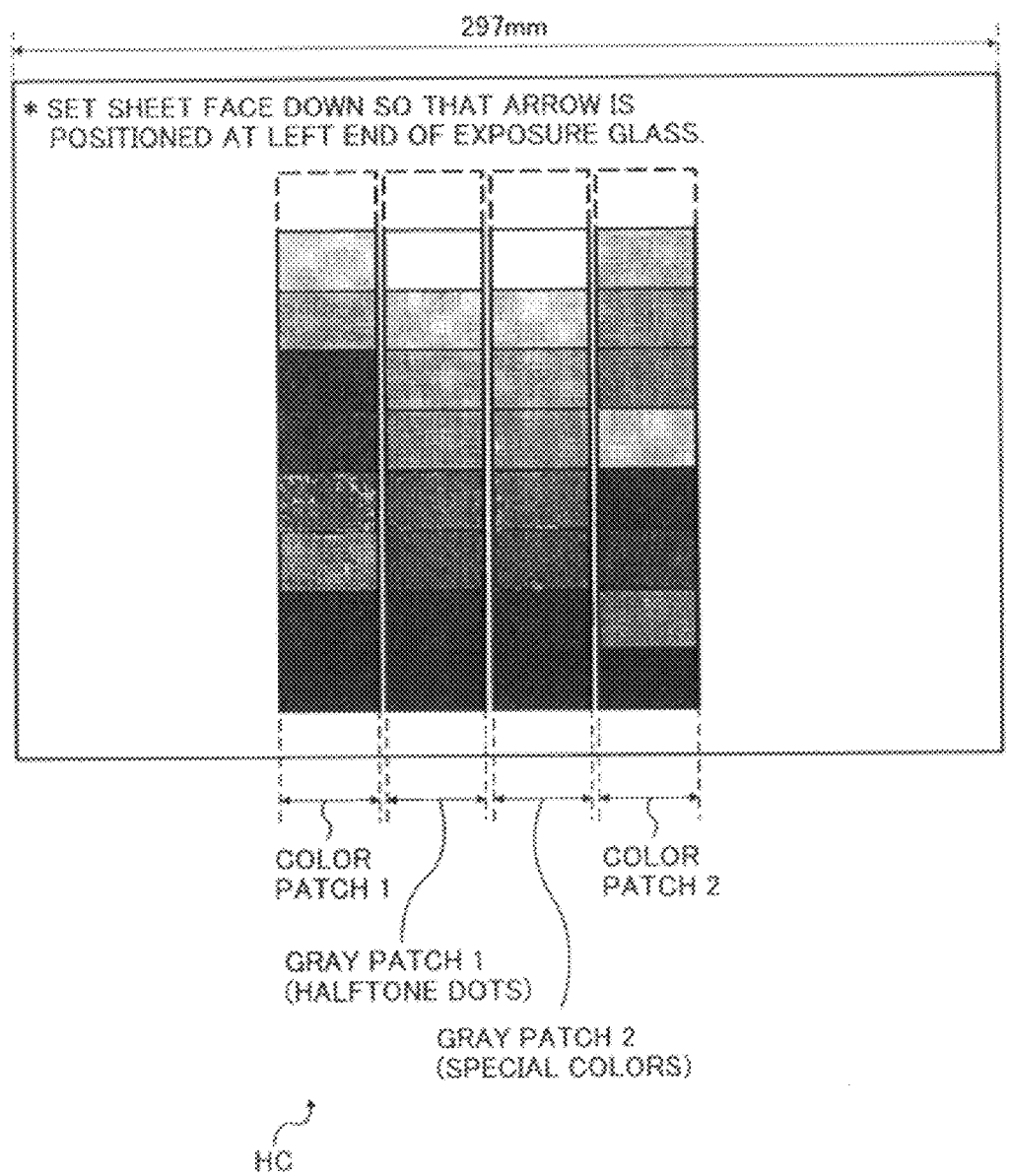
FIG. 22 is a diagram of an exemplary color correction chart used in scanner calibration.

The scanner calibration is performed, e.g., by using a color correction chart HC shown in FIG. 22 as a calibration reference chart. Normally, in a color correction chart, hue areas having a boundary surface along a brightness axis in a color space are represented as chromatic patches drawn with colors. However, because FIG. 22 is a patent drawing, the hue areas in the color correction chart HC are represented only in black and white colors with distinguishable hatching.

The color correction chart HC is a patch chart that includes a plurality of achromatic patches and chromatic patches. The achromatic patches (grayish patches or black patches) having different image densities are arranged in the central part of the color correction chart HC. The chromatic patches are patches of colors having different hues and are arranged on the left and the right sides of the achromatic patches. The patches are arranged on a sheet of recording medium such as paper. One of the two gray patches in the center is a gradation pattern printed in a 3C gray ink, which is an achromatic ink obtained by superimposing Y, M, and C; while the other gray patch is a gradation pattern printed only by a black ink. With respect to the main scanning direction of the scanning device 300, the patches in the color correction chart HC are arranged in the following order: white patch 1 (background), chromatic patch 1, black patch 1, black patch 2, chromatic patch 2, and white patch 2 (background). By arranging each chromatic patch between a white (background) patch and a black patch, it is possible to reduce the effect of flare light from the surrounding patches (particularly black patches). Flare light is the reflected light from the surface of an original surrounding the patches. On the other hand, if the patches are arranged in the order of white patch 1 (background), black patch 1, chromatic patch 1, black patch 2, chromatic patch 2, and white patch 2 (background), then the chromatic patch 1 is affected by black patches on both sides thereby darkening the read value of the scanning device 300. To avoid such a problem, the former arrangement is adopted.

Figure 43:
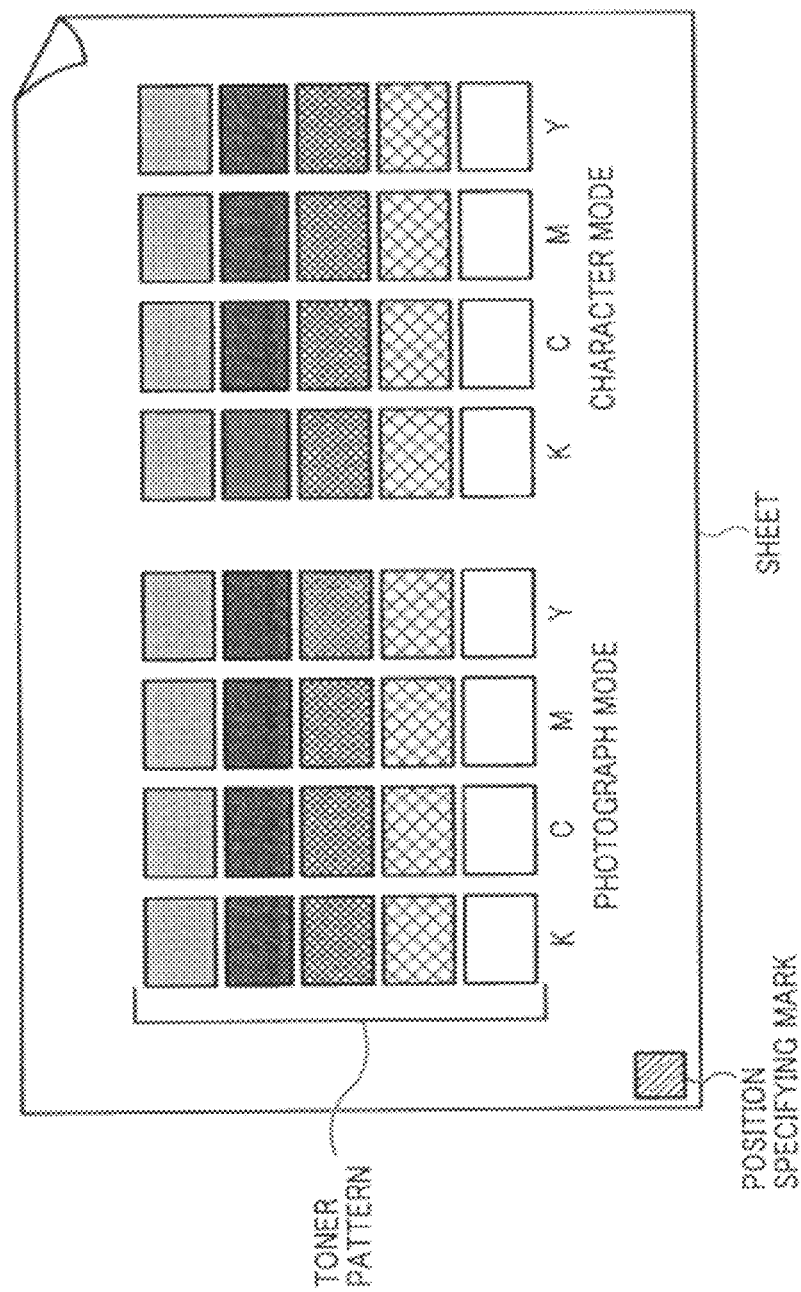
FIG. 43 is a diagram of exemplary gradation patterns output on a transfer sheet after ACC.

The size of each patch in the color correction chart HC is about four times larger than the size of patches in ACC patterns described later (see FIG. 43). That reduces the effect of flare light in the scanning device 300.

As shown in FIG. 22, the patches are substantially concentrated around the central part of the color correction chart HC along the main scanning direction of the scanning device 300. That is because the ends of the scanning device 300 in the main scanning direction tend to be darker than the central portion. Moreover, the patches in the color correction chart HC are arranged within a readable range of ACC patterns. Such an arrangement allows the use of an ACC-pattern reading software while creating an application program.

In all, there are 16 chromatic patches in the color correction chart HC. Out of the 16 chromatic patches, 12 chromatic patches correspond to hue division points (e.g., color between yellow and yellow red) of hue masking coefficients of 12 hues, namely, yellow, yellow red, red, red magenta, magenta, blue, blue cyan, cyan green, green, and green yellow that are obtained by dividing six hues of yellow, red, magenta, blue, cyan, and green. The remaining four chromatic patches are reference chromatic patches of yellow, green, red, and orange used for visual evaluation on a copy. Given below are exemplary hue angles h* of the chromatic patches in the color correction chart HC, where a hue angle h* is 0≦h*<360° with respect to a brightness L*, a saturation C*, and hue h.

Yellow Red: h*=1°
Orange: h*=26°
Red Yellow: h*=47°
Red: h*=54°
Red Magenta: h*=60°
Magenta Red: h*=84°
Magenta Blue: h*=95°
Blue Magenta: h*=139°
Blue Cyan: h*=170°
Cyan Blue: h*=207°
Cyan Green: h*=232°
Green Cyan: h*=277°
Green: h*=291°
Green Yellow: h*=313°
Yellow Green: h*=352°
Yellow: h*=356°

During scanner calibration, the color correction chart HC is read and, based on the reading result, a scanner gamma conversion table is created for correcting machine difference in the scanning device 300.

Figure 23:
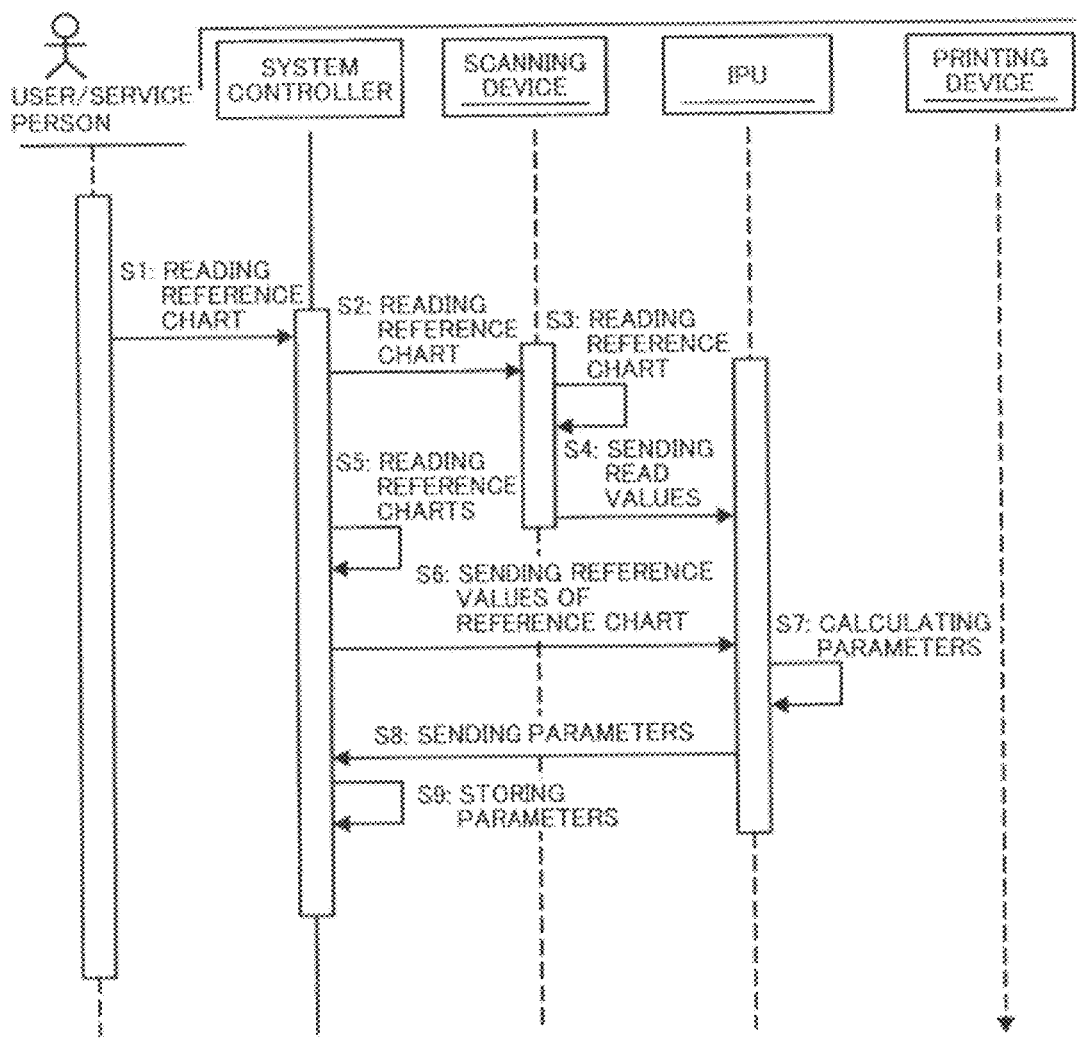
FIG. 23 is a sequence diagram for explaining a sequence of scanner calibration.

FIG. 23 is a sequence diagram for explaining a sequence of creating the scanner gamma conversion table.

Figure 24:
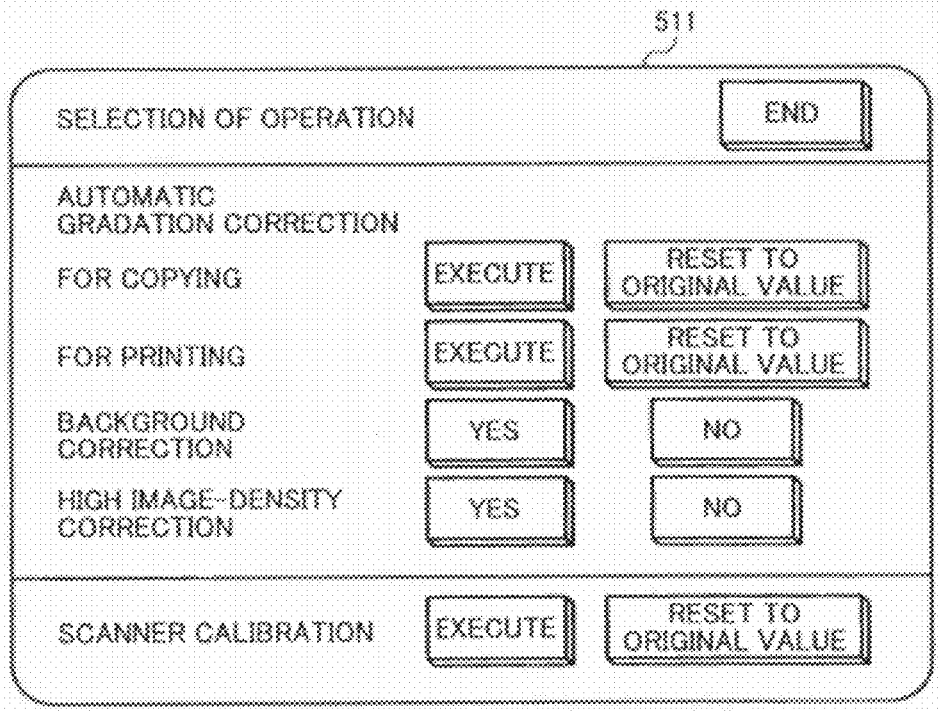
FIG. 24 is a diagram of an exemplary mode selection screen displayed on a liquid crystal display of the operating panel.
Figure 25:
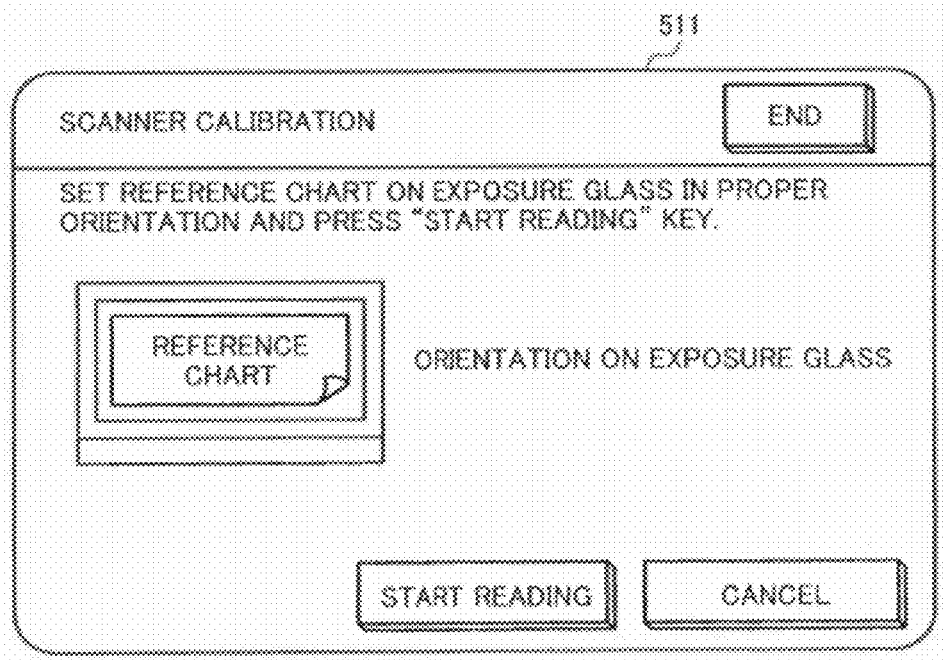
FIG. 25 is a diagram of an exemplary start screen for scanner calibration displayed on the liquid crystal display.

First, a user or a service person selects various setting modes from the liquid crystal display 511. FIG. 24 is a diagram of an exemplary mode selection screen displayed on the liquid crystal display 511. Pressing of a 'scanner calibration' key initiates the process of scanner calibration. In that case, the liquid crystal display 511 displays a start screen for scanner calibration as shown in FIG. 25. In the scanner calibration mode, the user places the color correction chart HC on the exposure glass 3 as an original and presses a 'start reading' key in the scanner calibration screen (Step S1).

Subsequently, the system controller 600 instructs the scanning device 300 to read the color correction chart HC (Step S2). The scanning device 300 reads the color correction chart HC and obtains the read values of R, G, and B signals corresponding to the patches in the color correction chart HC (Step S3). The scanning device 300 then sends the read values to the IPU 612 (Step S4).

Figure 26:
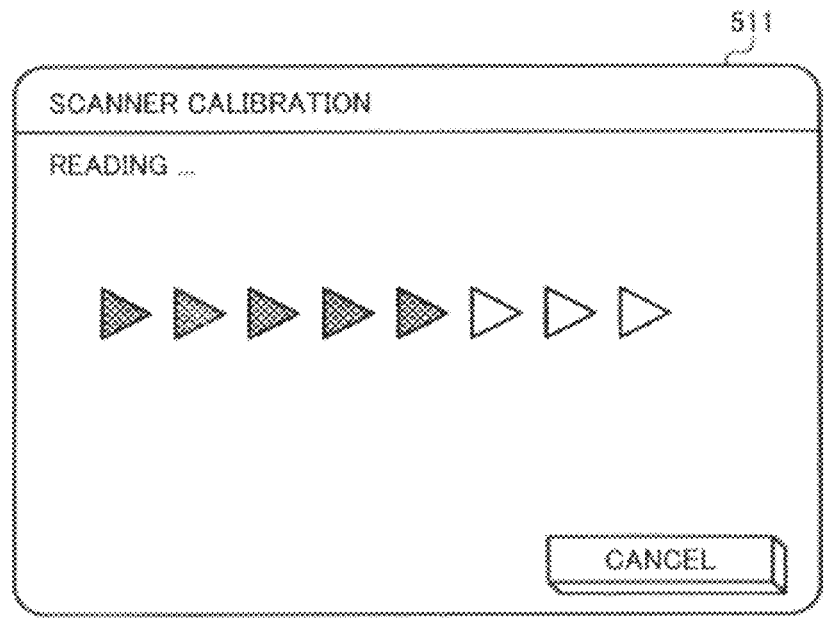
FIG. 26 is a diagram of an exemplary message screen displayed on the liquid crystal display indicating the user that a process of reading in a scanner calibration mode is currently underway.

Meanwhile, the system controller 600 reads reference read values of the color correction chart HC from an internal nonvolatile RAM (Step S5) and sends the reference read values to the IPU 612 (Step S6). During the process of reading the color correction chart HC, a message screen is displayed on the liquid crystal display 511 indicating the user that the process of reading in a scanner calibration mode is currently underway (see FIG. 26).

Upon receiving the read values and the reference read values, the IPU 612 calculates image processing parameters (Step S7) and sends them to the system controller 600 (Step S8).

The system controller 600 stores the image processing parameters in the nonvolatile RAM (Step S9).

Figure 27:
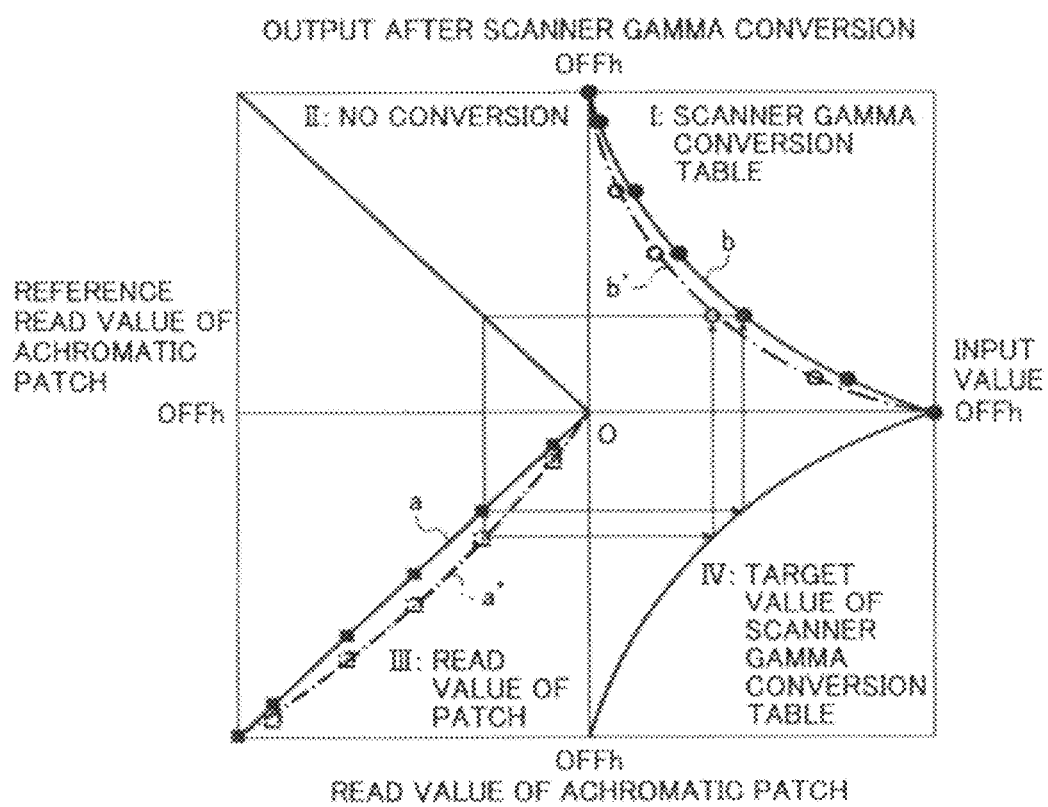
FIG. 27 is a quaternary chart used to explain scanner calibration.

Given below is a method of creating the scanner gamma conversion table based on the read values of achromatic patches in the color correction chart HC with reference to a quaternary chart shown in FIG. 27.

A first quadrant (I) of the quaternary chart represents an intended scanner gamma conversion table where the horizontal axis represents an input value to the scanner gamma conversion table and the vertical axis represents an output after the scanner gamma conversion. In a fourth quadrant (IV), the vertical axis represents read values of the achromatic patches and the graph shows a target value (reference value) for obtaining the scanner gamma conversion table from the read values of the achromatic patches. In a third quadrant (III), the horizontal axis represents the reference read values of the achromatic patches and the graph shows the result of reading the achromatic patches by the scanning device 300. In a second quadrant (II), the graph represents no conversion (i.e., through).

Based on the characteristics in the quaternary chart, scanner gamma conversion tables b, b' in the first quadrant (I) are created from read values a, a' in the third quadrant (III).

Meanwhile, regarding the target value of the read values in the fourth quadrant (IV), it is possible to set a separate value corresponding to each of the R, G, and B components in the scanner gamma conversion table or an identical value corresponding to the R, G, and B components.

In this way, the scanner gamma conversion table for correcting machine difference in the scanning device 300 is created.

Figure 28:
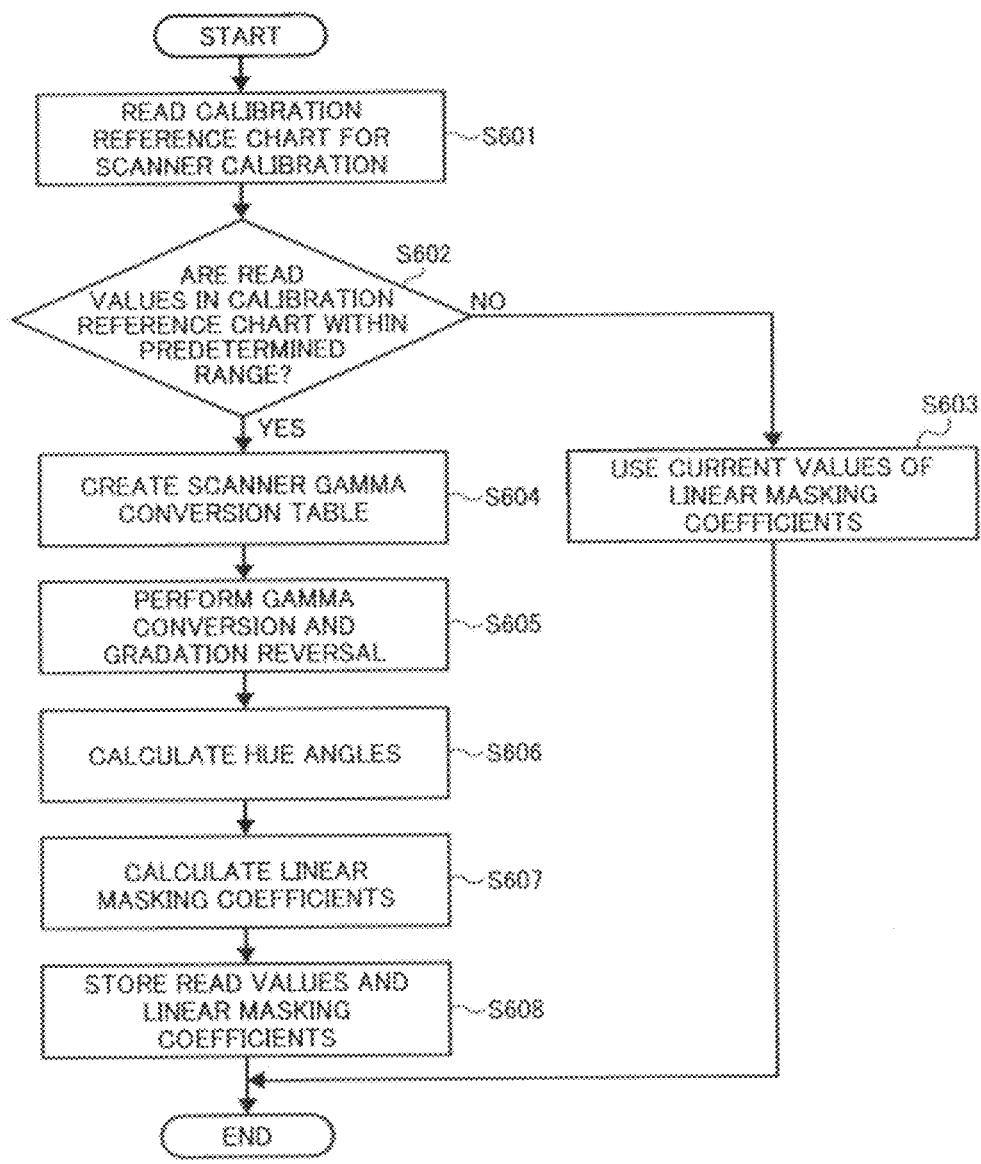
FIG. 28 is a flowchart for explaining an exemplary process of scanner calibration.

FIG. 28 is a flowchart for explaining a process of scanner calibration. During scanner calibration, hue evaluation values Fx' and masking coefficients of hue areas are calculated based on the result of reading the color correction chart HC.

When the operating panel 500 issues a read instruction, the scanning device 300 reads the color correction chart HC (Step S601). Subsequently, it is determined whether the read values of the color correction chart HC are within a predetermined range (Step S602).

If the read values are not within the predetermined range (No at Step S602), it is assumed that an original other than the color correction chart HC is placed on the scanning device 300. Consequently, current values of linear masking coefficient are used (Step S603) and the processing is completed.

On the other hand, if the read values are within the predetermined range (Yes at Step S602), the scanner gamma conversion table is created (Step S604). As described above, the achromatic patches in the color correction chart HC are used to create the scanner gamma conversion table such that machine difference in the scanning device 300 decreases.

Based on the scanner gamma conversion table, gamma conversion and gradation reversal of the read values is performed (Step S605). More particularly, if a first patch having 10-bit accuracy has a read value S[I] of R, G, and B components, then a scanner gamma conversion is performed on the read value S[1] to obtain f(S[I]) and gradation reversal is performed to obtain S'[I]. In that case, a condition S'[I]=S[White]−f(S[I]) is established. S[1] includes the three components of R, G, and B, and S[White] is a white reference value for the R, G, and B components. The scanner gamma conversion is performed to enhance color reproducibility. Moreover, because of the scanner gamma conversion, color manageability can also be enhanced by increasing the value of a color having high color saturation and decreasing the value of a color having low color saturation.

Subsequently, hue angles are calculated (Step S606). Based on the read value (Dr,bg,Db) (=Ri, Gi, Bi (i=number of each patch)) of R, G, and B of each patch in the color correction chart HC, Equations (13) to (29) are used to calculate the parameters GR, GB, and Fx' such that the R, G, and B image data of the read original can be divided for each hue.

Then, the linear masking coefficients are calculated for each patch based on the corresponding read values Ri, Gi, and Bi (i=number of the patch) by using Equation (36) given below (Step S607).

$$\begin{pmatrix} aYB(3'\text{-}4') & aYG(3'\text{-}4') & aYR(3'\text{-}4') & aY(3'\text{-}4') \\ aMB(3'\text{-}4') & aMG(3'\text{-}4') & aMR(3'\text{-}4') & aM(3'\text{-}4') \\ aCB(3'\text{-}4') & aCG(3'\text{-}4') & aCR(3'\text{-}4') & aC(3'\text{-}4') \\ aKB(3'\text{-}4') & aKG(3'\text{-}4') & aKR(3'\text{-}4') & aK(3'\text{-}4') \end{pmatrix} = \qquad (36)$$

$$\begin{pmatrix} Y(1) & Y(2) & Y(3) & Y(4) \\ M(1) & M(2) & M(3) & M(4) \\ C(1) & C(2) & C(3) & C(4) \\ K(1) & K(2) & K(3) & K(4) \end{pmatrix} \times$$

$$\begin{pmatrix} B(1)+\Delta B(1) & B(2)+\Delta B(2) & B(3)+\Delta B(3) & B(4)+\Delta B(4) \\ G(1)+\Delta G(1) & G(2)+\Delta G(2) & G(3)+\Delta G(3) & G(4)+\Delta G(4) \\ R(1)+\Delta R(1) & R(2)+\Delta R(2) & R(3)+\Delta R(3) & R(4)+\Delta R(4) \\ 1 & 1 & 1 & 1 \end{pmatrix}^{-1}$$

The method of calculating the linear masking coefficients is described below in detail. It is assumed that a scanner CCD having standard spectral characteristics reads a point on a boundary surface not existing on an achromatic axis to obtain a read value (Ri, Gi, Bi) (i=hue 1 to hue 4). When a CCD having different spectral characteristics reads the same point, a read value (Ri', Gi', Bi') (i=hue 1 to hue 4) is obtained. Consequently, the recording values of the developing units for C, M, Y, and K are calculated as (Ci', Mi', Yi', Ki') (i=hue 1 to hue 4). Thus, Equation (32) can also be represented as Equation (37) given below.

$$\begin{pmatrix} Y(1') & Y(2') & Y(3') & Y(4') \\ M(1') & M(2') & M(3') & M(4') \\ C(1') & C(2') & C(3') & C(4') \\ K(1') & K(2') & K(3') & K(4') \end{pmatrix} = \qquad (37)$$

$$\begin{pmatrix} aYB(3'\text{-}4') & aYG(3'\text{-}4') & aYR(3'\text{-}4') & aY(3'\text{-}4') \\ aMB(3'\text{-}4') & aMG(3'\text{-}4') & aMR(3'\text{-}4') & aM(3'\text{-}4') \\ aCB(3'\text{-}4') & aCG(3'\text{-}4') & aCR(3'\text{-}4') & aC(3'\text{-}4') \\ aKB(3'\text{-}4') & aKG(3'\text{-}4') & aKR(3'\text{-}4') & aK(3'\text{-}4') \end{pmatrix}$$

$$\begin{pmatrix} B(1') & B(2') & B(3') & B(4') \\ G(1') & G(2') & G(3') & G(4') \\ R(1') & R(2') & R(3') & R(4') \\ 1 & 1 & 1 & 1 \end{pmatrix}$$

Moreover, Equation (38) can be obtained by approximating (R(I'), G(I'), B(I')) to (R(i)+ΔR(i), G(i)+ΔG(i), B(i)+ΔB(i)) (i=hue 1 to hue 4).

$$\begin{pmatrix} Y(1')Y(2')Y(3')Y(4') \\ M(1')M(2')M(3')M(4') \\ C(1')C(2')C(3')C(4') \\ K(1')K(2')K(3')K(4') \end{pmatrix} = \qquad (38)$$

$$\begin{pmatrix} aYB(3'\text{-}4')aYG(3'\text{-}4')aYR(3'\text{-}4')aY(3'\text{-}4') \\ aMB(3'\text{-}4')aMG(3'\text{-}4')aMR(3'\text{-}4')aM(3'\text{-}4') \\ aCB(3'\text{-}4')aCG(3'\text{-}4')aCR(3'\text{-}4')aC(3'\text{-}4') \\ aKB(3'\text{-}4')aKG(3'\text{-}4')aKR(3'\text{-}4')aK(3'\text{-}4') \end{pmatrix} \times$$

$$\begin{pmatrix} B(1)+\Delta B(1) & B(2)+\Delta B(2) & B(3)+\Delta B(3) & B(4)+\Delta B(4) \\ G(1)+\Delta G(1) & G(2)+\Delta G(2) & G(3)+\Delta G(3) & G(4)+\Delta G(4) \\ R(1)+\Delta R(1) & R(2)+\Delta R(2) & R(3)+\Delta R(3) & R(4)+\Delta R(4) \\ 1 & 1 & 1 & 1 \end{pmatrix}^{-1}$$

where, ΔRi=kR{(R component of current chromatic value of hue i)−(R component of reference chromatic value of hue i)}, ΔGi=kG{(G component of current chromatic value of hue i)−(G component of reference chromatic value of hue i)}, and ΔBi=kB{(B component of current chromatic value of hue i)−(B component of reference chromatic value of hue i)}.

That is, instead of using the actual read value (Ri', Gi', Bi'), a difference between a reference value of a reference chromatic patch and a read value is multiplied by a predetermined coefficient kX (X=R, G, and B) and the product is added to a scanner vector (Ri, Gi, Bi) (i=1, 2, 3, 4) that includes R, G, and B components and is stored in advance. If the scanner vector (Ri, Gi, Bi) is identical to a chromatic reference patch from which the reference values of the chromatic patches in the color correction chart HC and the read values are obtained, then the coefficient kX is given as kX=1 (X=R, G, B).

Meanwhile, depending on the fluctuation in machine difference in the scanning device 300, a combination of a current value and a reference value during scanner calibration can be selected from the operating panel 500.

More particularly, when a scanner calibration menu is invoked from the liquid crystal display 511, a scanner calibration screen shown in FIG. 29 is displayed thereon. The scanner calibration screen includes keys for selecting a combination of a reference value and a current value. If a 'factory setting value' key is pressed to select reference values, then a list of factory setting values, which are standard read values of the patches in the color correction chart HC, is displayed on the liquid crystal display 511 (see FIG. 30). When a 'read values' key is pressed to select current values, then a list of read values is displayed on the liquid crystal display 511 (see FIG. 31). Note that the factory setting values or the read values are modifiable.

For example, in the case of the scanning device 300 in which the read value of the reference patch undergoes only a small temporal fluctuation, the factory setting value (i.e., standard read value) can be set as the current value and a design value (fixed value) in a ROM can be set as the reference value. The design value is the read value of I-th chromatic patch when (Ri), (Gi), and (Bi) given in Equation (38) are determined. As the factory setting values, the current values are calculated by using a chart that includes chromatic patches for which the colors are controlled in advance. When there is fluctuation (e.g., lot difference) in colors of the chromatic patches, the coefficient kX (X=R, G, and B) is reduced in inverse proportion to a color difference from the design value. The coefficient kX is calculated based on a color difference of an L*a*b component of a CIE Lab color difference between the reference patch for which ΔE*ii is used to design an ii-th patch and the reference patch used for adjustment in the factory.

Thus, in the case of ΔE*ii≦1: kX=1 (X=R,G,B),
in the case of 1<E*ii≦2: kX=0.75 (X=R,G,B),
in the case of 2<E*ii≦4: kX=0.5 (X=R,G,B),
in the case of 4<E*ii≦8: kX=0.25 (X=R,G,B), and
in the case of 8<E*ii: kX=0.0 (X=R,G,B).

Moreover, in the abovementioned case, instead of using the factory setting value as the current value, it is also possible to use the current values read in the color correction chart HC during each scanner calibration as the read values. As the reference value, the design value stored in a ROM is used. The coefficient kX (X=R, G, and B) can be calculated as described above.

When correction is performed by using a color correction chart HC in which, due to difference in printing lots, a color of a reference patch used for the design is different by an amount equal to or higher than a predetermined value, then a scanner calibration screen shown in FIG. 32 is used. In that case, standard read values of a color correction chart HC having different colors are set as factory setting values, while values obtained by causing the corresponding image processing apparatus 1 to read the color correction chart HC are used as current values. The coefficients in this case are set, as shown in FIG. 32, as correction coefficients inversely proportional to fluctuation (standard error) in the colors in the printing lot. When the standard error is large, the coefficient kX (X=R, G, and B) is set to a value close to 0 and, when the standard error is small, the coefficient kX (x=R, G, and B) is set to a value equal to or close to 1.

Meanwhile, the liquid crystal display 511 is a touch panel. Thus, modification of a setting value can be performed by selecting the setting value, inputting new parameters from the numeric keypad 503, and pressing an enter key.

If a personal computer (PC) is connected to the image processing apparatus 1 via any one of the LAN cable 1000, a USB cable, a RS-232C cable, a centronics cable, or the like, and if the screens shown in FIGS. 30 to 32 are displayed on the PC, then it is also possible to set or modify the values from the PC.

Equation (39) given below is used to calculate the linear masking coefficient aPS (i-j) (P=Y, M, C, K, S=B, G, R; i,j=1, 2, 3, 4, j=1, 2, 3, 4) for which the left sides of Equations 32 and 37 are (Y(i), M(i), C(i), K(i))=(Y(i'), M(i'), C(i'), K(i')) (hue i=1, 2, 3, 4).

$$\begin{pmatrix} Y(1) & Y(2) & Y(3) & Y(4) \\ M(1) & M(2) & M(3) & M(4) \\ C(1) & C(2) & C(3) & C(4) \\ K(1) & K(2) & K(3) & K(4) \end{pmatrix} \approx \qquad (39)$$

$$\begin{pmatrix} aYB(3'-4') & aYG(3'-4') & aYR(3'-4') & aY(3'-4') \\ aMB(3'-4') & aMG(3'-4') & aMR(3'-4') & aM(3'-4') \\ aCB(3'-4') & aCG(3'-4') & aCR(3'-4') & aC(3'-4') \\ aKB(3'-4') & aKG(3'-4') & aKR(3'-4') & aK(3'-4') \end{pmatrix} \times$$

$$\begin{pmatrix} B(1)+\Delta B(1) & B(2)+\Delta B(2) & B(3)+\Delta B(3) & B(4)+\Delta B(4) \\ G(1)+\Delta G(1) & G(2)+\Delta G(2) & G(3)+\Delta G(3) & G(4)+\Delta G(4) \\ R(1)+\Delta R(1) & R(2)+\Delta R(2) & R(3)+\Delta R(3) & R(4)+\Delta R(4) \\ 1 & 1 & 1 & 1 \end{pmatrix}$$

Equation (36) is obtained by multiplying both sides of Equation 39 with Matrix 41, which is an inverse matrix of Matrix 40.

$$\begin{pmatrix} B(1)+\Delta B(1) & B(2)+\Delta B(2) & B(3)+\Delta B(3) & B(4)+\Delta B(4) \\ G(1)+\Delta G(1) & G(2)+\Delta G(2) & G(3)+\Delta G(3) & G(4)+\Delta G(4) \\ R(1)+\Delta R(1) & R(2)+\Delta R(2) & R(3)+\Delta R(3) & R(4)+\Delta R(4) \\ 1 & 1 & 1 & 1 \end{pmatrix} \qquad (40)$$

$$\begin{pmatrix} B(1)+\Delta B(1) & B(2)+\Delta B(2) & B(3)+\Delta B(3) & B(4)+\Delta B(4) \\ G(1)+\Delta G(1) & G(2)+\Delta G(2) & G(3)+\Delta G(3) & G(4)+\Delta G(4) \\ R(1)+\Delta R(1) & R(2)+\Delta R(2) & R(3)+\Delta R(3) & R(4)+\Delta R(4) \\ 1 & 1 & 1 & 1 \end{pmatrix}^{-1} \qquad (41)$$

Finally, the read values and the linear masking coefficients are stored in a memory unit such as a nonvolatile RAM or a RAM (Step S608), and the processing is completed.

Figure 33:
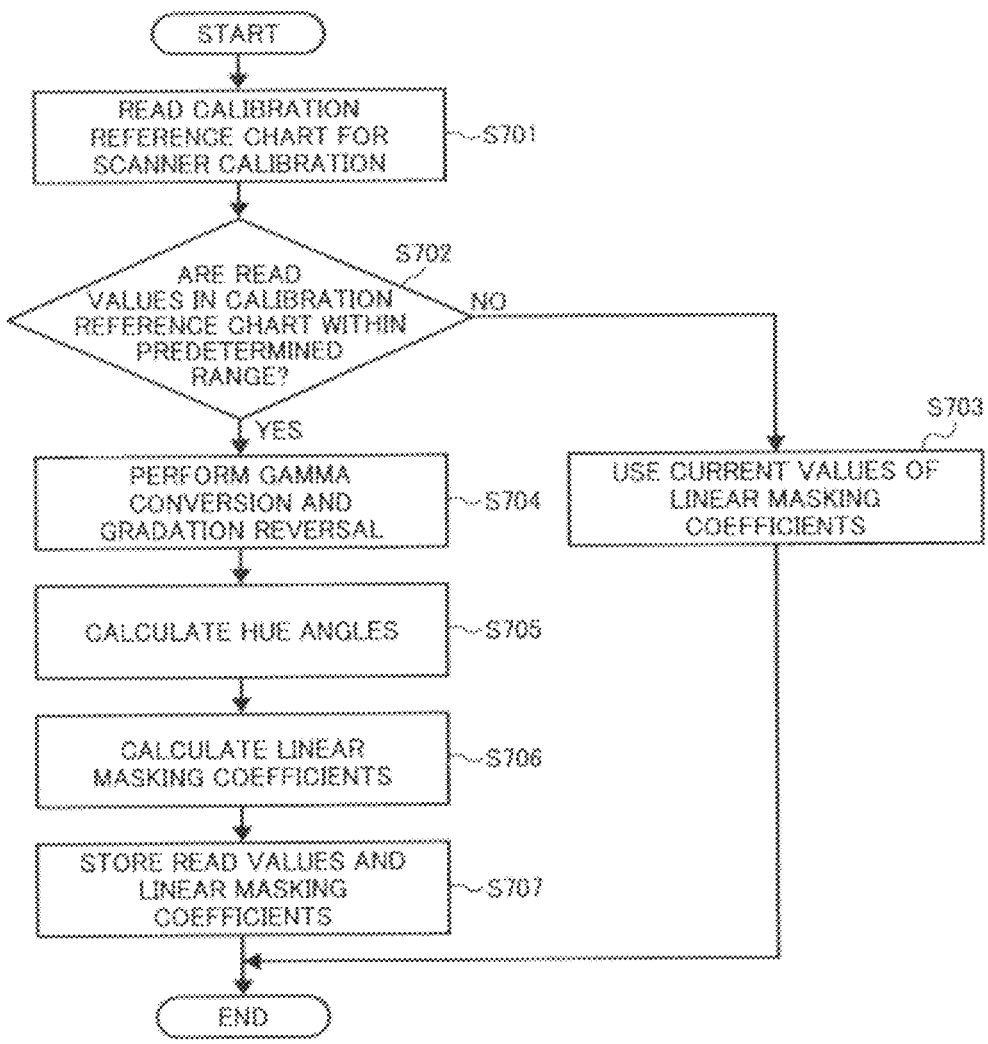
FIG. 33 is a flowchart for explaining another exemplary process of scanner calibration.

Meanwhile, instead of creating the scanner gamma conversion table at Step S604, it is also possible to use a predetermined scanner gamma conversion table stored in advance for the conversion of a chromatic reference patch (see FIG. 33).

Figure 34:
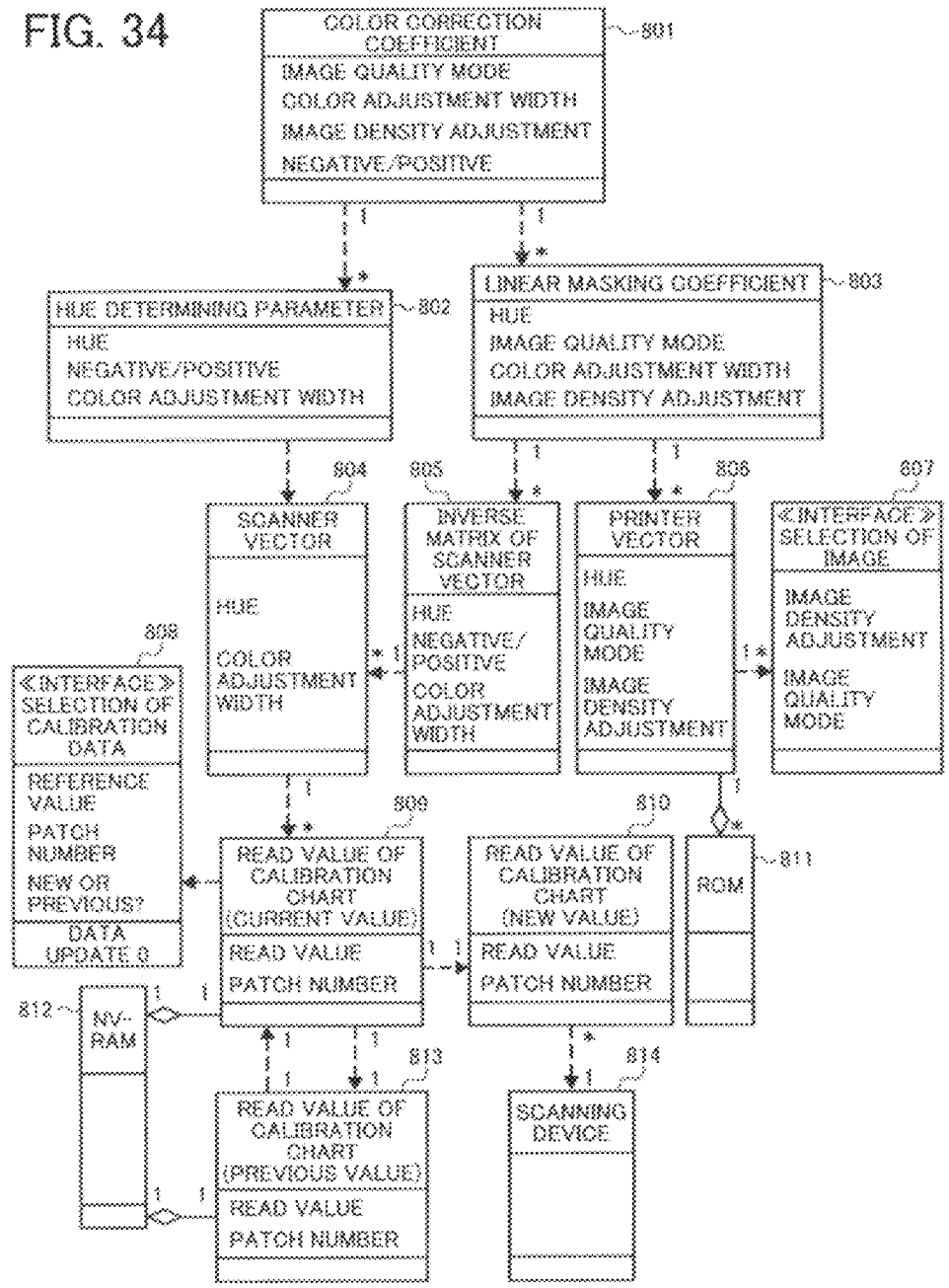
FIG. 34 is an exemplary class diagram of scanner calibration.

FIG. 34 is an exemplary class diagram of scanner calibration. The class diagram includes a class 801 for color correction coefficients used for copying (i.e., a resistor value set in a color correction circuit that is an application specific integrated circuit (ASIC)), a class 802 for hue determination parameters, a class 803 for linear masking coefficients, a class 804 for scanner vectors, a class 805 for parameters of inverse matrices of scanner vectors, a class 806 for printer vectors, a class 807 for image density selection I/F in the operating panel 500, a class 808 for calibration data selection I/F in the operating panel 500, a class 809 for current read values of the color correction chart HC as an object, a class 810 for new read values of the color correction chart HC as an object, a class 811 for ROM, a class 812 for NV-RAM, a class 813 for previous read values of the color correction chart HC as an object, and a class 814 for scanning device.

As shown in the class diagram, the class 801 for color correction coefficients can be calculated based on the class 802 for hue determination parameters and the class 803 for linear masking coefficients. Similarly, the class 802 for hue determination parameters can be calculated based on the class 804 for scanner vectors. The class 803 for linear masking coefficients can be calculated based on the class 805 for parameters of inverse matrices of scanner vectors and the class 806 for printer vectors. The class 805 for parameters of inverse matrices of scanner vectors can be calculated based on the class 804 for scanner vectors. The class 806 for printer vectors is selected by the image quality mode and the image density selected from the class 807 for image density selection I/F. The data of the class 806 for printer vectors is stored in the class 811 for ROM. The class 804 for scanner vectors is calculated based on the class 809 for current read values. The class 809 for current read values can be selected from the class 813 for previous read values and the class 810 for new read values newly read from the class 814 for scanning device via the class 808 for calibration data selection I/F. The class 809 for current read values and the class 813 for previous read values are stored in the class 812 for NV-RAM.

The class 813 for previous read values can be used as the class 809 for current read values by pressing a 'reset to original value' key on the mode selection screen shown in FIG. 24. Consequently, the class 801 for color correction coefficients is recalculated by retrieving the class 813 for previous read values from the class 812 for NV-RAM.

Given below is the description of the ACC. Unlike in the case of a scanner gamma conversion table used to correct machine difference in the scanning device 300, a scanner gamma conversion table for reading ACC patterns has high sensitivity with respect to spectral reflectivity of the toner on the target sheet for reading. Moreover, the scanner gamma conversion table for reading ACC patterns is created by using read values of the chromatic patches in the color correction chart HC such that the effect of fluctuation in the spectral sensitivity of the CCD 312 is negated.

The scanner gamma conversion table for reading ACC patterns is created based on chromatic patches and achromatic patches having different colors. As an example, a method of creating the scanner gamma conversion table for the correction of yellow toner is described with reference to FIG. 35.

Figures 35, 36:
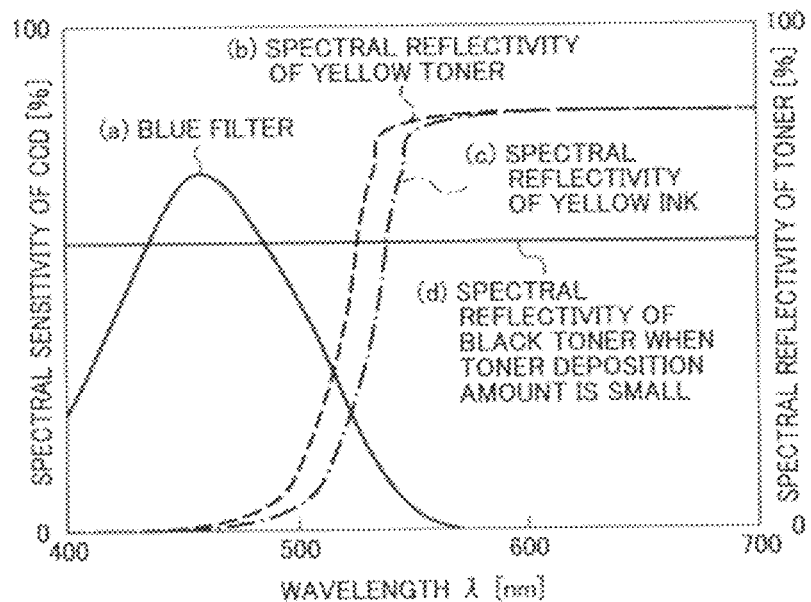
FIG. 35 is a scanner gamma conversion table of exemplary read reference values of chromatic patches and achromatic patches used for the correction of yellow toner.
FIG. 36 is a graph that represents spectral sensitivity of a CCD for blue signal and spectral reflectivity of yellow toner by wavelength.

The chromatic patches shown in FIG. 35 are used for the correction of yellow toner. The values of chromatic patches are, e.g., reference values obtained when a scanning device reads the chromatic patches extracted for the correction of yellow toner. Because blue has high sensitivity at the time of reading yellow toner, a blue signal is used. From among R, G, and B reading signals of 1: white, 2: yellow, 5: blue, 6: cyan, 10: gray, and 11: black that output different blue signal values from a plurality of chromatic patches having different colors, a blue signal is used to create a correction table for yellow toner reading.

While creating the correction table for yellow toner reading during the ACC, the color correction chart HC is created by using a printing ink. That causes mismatch in the spectral reflectivity of the chart and the yellow toner. In FIG. 35, the correction coefficient for blue makes up for that mismatch.

The correction coefficient for blue can be calculated based on FIG. 36 that represents spectral sensitivity of the CCD 312 for blue signal and spectral reflectivity of yellow toner by a wavelength λ. In FIG. 36, the horizontal axis represents the wavelength λ. With respect to a graph (a), the vertical axis represents the spectral sensitivity of the CCD 312 shown on the left side. With respect to graphs (b), (c), and (d), the vertical axis represents the spectral reflectivity of toner shown on the right side. The graph (a) represents spectral sensitivity of a blue signal filter, the graph (b) represents spectral reflectivity of a yellow toner, the graph (c) represents spectral reflectivity of yellow ink, and the graph (d) represents spectral reflectivity of black toner when the toner deposition amount is small. The spectral sensitivity of the graph (a) is obtained by multiplying the spectral transmission rate of a blue filter of the CCD 312 with the spectral energy of the light source (i.e., the halogen lamp 302).

An output B of the blue signal (CCD 312, color material) is obtained by integrating the wavelength λ with an integration value "S(CCD, λ)×ρ(color material, λ, area ratio)" of spectral sensitivity S(CCD, λ) of the CCD 312 and spectral reflectivity ρ(color material, λ, area ratio) of color material. That is, the output B of the blue signal (CCD 312, color material) is obtained by Equation (42) given below.

$$B(CCD, \text{color material}, \text{area ratio}) = \int S(CCD, \lambda) \cdot \rho(\text{color material}, \lambda, \text{area ratio}) d\lambda \quad (42)$$

When the yellow toner (hereinafter, "Y toner") and the yellow ink (hereinafter, "Y ink") are read, the blue signals corresponding to a spectral sensitivity 'a' of the CCD 312 are represented by Equations (43) and (44), respectively.

$$B(a, Y\text{toner}, 100\%) = \int S(a, \lambda) \cdot \rho(Y\text{toner}, \lambda, 100\%) d\lambda \quad (43)$$

$$B(a, Y\text{ink}, 100\%) = \int S(a, \lambda) \cdot \rho(Y\text{ink}, \lambda, 100\%) d\lambda \quad (44)$$

The spectral sensitivity S(a, λ) is assumed to be a representative value of the scanning device 300. A Y toner spectral reflectivity ρ(Y toner, λ) and a Y ink spectral reflectivity ρ(Y ink, λ) are measured by using a spectrophotometric calorimeter. In this way, the blue signals B(a, Y toner) and B(a, Y ink) can be calculated.

Based on the read value B(Y ink) of the blue signal obtained by reading the yellow patch of the printing ink in the color correction chart HC, the read value B (Y toner) at the time when Y toner is read as a read value for Y toner during the ACC can be estimated by using Equation (45) given below.

$$B(Y\text{toner}) = k(\text{Yellow}) \times B(Y\text{ink}) \quad (45)$$

where, k(Yellow)=B(a, Y toner, 100%)/B(a, Y ink, 100%).

The above description is given for the yellow toner. Regarding other chromatic patches, a Y toner area ratio or a toner deposition amount per unit area (mg/cm$^2$) is used for which, within an area in which the blue spectral sensitivity of the CCD 312 is not equal to zero, the spectral reflectivity of the yellow toner and the reflectivity of a chromatic patch of a printing ink to be calculated are substantially equal.

Figure 37:
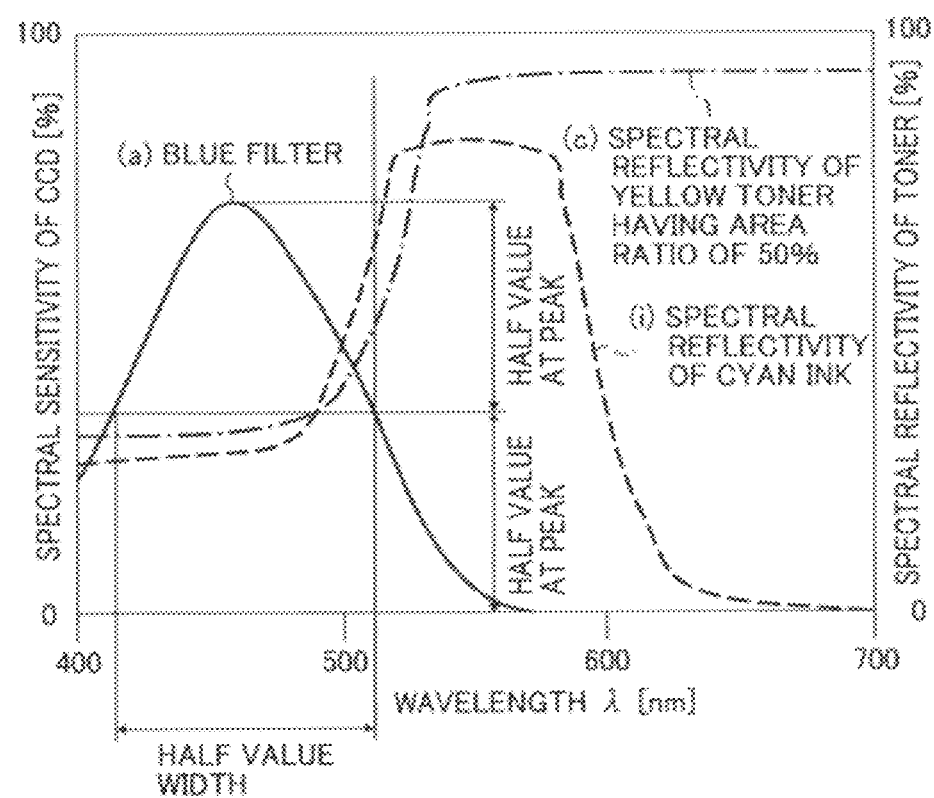
FIG. 37 is a graph that represents spectral reflectivity of cyan ink, spectral reflectivity of yellow toner having an area ratio of 50%, and read values for a blue signal by wavelength.

For example, consider a case regarding a black patch or a green patch for which read values of spectral reflectivity of cyan ink (graph (i) in FIG. 37), read values of spectral reflectivity of yellow toner having an area ratio of 50% (graph (c) in FIG. 37), and read values for a blue signal are lower than read values of yellow toner (or yellow ink). In that case, a correction coefficient is not calculated and value '1' is used as a coefficient. The correction coefficient k obtained in this way can be represented as shown in FIG. 35.

A method of creating a conversion table for ACC-pattern read value correction is explained with reference to a quaternary chart of an ACC-pattern read value correction table shown in FIG. 38.

In a first quadrant (I) of the quaternary chart, the graph shows a conversion table for intended ACC-pattern read value correction, where the horizontal axis represents CCD pattern read values and the vertical axis represents values after conversion. In a fourth quadrant (IV), the vertical axis represents post-correction read values of chromatic patches and achromatic patches corrected by using the correction coefficient k, while the graph shows a target read value (reference read value) for obtaining conversion table for ACC-pattern read value correction from the read values of the chromatic patches and the achromatic patches. In a third quadrant (III), the horizontal axis represents the reference read values of the chromatic patches and the achromatic patches, while the graph shows post-correction read values obtained by correcting read values of the chromatic patches and the achromatic patches read by a scanning device and corrected by the correction coefficient k. In a second quadrant (II), the graph represents no conversion (i.e., through).

Based on the characteristics in the quaternary chart, a conversion table for ACC-pattern read value correction D [ii] (ii=0, 1, 2, . . . , 255) demanded by each of b and b' in the first quadrant (I) is created from resultant read values a and a', respectively, in the third quadrant (III).

A target read value in the fourth quadrant (IV) is created for each of the toners of Y, M, C, and K read in the ACC patterns. In this way, it is possible to improve adjustment accuracy of the ACC.

FIG. 39 is a table of exemplary reference values obtained by reading chromatic patches extracted for the correction of cyan toner by a reference scanner. Because red has high sensitivity at the time of reading cyan toner, a red signal is used. Thus, a correction table for cyan toner reading during the ACC is created by using red signals of chromatic patches and achromatic patches of 1: white, 2: yellow, 3: red (or 4: magenta), 5: color 1 between magenta and blue, 6: color 2 between magenta and blue, 7: blue, 8: cyan, 10: gray, and 11: black that output different red signal values from a plurality of chromatic patches having different colors.

As a result, it is possible to prevent fluctuation in reading image signals due to the machine difference in the scanning device 300 and thus improve the adjustment accuracy of the ACC. That leads to improvement in the image quality.

Meanwhile, the gradation conversion tables in the image-processing-printer gamma conversion unit 713 are generated by using image signals having a common component from among image signals obtained when the scanning device 300 reads a plurality of different chromatic patches from the color correction chart HC. Thus, if the gradation conversion tables are generated by using the image signals corresponding to complementary color signals of Y, M, and C toners from among the R, G, and B image signals that are obtained when the scanning device 300 reads different chromatic patches in the color correction chart HC, then the adjustment accuracy of the gradation conversion tables can be improved. That leads to an improved image quality even when the joint output function is carried out.

While creating the correction table for reading cyan toner during the ACC, the color correction chart HC is created by using a printing ink. That causes mismatch in the spectral reflectivity of the chart and the cyan toner. In FIG. 39, the correction coefficient for red makes up for that mismatch.

Thus, by correcting the difference between the spectral reflectivity of the printing ink of the color correction chart HC and the spectral reflectivity of the toner in the printing device 100, which records and outputs gradation pattern, it is possible to create a superior scanner gamma conversion table as an image signal conversion table for ACC. That facilitates in further improving the image quality.

Given below is the description of an operation screen used to select automatic color correction for image density (gradation).

Figure 40:
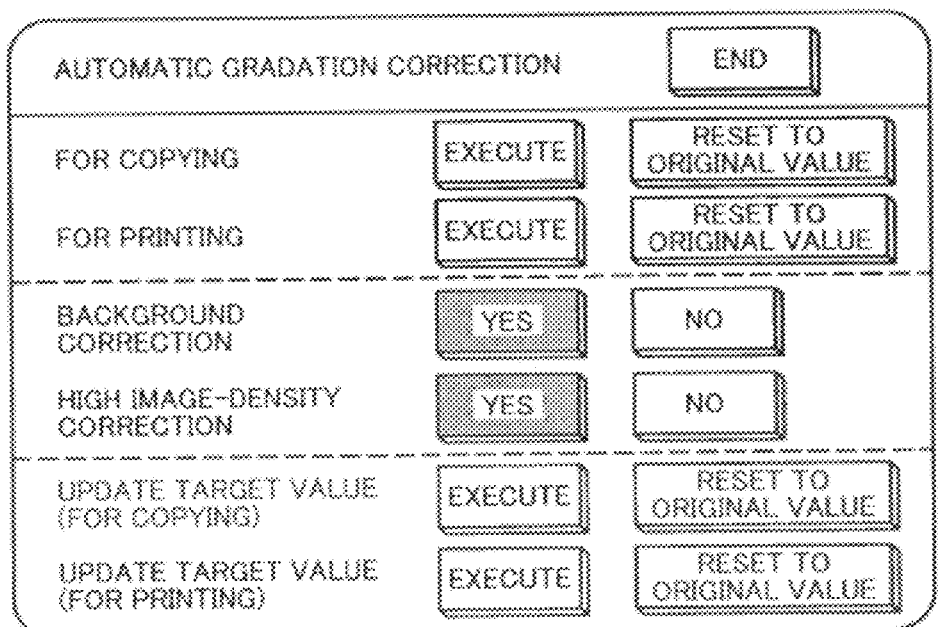
FIG. 40 is a diagram of an exemplary automatic gradation adjustment screen displayed on the liquid crystal display.
Figure 41:
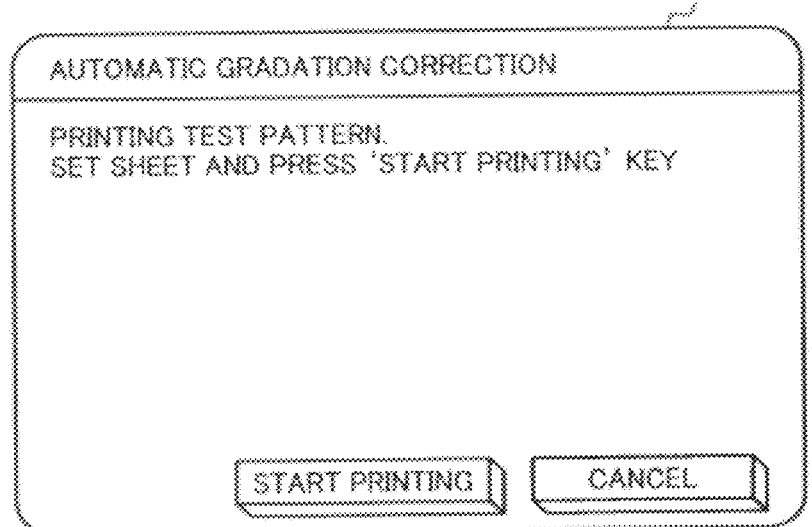
FIG. 41 is a diagram of an exemplary start screen for automatic gradation correction displayed on the liquid crystal display.

When an ACC menu is invoked from the liquid crystal display 511, an automatic gradation adjustment screen shown in FIG. 40 is displayed thereon. When an 'execute' key for performing automatic gradation correction at the time of copying or printing is pressed in the automatic gradation adjustment screen, then a start screen for automatic gradation correction is displayed on the liquid crystal display 511 (see FIG. 41). More particularly, when the 'execute' key corresponding to copying is pressed, a gradation correction table used for copying is created and, when the 'execute' key corresponding to printing is pressed, a gradation correction table used for printing is created based on reference data.

When the result of image formation by using the Y, M, C, and K gradation correction table is not desirable, it is possible to reset the original Y, M, C, and K gradation correction table by pressing a 'reset to original value' key on the automatic gradation adjustment screen.

When an 'automatic gradation correction setting' menu is selected from the automatic gradation adjustment screen, an 'execute' key and a 'not to execute' key are displayed for each of a plurality of options such as background correction, high image density area correction, and RGB ratio correction. Moreover, in the 'automatic gradation correction setting' menu, it is possible to select between the 'automatic gradation correction setting' options and a 'detection of uneven light intensity' option. On the other hand, both the options can also be executed as default setting.

Subsequently, from the achromatic patches, the image processing apparatus 1 creates the scanner gamma conversion table corresponding to the R, G, and B reading components used during the copying process. Moreover, the image processing apparatus 1 corrects the read values of the Y, M, C, and K gradation patterns obtained by reading the adjustment patterns output from the chromatic patches and the achromatic patches during the ACC. Thus, the three conversion tables for R, G, and B are used during the copying process, while the four conversion tables for Y, M; C, and K are used during the ACC.

Figure 42:
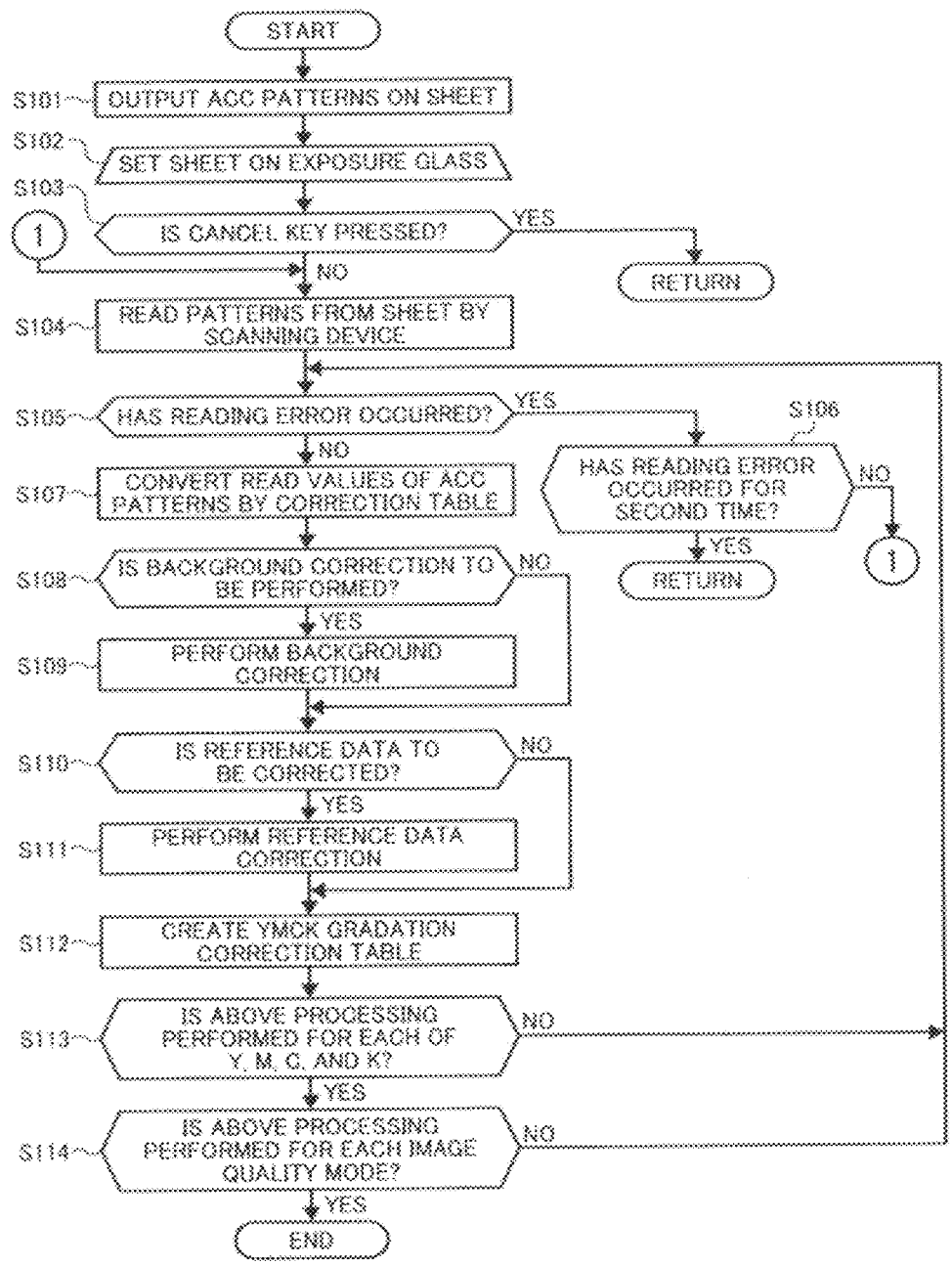
FIG. 42 is a flowchart for explaining operations during automatic color correction (ACC)

FIG. 42 is a flowchart for explaining the operations during the ACC of image density (gradation).

When the 'execute' key corresponding to copying or printing is pressed in the automatic gradation adjustment screen, then the start screen for automatic gradation correction (see FIG. 41) is displayed on the liquid crystal display 511. When a 'start printing' key on the start screen is pressed, a plurality of image-density gradation patterns (see FIG. 43) corresponding to the colors Y, M, C, and K, and the image quality modes such as the character mode and the photograph mode are printed on the sheet P (Step S101).

The image-density gradation patterns are stored in advance in the ROM 716 of the IPU 612 and are written with hexadecimal values of 16 patterns, namely, 00h, 11h, 22h, . . . , EEh, FFh. Although patches of five tones except the background are displayed in FIG. 43, it is possible to select an arbitrary value out of 8-bit signals of 00h to FFh. The image-density gradation patterns include a character mode and a photograph mode. In the character mode, dither processing (e.g., pattern processing) is not performed and a pattern with 256 tones per dot is formed. In the photograph mode, the dither processing is performed as described later.

Figure 44:
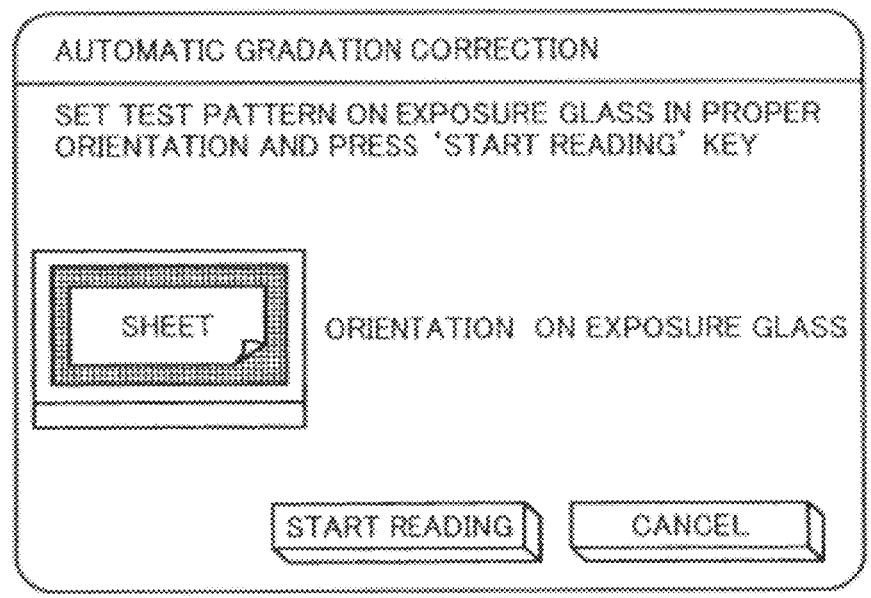
FIG. 44 is a diagram of an exemplary message displayed on the liquid crystal display by which the user is requested to place the transfer sheet with gradation patterns on an exposure glass of the image processing apparatus.

The image processing apparatus 1 then outputs the image-density gradation patterns on the sheet P. Subsequently, a message is displayed on the liquid crystal display 511 by which the user is requested to place the sheet P on the exposure glass 3 (see FIG. 44). When the sheet P is placed on the exposure glass 3 (Step S102), it is determined whether the user presses a 'start reading' key or a 'cancel' key (Step S103). When the user presses the 'cancel' key, the processing is completed.

When the user presses the 'start reading' key, the scanning device 300 performs main scanning and sub-scanning of the sheet P to obtain the RGB data of the Y, M, C, and K density patterns (Step S104). More particularly, the scanning device 300 reads the data of the pattern portion as well as the data of the background portion in the sheet P.

The image processing apparatus 1 then determines whether the data of the pattern portion is read correctly (Step S105). When it is determined that the data of the pattern portion is not read correctly (No at Step S105), the image processing apparatus 1 determines whether the incorrect reading of the data of the pattern portion has occurred for the second time (Step S106). When the incorrect reading of the data of the pattern portion is determined to have occurred for the first time (No at Step S106), the image processing apparatus 1 displays the screen in FIG. 44 on the liquid crystal display 511. Subsequently, if the user presses the 'start reading' key, the system control returns to Step S104. On the other hand, when the incorrect reading of the data of the pattern portion is determined to have occurred for the second time (Yes at Step S106), the processing is completed.

When it is determined that the data of the pattern portion is read correctly (Yes at Step S105), the image processing apparatus 1 converts and corrects the read values of the ACC patterns for the each of the colors Y, M, C, and K based on the ACC-pattern read value correction table D[ii] (ii=0, 1, 2, . . . , 255) (Step S107) and, depending on the selected option in the automatic gradation adjustment screen in FIG. 40, determines whether to perform background correction using the data of the background portion (Step S108).

When it is determined to perform background correction at Step S108, the read data is subjected to background correction (Step S109). Subsequently, depending on the selected option in the automatic gradation adjustment screen in FIG. 40, the image processing apparatus 1 determines whether to perform correction of the high image density area of reference data (Step S110).

When it is determined to perform correction of the high image density area at Step S110, the image processing apparatus 1 performs correction of the high image density area of the reference data (Step S111) and creates/selects the YMCK gradation correction table (Step S112). When it is determined not to perform correction of the high image density area at Step S110, the image processing apparatus 1 creates/selects the YMCK gradation correction table without correcting the reference data (Step S112).

Upon creating/selecting the YMCK gradation correction table, the image processing apparatus 1 determines whether the abovementioned processing is performed for each of the colors Y, M, C, and K (Step S113). When it is determined that the processing is not performed for the colors Y, M, C, and K (No at Step S113), the system control returns to Step S105 to re-perform the processing.

When it is determined that the processing is performed for each of the colors Y, M, C, and K (Yes at Step S113), the image processing apparatus 1 determines whether the abovementioned processing is performed for each image quality mode (Step S114). When it is determined that the processing is not performed for each image quality mode (Yes at Step S114), the system control returns to Step S105 to re-perform the processing. When it is determined that the processing is performed for each image quality mode (Yes at Step S114), the processing is completed.

Figure 45:
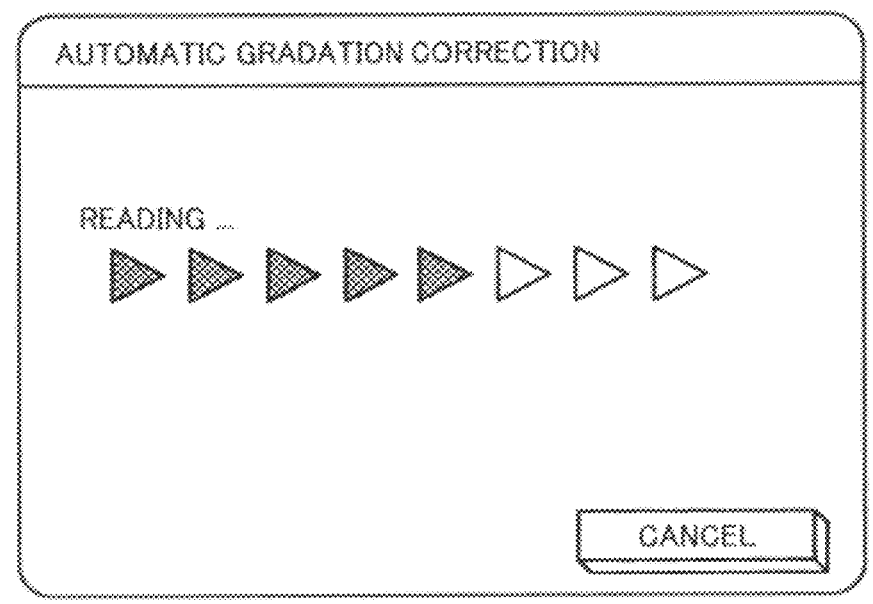
FIG. 45 is a diagram of an exemplary message screen displayed on the liquid crystal display indicating the user that a process of automatic gradation correction is currently underway.

During the processing, the image processing apparatus 1 displays a message screen on the liquid crystal display 511 indicating that the process of automatic gradation correction is currently underway (see FIG. 45). After the processing is complete, if the result of image formation by using the Y, M, C, and K gradation correction table is not desirable, it is possible to reset the original Y, M, C, and K gradation correction table by pressing a 'reset to original value' key on the automatic gradation adjustment screen in FIG. 40.

Given below is the description of background correction. The first objective of background correction is to correct white level of the paper used for the ACC. The background correction is necessary because, even when an image is formed in a single image processing apparatus 1, the white level of the paper affects the values read by the scanning device 300. Not performing background correction can result in, e.g., low white level at the time of ACC. Moreover, if a recycled paper is used for the ACC, then, because the recycled paper generally includes a large quantity of yellow component, a yellow gradation correction table for the recycled paper is created and correction is performed to reduce the yellow component. However, in that case, if copying is performed by using, e.g., an art paper having a high white level, then there is a possibility that the formed image has less yellow component. That can affect the desired color reproduction.

The second objective of background correction is to maintain image density of the image. For example, consider a case when a pressure plate is arranged instead of the ADF 400 to press a thin paper used for the ACC on the exposure glass 3. In that case, the translucency of the paper allows the scanning device 300 to read the color of the pressure plate. On the other hand, when the ADF 400 is arranged above the exposure glass 3, then the image signals read by the scanning device 300 appear to have high image density in entirety because the original conveying belt 402, which is used to convey the original G fed from the ADF 400, has a low white level due to its rubber-base material and has a slightly gray color. Thus, while creating the YMCK gradation correction table, the image density is corrected to a lower level. In that situation, if a thick paper having low translucency is used for the ACC, then an image having low image density is reproduced. That can cause mismatch in the original image density and the reproduced image density.

To prevent such problems, reading image signals of the pattern portion are corrected based on reading image signals and image signals of the background portion.

However, not performing background correction also has its advantages. For example, when a paper including a large quantity of yellow component (e.g., recycled paper) is used as a standard practice, not performing background correction results in better color reproducibility with respect to a color containing a yellow component. Similarly, when a thin paper is used as a standard practice, not performing background correction helps in creating a gradation correction table suitable for the thin paper.

Thus, depending on the situation or user preference, it is possible to turn ON or turn OFF the option of background correction by using operating keys in the operating panel 500.

Given below is the description of automatic gradation correction. When the scanning device 300 reads from a paper a gradation pattern (see FIG. 43) including writing values LD [i] (i=0, 1, . . . , 9), the obtained read values are assumed to be in the following vector format:

$$v[t][i]=(r[t][i],g[t][i],b[t][i])$$

where, t=Y, M, C, or, K; and i=0, 1, . . . , 9.

Note that, instead of using (r, g, b), the read values can also be represented by using brightness, saturation, hue angle (L*, c*, h*) or brightness, redness, blueness (L*, a*, b*).

The read values of white that are stored in the ROM 716 or the RAM 717 in advance are assumed to be (r[W], g[W], b[W]).

Given below is the description of a method of generating a gradation conversion table (an LUT) in the image-processing-printer gamma conversion unit 713 during the ACC.

In the read values v[t][i]=(r[t][i], g[t][i], b[t][i]) of the gradation pattern, image signals of the complementary colors of Y, M, and C toners are b[t][i], g[t][i], and r[t][i], respectively. Thus, only the complementary colors of Y, M, and C toners are used. To simply the description, the read values are represented by using a[t][i] (i=0, 1, 2, ..., 9; t=C, M, Y, K).

Regarding the black toner, a sufficient accuracy can be achieved by using any one of the R, G, and B image signals. In the following description, green image signals are used as an example.

The reference data is obtained by a combination of the read values v0[t][i]=(r0[t][i], g0[t][i], b0[t][i]) of the scanning device 300 and corresponding writing values LD[i](i=1, 2, ..., m). Similarly, only the image signals of complementary colors of Y, M, and C toners are used to represent the reference data as A[t][n[i]], (0≦n[i]≦255; i=1, 2, ..., m; t=Y, M, C, or, K; and 'm' is the number of reference data).

A YMCK gradation conversion table is obtained by comparing a[LD] with reference data A[n] stored in the ROM 716.

Here, 'n' is an input value to the YMCK gradation conversion table, while the reference data A[n] is a target value of the reading image signals obtained when the scanning device 300 reads a YMC toner pattern output with the writing values LD[i] after the input value n is subjected to YMCK gradation conversion. The reference data consists of two values, namely, the reference value A[n] for which the correction is performed based on the image density that can be output by the printing device 100 and the reference value A[n] for which the correction is not performed. The image processing apparatus 1 determines whether the correction is performed based on data stored in the ROM 716 or the RAM 717 in advance.

The image processing apparatus 1 calculates LD corresponding to A[n] based on a[LD] and obtains laser output value LD[n] corresponding to the input value n in the YMCK gradation conversion table.

A gradation conversion table can be obtained by calculating the laser output value LD[n] with respect to the input value i=0, 1, ..., 255 (in the case of 8-bit signal).

Instead of applying the processing to all values corresponding to the input values n=00h, 01h, ..., FFh (hexadecimal digits), discontinuous values such as ni=0, 11h, 22h, ..., FFh are subjected to the processing and the points other than the discontinuous values are obtained either by performing spline function interpolation or by selecting a YMCK gamma correction table closest to (0, LD[0]), (11h, LD[11h]), (22h, LD[22h]), ..., (FFh, LD[FFh]) calculated during the processing from among YMCK gamma correction tables stored in the ROM 716.

The abovementioned processing is explained with reference to FIG. 46. In a first quadrant (a) in FIG. 46, the horizontal axis represents an input value n to the YMCK gradation conversion table, while the vertical axis represents read values (after processing) of the scanning device 300, i.e., the reference data A[i]. The read values (after processing) of the scanning device 300 are obtained when the gradation patterns read by the scanning device 300 are subjected to RGB gamma conversion (not performed here), averaging of read data at some positions in the gradation patterns, and addition of the read data. Herein, 12-bit data signal is used for the processing to improve the accuracy in calculation.

In a second quadrant (b), the horizontal axis and the vertical axis represent read values (after processing) of the scanning device 300.

In a third quadrant (c), the vertical axis represents a laser light (LD) writing value a[LD], which indicates characteristics of the printing device 100. The actual LD writing values of a pattern are 16 discontinuous points, namely, 00h (background), 11h, 22h, ..., EEh, FFh. However, spaces between the points are interpolated to treat it as a continuous graph.

A graph (d) in a fourth quadrant represents an YMCK gradation conversion table LD[i] that is to be obtained.

The vertical axis and the horizontal axis of a graph (f) are identical to the vertical axis and the horizontal axis, respectively, of the graph (d). To create a gradation pattern for detection, an YMCK gradation conversion table (g) shown in a graph (f) is used.

The horizontal axis of a graph (e) is identical to the horizontal axis of the third quadrant (c) and represents in the form of linear conversion a relation between LD writing values during creation of a gradation pattern and read values (after processing) of the gradation pattern read by the scanning device 300.

Figure 46:
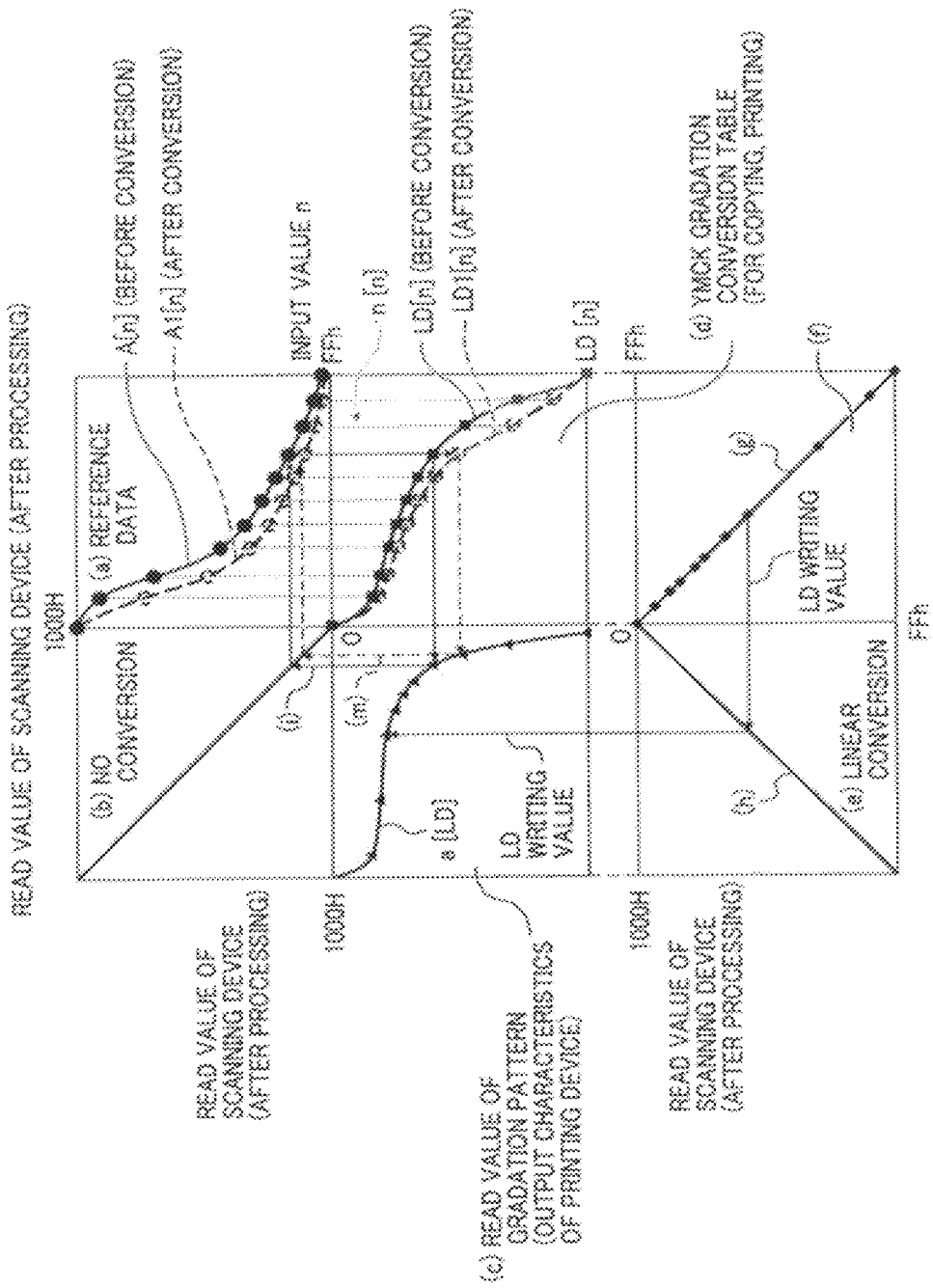
FIG. 46 is a quaternary chart used to explain operations in ACC.

In FIG. 46, the reference data A[n] is obtained with respect to the input value n. The laser output value LD[n] used to obtain the reference data A[n] is obtained along an arrow (1) by using the gradation pattern read value a[LD].

Figure 47:
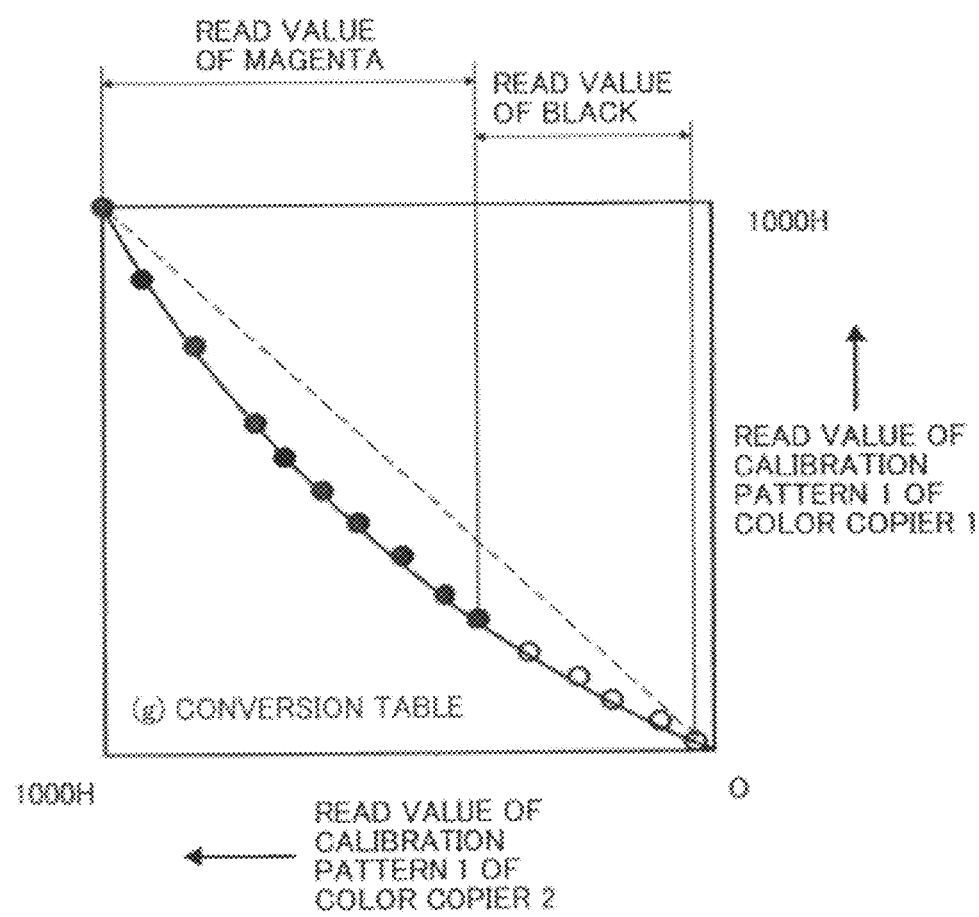
FIG. 47 is a diagram for explaining generation of an exemplary green data conversion table.

FIG. 47 is a diagram for explaining generation of an exemplary green data conversion table. In FIG. 47, a portion having a read value with a large amount of reflected light from an original on 1000H-side (i.e., bright portion) uses a read value of a Magenta calibration pattern 1 for generating the green data conversion table, while a portion having a small amount of reflected light from an original on 0H-side (i.e., dark portion) uses a read value of black for generating the green data conversion table.

Figure 48:
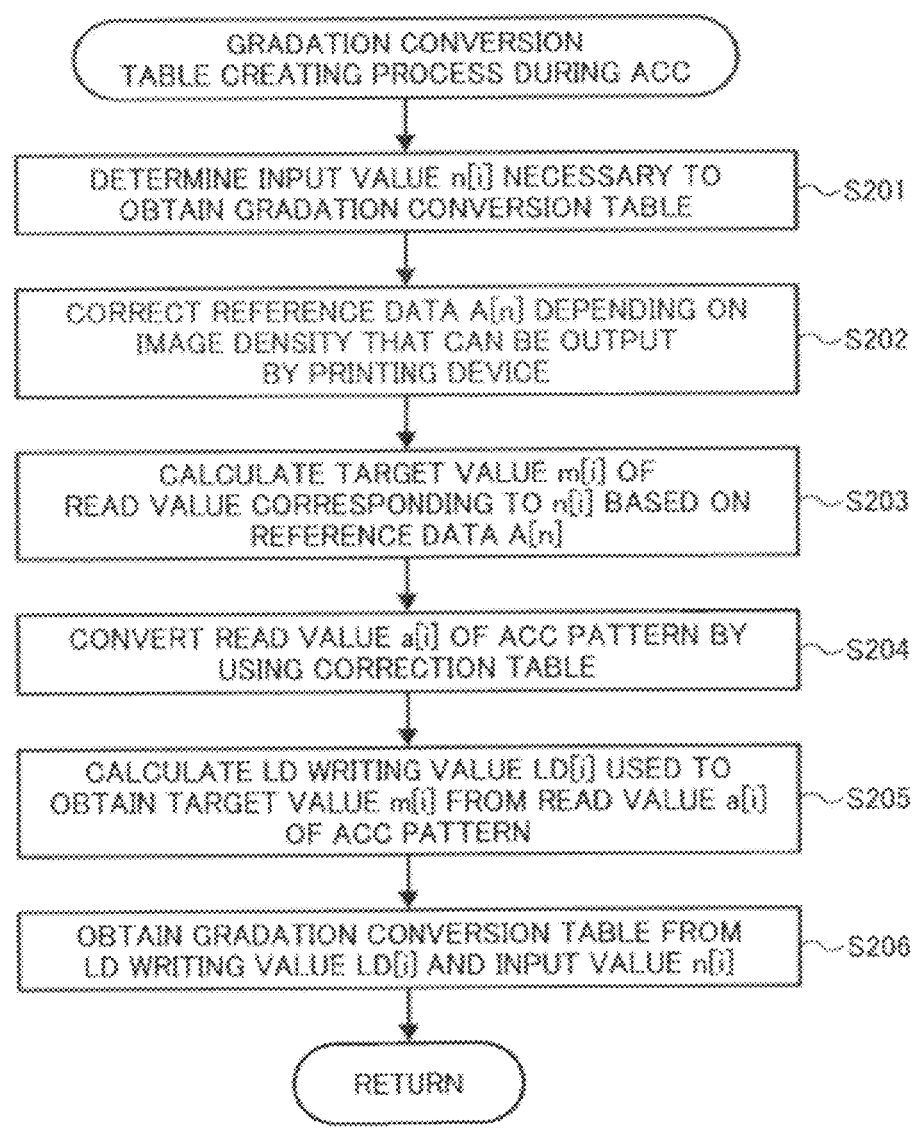
FIG. 48 is a flowchart for explaining generation of a gradation conversion table during ACC.

FIG. 48 is a flowchart for explaining creation of a gradation conversion table (YMCK gamma correction table) during the ACC. First, the image processing apparatus 1 determines an input value (e.g., n[i]=11(h)×I, where i=0, 1, ..., imax=15) that is necessary to obtain the YMCK gamma correction table (Step S201).

That is, in comparison with the graph when RGB gamma conversion is performed, the printer characteristic graph in the third quadrant is identical but an RGB gamma conversion table of the second quadrant has different characteristics. Therefore, it is necessary to vary the reference data of the first quadrant. Even then, the characteristics of the YMCK gradation conversion table LD[h], which is the final result, are identical.

Thus, the reference data is varied depending on whether the RGB gamma conversion table is used for processing.

The image processing apparatus 1 corrects the reference data A[n] depending on the image density that can be output by the printing device 100 (Step S202).

A laser writing value for obtaining maximum image density, which can be output by the printing device 100, is set to FFh (hexadecimal value) and a read value m[FFh] of a gradation pattern is set to mmax. The reference data from a low image density side to an intermediate image density side for which correction is not performed is set to A[i](i=0, 1, ..., i1). The reference data on a high image density side for which correction is not performed is set to A[i](i=i2+1, ..., imax−1)(i1≦i2, i2≦imax−1). The reference data for which correction is performed is set to A[i](i=i1+1, ..., i2).

In the following description, an image signal is assumed to be proportional to reflectivity of an original for which the RGB gamma conversion is not performed. Among the reference data for which correction is not performed, the reference data A[i2+1] of a high image density area with lowest image density and the reference data A[i1] of a low image density area with lowest image density are used to calculate a difference Δref by using Equation (46) given below.

$$\Delta ref = A[i1] - A[i2+1] \tag{46}$$

where, Δref>0 in the case of reflectivity linear data or brightness linear data for which RGB gamma conversion (inversion processing) is not performed.

Similarly, based on the read value mmax, a difference Δdet is calculated by using Equation (47) given below.

$$\Delta det = A[i1] - mmax \tag{47}$$

The reference data A[i](i=i1+1, ..., i2) after correction of the high image density area is calculated by Equation (48) given below.

$$A[i] = A[i1] + (A[i1] - A[i1]) \times (\Delta det / \Delta ref) \tag{48}$$

where, i=i1+1, i1+2, ..., i2−1, i2.

The image processing apparatus 1 then calculates a reading image signal m[i] of the scanning device 300 corresponding to n[i] based on the reference data A[n] (Step S203).

In practice, to calculate the reading image signal m[i], the reference data A[n[j]] corresponding to discontinuous n[j] (0≦n[j]≦255, j=0, 1, ..., jmax, n[j]≦n[k] for j≦k) is calculated as given below.

$$j(0 \leq j \leq jmax) \text{ such that } n[j] \leq n[i] < n[j+1]$$

In the case of an 8-bit image signal, calculation becomes easier if the reference data is calculated as n[0]=0, n[jmax]=255, n[jmax+1]=n[jmax]+1, A[jmax+1]=A[jmax].

Meanwhile, narrower the interval of the reference data n[j], more is the accuracy of the gamma correction table obtained as the final result.

Figure 38:
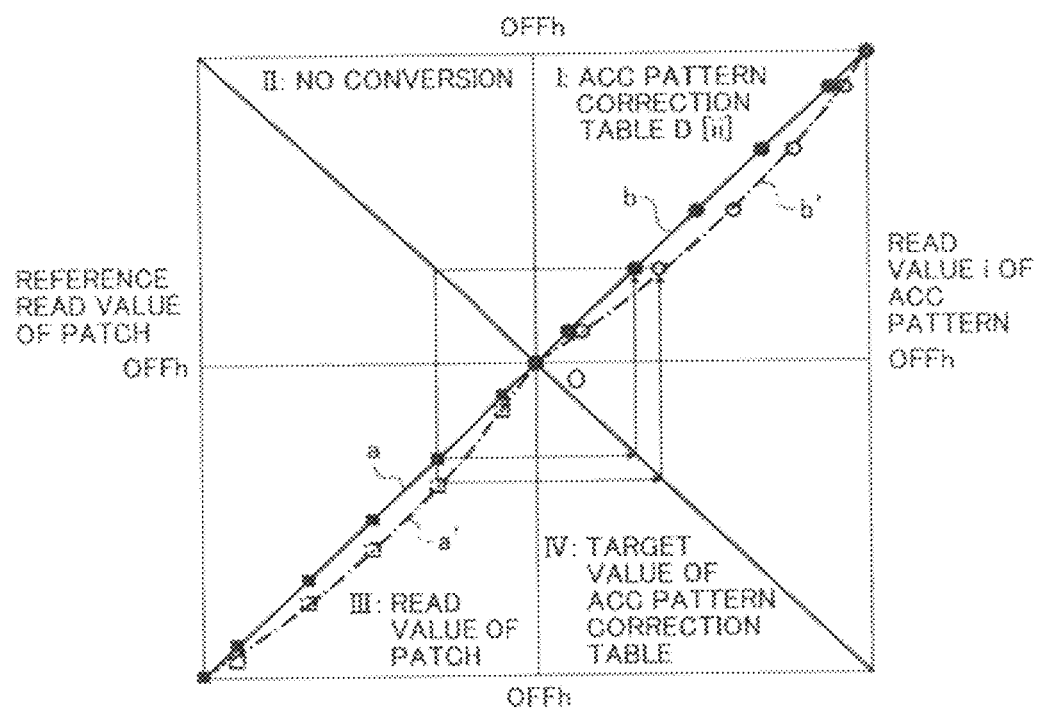
FIG. 38 is a quaternary chart of an ACC-pattern read value correction table.

The image processing apparatus 1 corrects the ACC pattern read value a[LD] corresponding to the writing value LD by using the correction table D[ii](ii=0, 1, 2, 255) that is indicated as b or b' in FIG. 38 (Step S204). That is, a1[LD]=D[a[LD]].

In the following description, a1[LD] is represented as a[LD].

Based on the value of 'j', m[i] is calculated by using Equation (49) given below.

$$m[i] = A[j] + (A[j+1] - A[j]) \cdot (n[i] - n[j]) / (n[j+1] - n[j]) \tag{49}$$

Although the interpolation is performed by a primary expression in Equation (48), it can also be performed by a higher order function, a spline function, and the like. In that case, m[i] can be obtained by using Equation (50) given below.

$$m[i] = f(n[i]) \tag{50}$$

where, for a k-th order function, $$f(x) = \sum_{i=0}^{k} b_i x^i.$$

Upon calculating m[i], the image processing apparatus 1 calculates a laser writing value LD[i] used to obtain m[i] by an identical procedure (Step S205).

When image signal data not subjected to RGB gamma conversion is processed, a[LD] decreases as the value of the laser light (LD) increases.

That is, for LD[k]<LD[k+1], a[LD[k]]≧a[LD[k+1]]

The writing values during pattern formation are set to LD[k]=00h, 11h, 22h, ..., 66h, 88h, AAh, FFh, (k=0, 1, ... 9). The reason for that is as follows: in the image density with a small toner deposition amount, the variation in read values of the scanning device 300 with respect to the toner deposition amount is large. In that case, the writing values LD[k] are densely spaced for reading. On the other hand, in the image density with a larger toner deposition amount, the variation in read values of the scanning device 300 with respect to the toner deposition amount is small. Thus, the interval for reading is increased.

Consequently, as compared to increasing the number of patterns to 16 (e.g., LD[k]=00h, 11h, 22h, ..., EEh, FFh), it becomes possible to control toner consumption or reduce the variation with respect to LD writing values in a high image density area. Moreover, because of problems such as uneven charging of the photosensitive drums 104K, 104Y, 104M, and 104C, uneven deposition of toner, uneven fixing of an image, or uneven electric potential, the densely spaced LD writing values do not necessarily result in improved accuracy. Thus, the abovementioned LD writing values are used during pattern formation.

Then, with respect to LD[k] for which a[LD[k]]≧m[i]>a[LD[k+1]], LD[i] is obtained as follows:

$$LD[i] = LD[k] + (LD[k+1] - LD[k]) \cdot (m[i] - a[LD[k]]) / (a[LD[k+1]] - a[LD[k]])$$

When 0≦k≦kmax (where, kmax>0) and a[LD[kmax]]>m[i], (i.e., when the target value calculated based on the reference data has a high image density), then LD[i] is estimated by performing extrapolation with a primary expression as described below.

$$LD[i] = LD[k] + (LD[kmax] - LD[kmax-1]) \cdot (m[i] - a[LD[kmax-1]]) / (a[LD[kmax]] - a[LD[kmax-1]])$$

Consequently, it is possible to obtain a set of input values n[i] to the YMCK gamma correction table and output values LD[i] as (n[i], LD[i]) (i=0, 1, ..., 15).

Meanwhile, instead of using a primary expression for extrapolation, other methods such as using logarithm can also be used.

Based on the calculated (n[i], LD[I]) (i=0, 1, ..., 15), a gradation conversion table is obtained by performing interpolation with, e.g., the spline function or selecting a gamma correction table stored in the ROM 716 (Step S206).

Meanwhile, in the image processing apparatus 1, the spectral characteristics of each CCD are corrected by newly calculating linear masking coefficients based on the read values of the color correction chart HC shown in FIG. 22. The method of calculating the linear masking coefficients is described below in detail.

It is assumed that a scanner CCD having standard spectral characteristics reads a point on a boundary surface not existing on an achromatic axis to obtain a read value (Ri, Gi, Bi) (i=hue 1 to hue 4). When a CCD having different spectral characteristics reads the same point, a read value (Ri', Gi', Bi') (i=hue 1 to hue 4) is obtained. Consequently, the recording values of the developing units for C, M, Y, and K are calculated as (Ci', Mi', Yi', Ki') (i=hue 1 to hue 4). That is, Equation (33) can also be represented as Equation (55) given below.

$$\begin{pmatrix} Y(1') & Y(2') & Y(3') & Y(4') \\ M(1') & M(2') & M(3') & M(4') \\ C(1') & C(2') & C(3') & C(4') \\ K(1') & K(2') & K(3') & K(4') \end{pmatrix} = \tag{55}$$

$$\begin{pmatrix} aYB(3'\text{-}4') & aYG(3'\text{-}4') & aYR(3'\text{-}4') & aY(3'\text{-}4') \\ aMB(3'\text{-}4') & aMG(3'\text{-}4') & aMR(3'\text{-}4') & aM(3'\text{-}4') \\ aCB(3'\text{-}4') & aCG(3'\text{-}4') & aCR(3'\text{-}4') & aC(3'\text{-}4') \\ aKB(3'\text{-}4') & aKG(3'\text{-}4') & aKR(3'\text{-}4') & aK(3'\text{-}4') \end{pmatrix}$$

$$\begin{pmatrix} B(1') & B(2') & B(3') & B(4') \\ G(1') & G(2') & G(3') & G(4') \\ R(1') & R(2') & R(3') & R(4') \\ 1 & 1 & 1 & 1 \end{pmatrix}$$

To obtain identical YMCK output after linear masking processing, Equation (32) is equated to Equation (55) to obtain Equation (56).

$$\begin{pmatrix} Y(1) & Y(2) & Y(3) & Y(4) \\ M(1) & M(2) & M(3) & M(4) \\ C(1) & C(2) & C(3) & C(4) \\ K(1) & K(2) & K(3) & K(4) \end{pmatrix} = \tag{56}$$

$$\begin{pmatrix} aYB(3\text{-}4) & aYG(3\text{-}4) & aYR(3\text{-}4) & aY(3\text{-}4) \\ aMB(3\text{-}4) & aMG(3\text{-}4) & aMR(3\text{-}4) & aM(3\text{-}4) \\ aCB(3\text{-}4) & aCG(3\text{-}4) & aCR(3\text{-}4) & aC(3\text{-}4) \\ aKB(3\text{-}4) & aKG(3\text{-}4) & aKR(3\text{-}4) & aK(3\text{-}4) \end{pmatrix}$$

$$\begin{pmatrix} B(1) & B(2) & B(3) & B(4) \\ G(1) & G(2) & G(3) & G(4) \\ R(1) & R(2) & R(3) & R(4) \\ 1 & 1 & 1 & 1 \end{pmatrix} =$$

$$\begin{pmatrix} aYB(3'\text{-}4') & aYG(3'\text{-}4') & aYR(3'\text{-}4') & aY(3'\text{-}4') \\ aMB(3'\text{-}4') & aMG(3'\text{-}4') & aMR(3'\text{-}4') & aM(3'\text{-}4') \\ aCB(3'\text{-}4') & aCG(3'\text{-}4') & aCR(3'\text{-}4') & aC(3'\text{-}4') \\ aKB(3'\text{-}4') & aKG(3'\text{-}4') & aKR(3'\text{-}4') & aK(3'\text{-}4') \end{pmatrix}$$

$$\begin{pmatrix} B(1') & B(2') & B(3') & B(4') \\ G(1') & G(2') & G(3') & G(4') \\ R(1') & R(2') & R(3') & R(4') \\ 1 & 1 & 1 & 1 \end{pmatrix}$$

A masking coefficient aPS (3'-4') (P=Y, M, C, K; S=R, G, B) established in a hue area between a hue 3' and a hue 4' can be obtained by using Equation (57) given below. Equation (59) is obtained multiplying both sides of Equation (56) with Matrix (58), which is an inverse matrix of Matrix (57).

$$\begin{pmatrix} B(1') & B(2') & B(3') & B(4') \\ G(1') & G(2') & G(3') & G(4') \\ R(1') & R(2') & R(3') & R(4') \\ 1 & 1 & 1 & 1 \end{pmatrix} \tag{57}$$

$$\begin{pmatrix} B(1') & B(2') & B(3') & B(4') \\ G(1') & G(2') & G(3') & G(4') \\ R(1') & R(2') & R(3') & R(4') \\ 1 & 1 & 1 & 1 \end{pmatrix}^{-1} \tag{58}$$

$$\begin{pmatrix} aYB(3'\text{-}4') & aYG(3'\text{-}4') & aYR(3'\text{-}4') & aY(3'\text{-}4') \\ aMB(3'\text{-}4') & aMG(3'\text{-}4') & aMR(3'\text{-}4') & aM(3'\text{-}4') \\ aCB(3'\text{-}4') & aCG(3'\text{-}4') & aCR(3'\text{-}4') & aC(3'\text{-}4') \\ aKB(3'\text{-}4') & aKG(3'\text{-}4') & aKR(3'\text{-}4') & aK(3'\text{-}4') \end{pmatrix} = \tag{59}$$

$$\begin{pmatrix} Y(1) & Y(2) & Y(3) & Y(4) \\ M(1) & M(2) & M(3) & M(4) \\ C(1) & C(2) & C(3) & C(4) \\ K(1) & K(2) & K(3) & K(4) \end{pmatrix} \begin{pmatrix} B(1') & B(2') & B(3') & B(4') \\ G(1') & G(2') & G(3') & G(4') \\ R(1') & R(2') & R(3') & R(4') \\ 1 & 1 & 1 & 1 \end{pmatrix}$$

The linear masking coefficient aPS (hue) (P=Y, M, C, K; S=R, G, B) of each hue can be calculated in an identical manner. Depending on the type of original to be copied, a printer vector P(i) (P=Y, M, C, K; i=each hue) can be varied to improve the color reproducibility at the time of copying. Meanwhile, the types of original can be, e.g., printing paper type for which an ink is used as color material, a photographic paper type for which a YMC photosensitive layer is used as color material, a copying paper type for which toner is used as color material, an ink jet type for which output of an ink jet printer is used as original, a map type for which a special ink is used, or a color correction coefficient used to identify a highlight pen.

Thus, 'aPS-original type-(hue)' (P=Y, M, C, K; S=R, G, B, constant) is calculated with respect to each image quality mode for which an original 'P-original type-(i)' (P=Y, M, C, K; i=each hue; original type=printing paper, photographic paper, copying paper, map, ink jet, highlight pen, etc.), which is in lattice correspondence with the printer vector P(i) (P=Y, M, C, K; i=each hue) in Equation (57), is selected from an operating panel. Subsequently, the 'aPS-original type-(hue)' (P=Y, M, C, K; S=R, G, B, constant) is set in an ASIC and used during the copying process.

$$\begin{pmatrix} aYB \text{ original type} - (\text{hue})(3'\text{-}4') & aYG \text{ original type} - (\text{hue})(3'\text{-}4') & aYR \text{ original type} - (\text{hue})(3'\text{-}4') & aY \text{ original type} - (\text{hue})(3'\text{-}4') \\ aMB \text{ original type} - (\text{hue})(3'\text{-}4') & aMG \text{ original type} - (\text{hue})(3'\text{-}4') & aMR \text{ original type} - (\text{hue})(3'\text{-}4') & aM \text{ original type} - (\text{hue})(3'\text{-}4') \\ aCB \text{ original type} - (\text{hue})(3'\text{-}4') & aCG \text{ original type} - (\text{hue})(3'\text{-}4') & aCR \text{ original type} - (\text{hue})(3'\text{-}4') & aC \text{ original type} - (\text{hue})(3'\text{-}4') \\ aKB \text{ original type} - (\text{hue})(3'\text{-}4') & aKG \text{ original type} - (\text{hue})(3'\text{-}4') & aKR \text{ original type} - (\text{hue})(3'\text{-}4') & aK \text{ original type} - (\text{hue})(3'\text{-}4') \end{pmatrix} = \tag{60}$$

$$\begin{pmatrix} Y \text{ original type} - (\text{hue})(1) & Y \text{ original type} - (\text{hue})(2) & Y \text{ original type}(3) & Y \text{ original type}(4) \\ M \text{ original type} - (\text{hue})(1) & M \text{ original type} - (\text{hue})(2) & M \text{ original type}(3) & M \text{ original type}(4) \\ C \text{ original type} - (\text{hue})(1) & C \text{ original type} - (\text{hue})(2) & C \text{ original type}(3) & C \text{ original type}(4) \\ K \text{ original type} - (\text{hue})(1) & K \text{ original type} - (\text{hue})(2) & K \text{ original type}(3) & K \text{ original type}(4) \end{pmatrix} \begin{pmatrix} B(1') & B(2') & B(3') & B(4') \\ G(1') & G(2') & G(3') & G(4') \\ R(1') & R(2') & R(3') & R(4') \\ 1 & 1 & 1 & 1 \end{pmatrix}^{-1}$$

Figure 49:
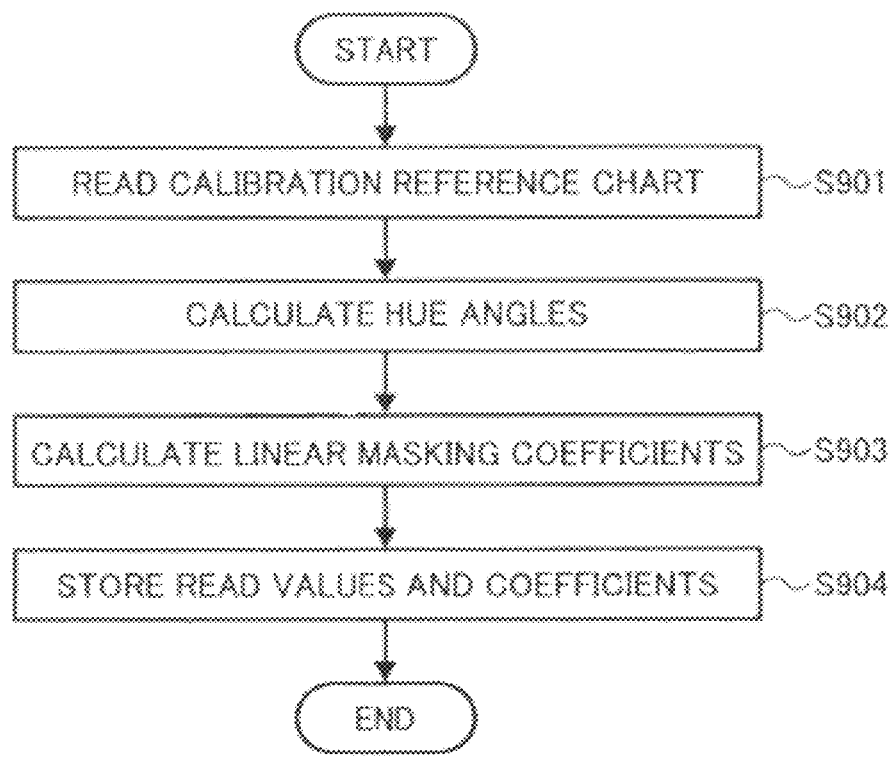
FIG. 49 is a flowchart for explaining a process of correction by scanner calibration.

FIG. 49 is a flowchart for explaining a process of correction by scanner calibration. In the process of correction by scanner calibration, hue evaluation values Fx' and masking coefficients of hue areas are calculated based on the result of reading the color correction chart HC.

First, the scanning device 300 reads the color correction chart HC (Step S901).

Subsequently, hue angles are calculated (Step S902). Based on the read value (Dr,bg,Db) (=Ri, Gi, Bi (i=number of each patch)) of R, G, and B of each patch in the color correction chart HC, Equations (13) to (29) are used to calculate the parameters GR, GB, and Fx' such that the R, G, and B image data of the read original can be divided for each hue.

Then, the linear masking coefficient is calculated for each patch based on the corresponding read values Ri, Gi, and Bi (i=number of the patch) (Step S903).

Finally, the read values and the linear masking coefficients are stored in a memory unit (Step S904) and the processing is completed.

Given below is the description of distinctive features of the image processing apparatus 1 regarding a process of generating image processing parameters that are used in image processing of image data. More particularly, intermediate calculation results calculated at a plurality of predetermined operations during the process of generating image processing parameters are stored in a memory unit along with certain information that is useful in determining whether the intermediate calculation results need to be recalculated. Thus, based on that information, it is determined whether to recalculate the intermediate calculation results while generating the image processing parameters.

More particularly, intermediate calculation results such as scanner vectors, printer vectors, inverse matrices of scanner vectors, and linear masking coefficients (see Equation (57)) are obtained at following operations during the process of generating image processing parameters:
1. initialization of image processing parameters or turning ON the power of the image processing apparatus 1;
2. reading of a calibration reference chart; and
3. correction of image data.

Figure 50:
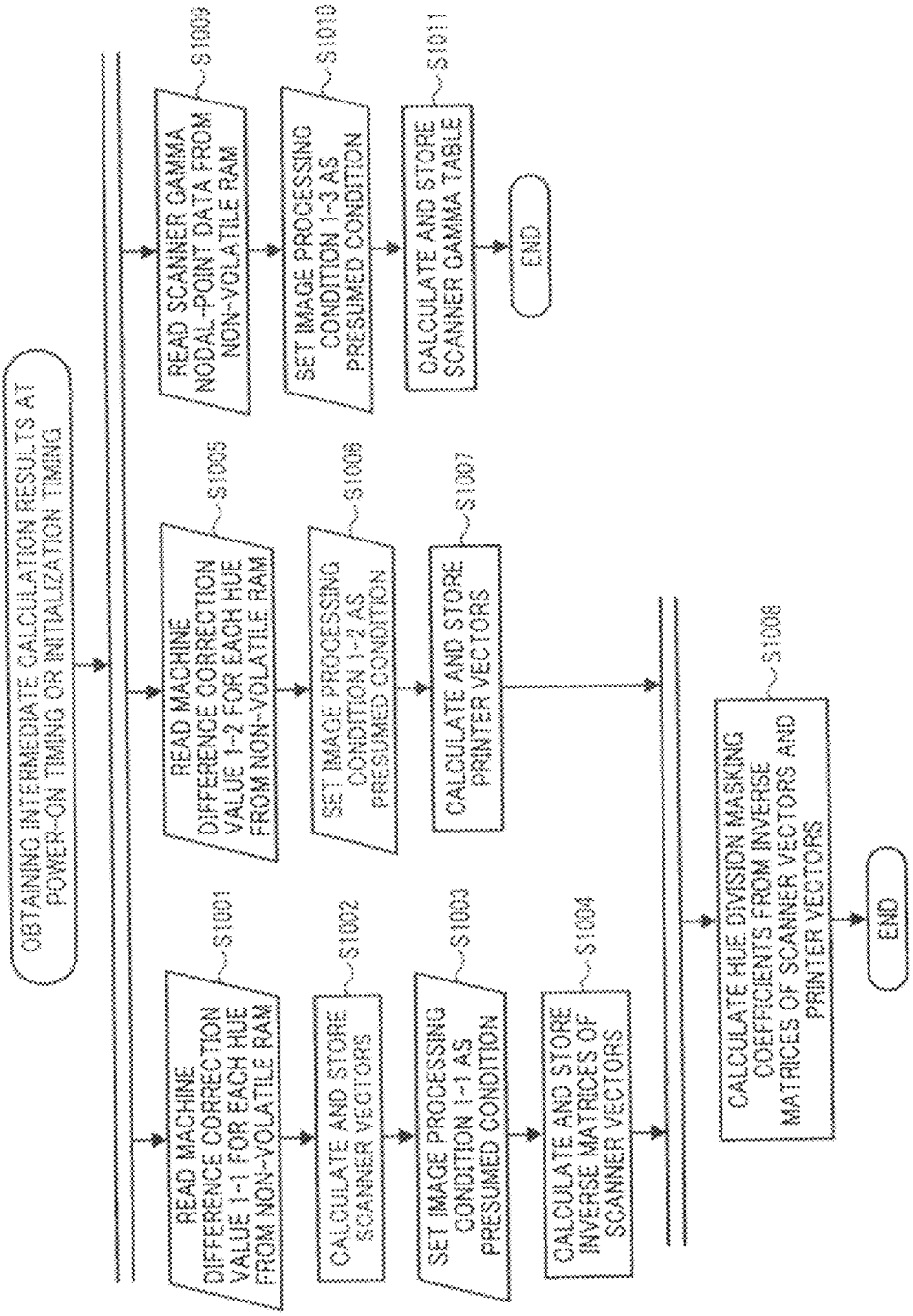
FIG. 50 is a flowchart for explaining a process of obtaining intermediate calculation results at initialization of image processing parameters or at turning ON the power of the image processing apparatus.

FIG. 50 is a flowchart for explaining a process of obtaining intermediate calculation results at initialization of image processing parameters or at turning ON the power of the image processing apparatus 1.

First, a machine difference correction value 1-1 for each hue (R, G, B, Y, M, C, W, and K) is read from a non-volatile RAM (Step S1001) and scanner vectors used in the calculation of linear masking coefficients are calculated and stored in a memory unit (Step S1002). When the machine difference correction value 1-1 is not set, the amount of correction is assumed to be zero.

Subsequently, an image processing condition 1-1 is set as a presumed condition for calculating the scanner vectors (Step S1003). That is, the image processing condition 1-1 can be a condition anticipated to be the most frequently implemented condition for calculating the scanner vectors (e.g., no inversion (positive image), no color conversion, default conversion width during color conversion, or printing paper as the type of original determined based on the color material).

Then, an inverse matrix of scanner vector is calculated for each of the hues of R, G, B, Y, M, and C (except W and K), and stored in a memory unit (Step S1004).

In a similar manner to Step S1001, a machine difference correction value 1-2 for the hues of R, G, B, Y, M, and C (except W and K) is read from a non-volatile RAM (Step S1005) and an image processing condition 1-2 is set as a presumed condition for calculating printer vectors (Step S1006). That is, the image processing condition 1-2 can be a condition anticipated to be the most frequently implemented condition for calculating the printer vectors. Moreover, there is a possibility that the image processing condition 1-2 can include information that is also included in the image processing condition 1-1. For example, a condition such as setting a default value of image density adjustment for the character mode, the photograph mode, or the printing paper mode can be considered as the image processing condition 1-2.

Subsequently, printer vectors are calculated and stored in a memory unit (Step S1007). When the machine difference correction value 1-2 is not set, the amount of correction is assumed to be zero.

Then, hue division masking coefficients for the hues of R, G, B, Y, M, and C (except W and K) are calculated by taking the product of the inverse matrices of scanner vectors and the matrices of printer vectors, and are stored in a memory unit (Step S1008).

Subsequently, scanner gamma nodal-point data is read from a non-volatile RAM (Step S1009). The scanner gamma nodal-point data includes, e.g., a plurality of nodal points that are subjected to interpolation (e.g., spline interpolation) during a process of generating a one-dimensional scanner gamma table that represents relation between input values 0 to 255 and output values 0 to 255.

Then, a machine difference correction value 1-3 is set as an initial value of information that is used to generate the scanner gamma table (Step S1010).

Subsequently, the scanner gamma table is obtained by performing spline interpolation on the scanner gamma nodal-point data and is stored in a volatile RAM (Step S1011).

Figure 51:
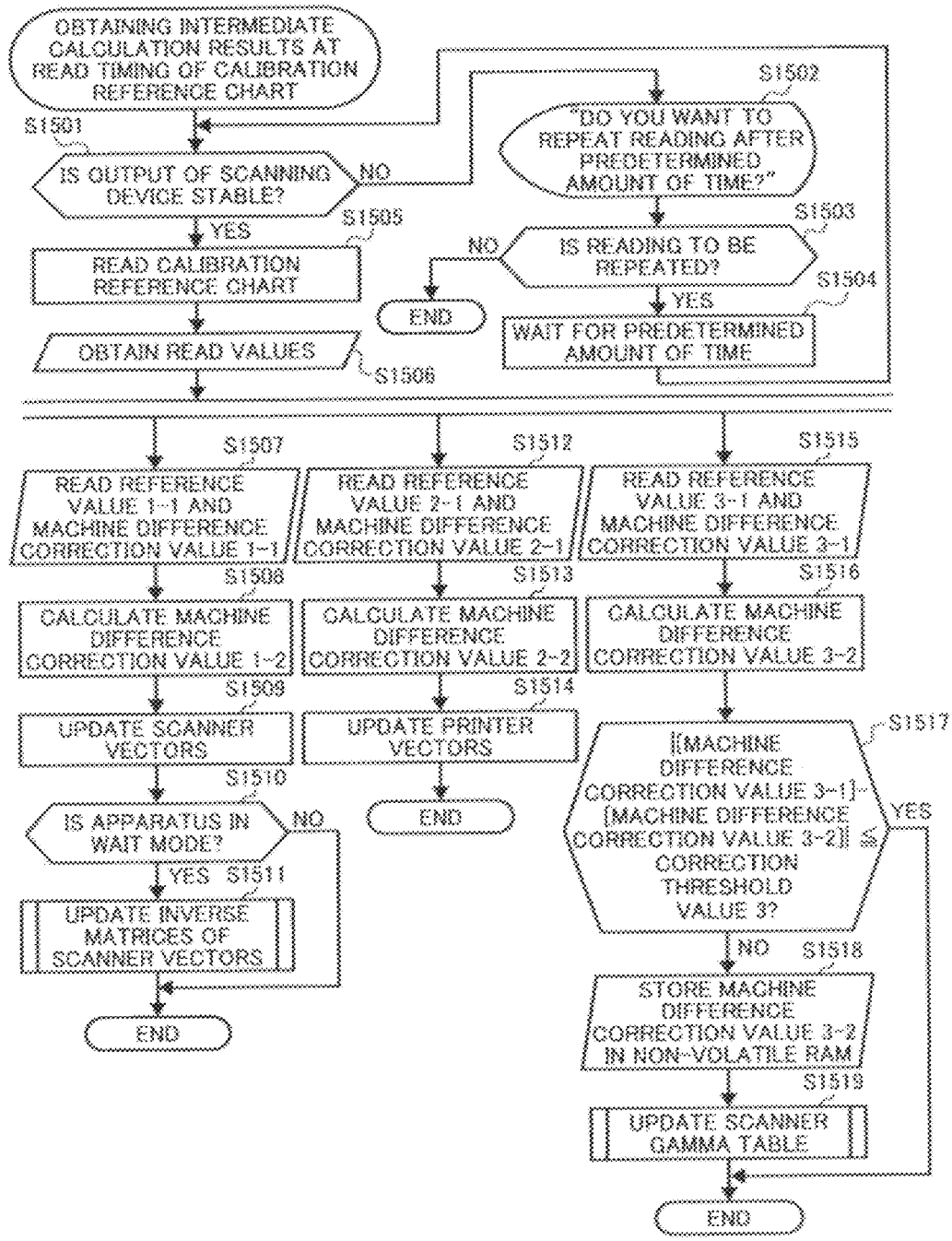
FIG. 51 is a flowchart for explaining a process of obtaining intermediate calculation results at reading of a calibration reference chart.

FIG. 51 is a flowchart for explaining a process of obtaining intermediate calculation results at read timing of a calibration reference chart.

First, it is determined whether the output of the scanning device 300 is stable based on, e.g., a certain elapsed time after the image processing apparatus 1 is turned ON (Step S1501). That is because, immediately after turning ON the image processing apparatus 1, the color temperature of image data read from, e.g., a white original is low. The color temperature keeps rising as the time passes and reaches stability after a certain elapsed time.

When it is determined that the output of the scanning device 300 is not stable (No at Step S1501), a message is displayed on the liquid crystal display 511 or on the screen of the host computer 740 indicating the user that the scanner output is not stable and asking the user whether to perform reading after a predetermined amount of time (Step S1502). When the user selects the option of reading the original after a predetermined amount of time (Yes at Step S1503), the system control waits for the predetermined amount of time and returns to Step S1501 (Step S1504). When the user selects the option of not reading the original (No at Step S1503), the processing is completed.

When it is determined that the output of the scanning device 300 is stable (Yes at Step S1501), the scanning device 300 reads the calibration reference chart (Step S1505) and obtains read values (Step S1506).

Then, a reference value 1-1 to be used for the correction of the scanner vectors is read from a non-volatile RAM or a ROM, and the machine difference correction value 1-1 used for the previous correction is read from the non-volatile RAM (Step S1507). If no correction is performed previously, then an initial value '0' is used as the machine difference correction value 1-1.

Subsequently, the machine difference correction value 1-2 for the hues of R, G, B, Y, M, and C (except W, and K) is calculated from the read values of the calibration reference chart and the reference value 1-1 (Step S1508), and the scanner vector for each hue (R, G, B, Y, M, C, W, and K) is updated based on the machine difference correction value 1-2 (Step S1509).

Figure 52:
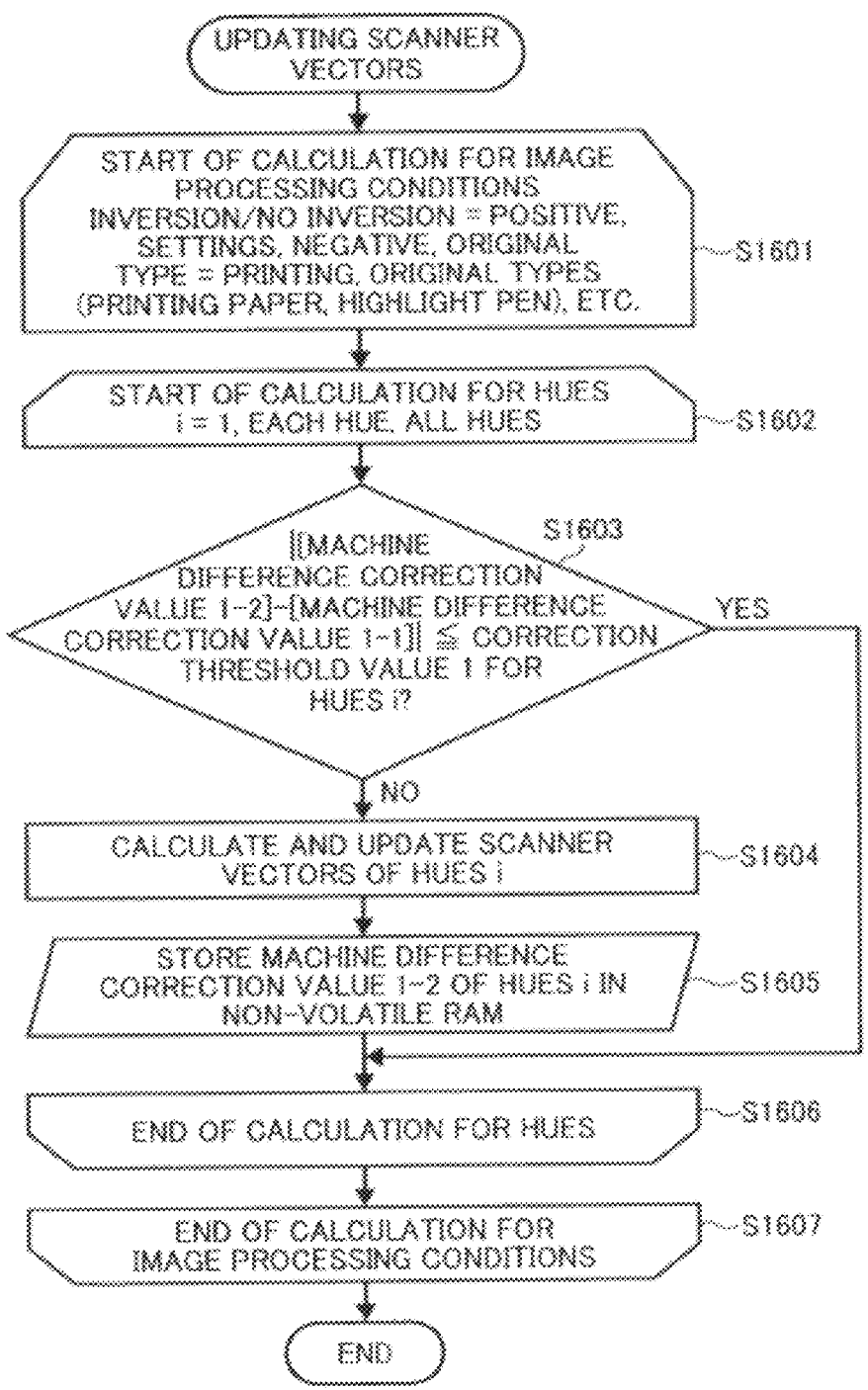
FIG. 52 is a flowchart for explaining a process of updating scanner vectors.

FIG. 52 is a flowchart for explaining a process of updating the scanner vectors. Step S1601 represents the start of two iteration processes (loops) for calculating the scanner vectors corresponding to two image processing conditions. The first iteration corresponds to an image processing condition of inversion (negative image) or no inversion (positive image), and the second iteration process corresponds to an image processing condition of the type of original (e.g., a printing paper type, a printed original type, a copied original type, a highlight pen type, etc.). Meanwhile, the user can determine whether to instruct the image processing apparatus 1 to perform correction for the frequently-used types of original by selecting options 'calculate' or 'not to calculate' from the operating panel 500. When the option 'not to calculate' is selected, fixed values stored in a ROM are used.

Step S1602 represents the start of an iteration process (loop) for calculating the scanner vectors for the hues of R, G, B, Y, M, and C (except W, and K). For each of the hues of R, G, B, Y, M, and C, it is determined whether an absolute difference between the machine difference correction value 1-1 and the machine difference correction value 1-2 is smaller than or equal to a correction threshold value 1 (Step S1603). If the absolute difference is smaller than or equal to the correction threshold value 1 (Yes at Step S1603), the scanner vectors are not updated. On the other hand, if the absolute difference is greater than the correction threshold value 1 (No at Step S1603), the scanner vector for each of the hues of R, G, B, Y, M, and C is updated based on the machine difference correction value 1-2 (Step S1604). Subsequently, the updated machine difference correction value 1-2 is stored in the non-volatile RAM as the new machine difference correction value 1-1 (Step S1605). Step S1606 represents the end of the iteration process (loop) of calculating the scanner vectors for the hues of R, G, B, Y, M, and C, while Step S1607 represents the end of the iteration processes (loops) for calculating the scanner vectors corresponding to the image processing conditions.

Reverting to FIG. 51, it is determined whether the image processing apparatus 1 is in a wait mode (Step S1510). If the image processing apparatus 1 is determined to be in the wait mode (Yes at Step S1510), the inverse matrices of scanner vectors are updated (Step S1511).

Figure 53:
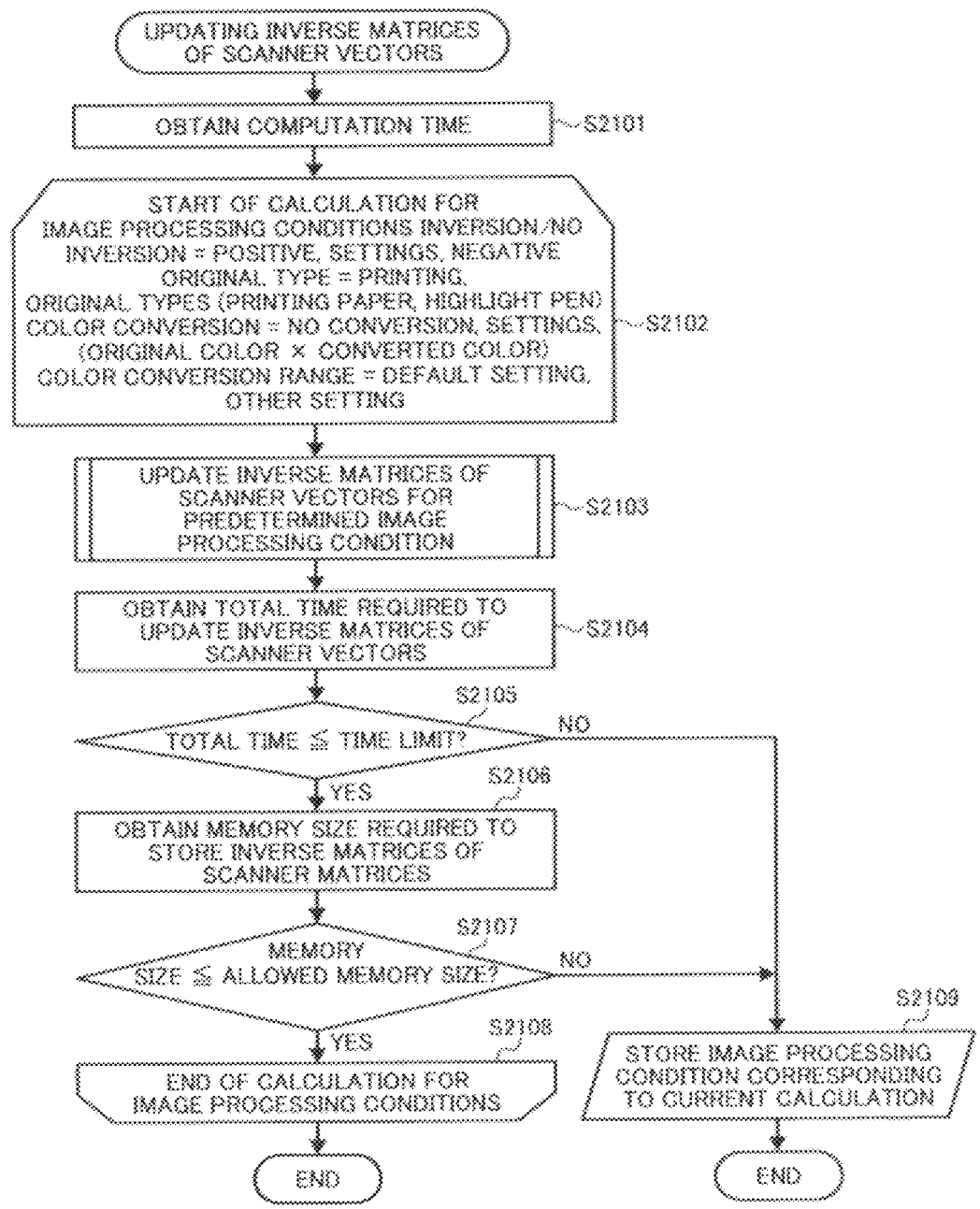
FIG. 53 is a flowchart for explaining a process of updating inverse matrices of scanner vectors corresponding to predetermined conditions.

FIG. 53 is a flowchart for explaining a process of updating the inverse matrices of scanner vectors. First, a computation time is obtained (Step S2101). Step S2102 represents the start of four iteration processes (loops) for calculating the inverse matrices of scanner vectors corresponding to four image processing conditions. The first iteration process corresponds to an image processing condition of inversion (negative image) or no inversion (positive image). The second iteration process corresponds to an image processing condition of the type of original (e.g., a printing paper type, a printed original type, a copied original type, a highlight pen type, etc.). Meanwhile, the user can determine whether to instruct the image processing apparatus 1 to perform correction for the frequently-used type of original by selecting options 'calculate' or 'not to calculate' from the operating panel 500. When the option 'not to calculate' is selected, fixed values stored in a ROM are used. The third iteration process corresponds to an image processing condition of color conversion. More particularly, the third iteration process is performed depending on a color conversion condition that includes a combination of colors, namely, the color of the original (e.g., red) and the converted color of a copy (e.g., blue). The fourth iteration process corresponds to an image processing condition of color range of the original. For example, the fourth iteration is performed depending on a setting such as 'narrow' or 'wide' for the hue range of red color in the original.

Figure 54:
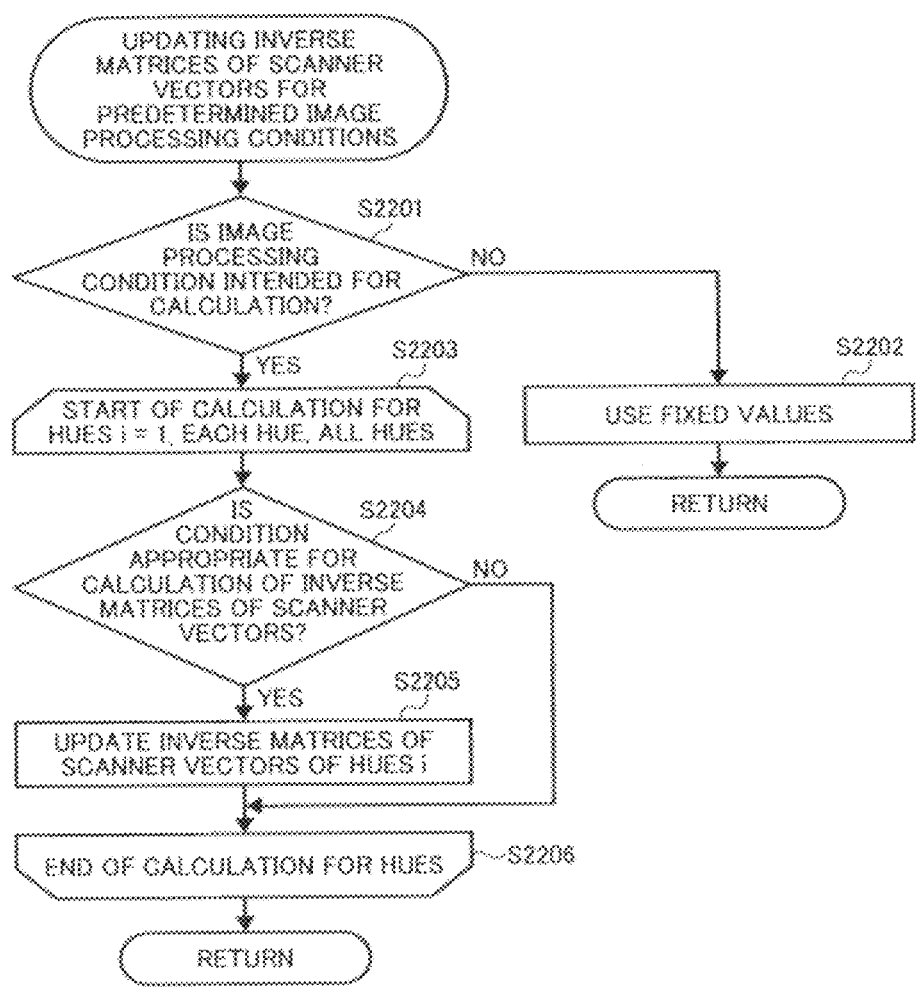
FIG. 54 is a flowchart for explaining a process of calling an update routine for updating inverse matrices of scanner vectors corresponding to a predetermined image processing condition.

Subsequently, an update routine for updating the inverse matrices of scanner vectors corresponding to a predetermined image processing condition is called (Step S2103). FIG. 54 is a flowchart for explaining a process of calling the update routine. As shown in FIG. 54, first, it is determined whether the image processing condition is an intended condition for calculation (Step S2201).

When it is determined that the image processing condition is not the intended condition for calculation (No at Step S2201), fixed values stored in a ROM are used (Step S2202).

When it is determined that the image processing condition is the intended condition for calculation (Yes at Step S2201), the system control proceeds to Step S2203 that represents the start of an iteration process (loop) for calculating the inverse matrices of scanner vectors for the hues of R, G, B, Y, M, and C (except W, and K).

Subsequently, it is determined whether the condition is appropriate to calculate the inverse matrix of scanner vector for predetermined hues (Step S2204). For example, an appropriate condition for calculation is when the scanner vectors of neighboring hues and either one of black and white vary (see Equation (57)).

When it is determined that the condition is appropriate to calculate the inverse matrices of scanner vectors for predetermined hues (Yes at Step S2204), an inverse matrix of scanner vector for each of the hues of R, G, B, Y, M, and C is calculated (Step S2205). Step S2206 represents the end of the iteration process (loop) of calculating the inverse matrices of scanner vectors for the hues of R, G, B, Y, M, and C (except W and K).

Reverting to FIG. 53, the total time required to update the inverse matrices of scanner vectors is obtained (Step S2104) and it is determined whether the total time is within a predetermined time limit (Step S2105). If the total time exceeds the time limit (No at Step S2105), the image processing conditions corresponding to the current calculation is stored in a memory unit (Step S2109) and the processing is completed.

On the other hand, if the total time is within the time limit (Yes at Step S2105), the total memory size required to store the inverse matrices of scanner vectors is obtained (Step S2106) and it is determined whether the total memory size is within an allowed memory space (Step S2107). In other words, it is determined whether there is sufficient memory space to store the inverse matrices of scanner vectors calculated corresponding to a subsequent image processing condition.

When the total memory size is determined to be within the allowed memory space (Yes at Step S2107), the system control proceeds to Step S2108 that represents the end of the iteration processes (loops) for calculating the inverse matrices of scanner vectors corresponding to image processing conditions.

On the other hand, when the total memory size is determined to exceed the allowed memory space (No at Step S2107), the image processing condition corresponding to the current calculation is stored in a memory unit (Step S2109), and the processing is completed.

Reverting to FIG. 51, a reference value 2-1 to be used for the correction of the printer vectors is read from a non-volatile RAM or a ROM, and a machine difference correction value 2-1 used for the previous correction is read from a non-volatile RAM (Step S1512). If no correction is performed previously, then an initial value '0' is used as the machine difference correction value 2-1.

Subsequently, a machine difference correction value 2-2 for each hue of R, G, B, Y, M, C, W, and K is calculated from the read values of the calibration reference chart and the reference value 2-1 (Step S1513), and the printer vector for each hue (R, G, B, Y, M, C, W, and K) is updated based on the machine difference correction value 2-2 (Step S1514).

Figure 55:
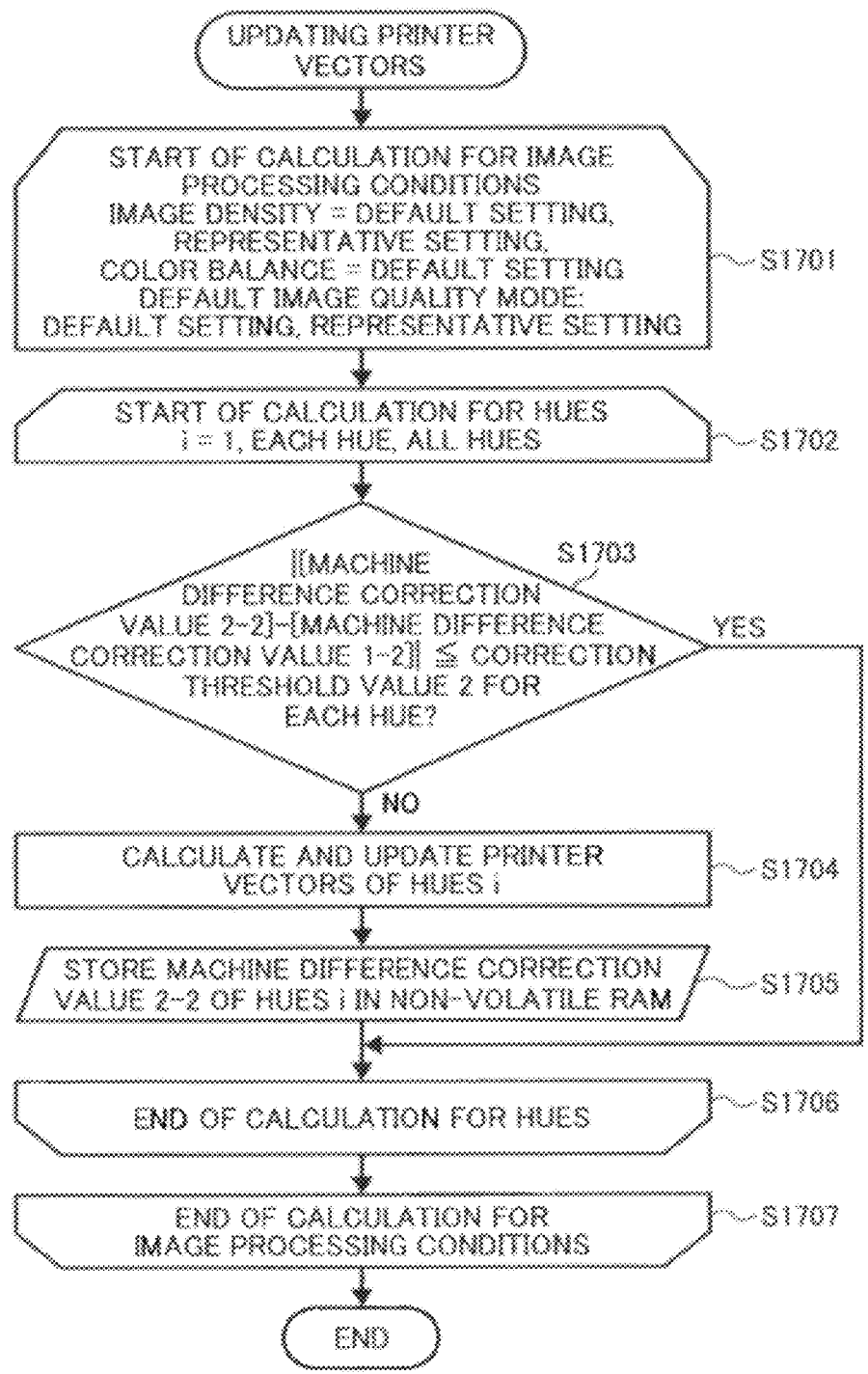
FIG. 55 is a flowchart for explaining a process of updating printer vectors.

FIG. 55 is a flowchart for explaining a process of updating the printer vectors. Step S1701 represents the start of an iteration process (loop) for calculating the printer vectors corresponding to each image processing condition. Herein, the image processing conditions are, e.g., image density adjustment and color balance adjustment. Meanwhile, because the computation time for the printer vectors is relatively shorter and the number of conditions is relatively larger, the printer vectors are calculated corresponding to a few representative conditions or corresponding to only the default conditions.

Step S1702 represents the start of an iteration process (loop) for calculating the printer vector for the hues of R, G, B, Y, M, and C (except W and K). For each of the hues of R, G, B, Y, M, and C, it is determined whether an absolute difference between the machine difference correction value 2-1 and the machine difference correction value 2-2 is smaller than or equal to a correction threshold value 2 (Step S1703). If the absolute difference is smaller than or equal to the correction threshold value 2 (Yes at Step S1703), the printer vectors are not updated. On the other hand, if the absolute difference is greater than the correction threshold value 2 (No at Step S1703), the printer vector for each of the hues of R, G, B, Y, M, and C is updated based on the machine difference correction value 2-2 (Step S1704). Subsequently, the updated machine difference correction value 2-2 is stored in the non-volatile RAM as the new machine difference correction value 2-1 (Step S1705). Step S1706 represents the end of the iteration process (loop) of calculating the printer vectors for the hues of R, G, B, Y, M, and C, while Step S1707 represents the end of the iteration processes (loops) for calculating the printer vectors corresponding to the image processing conditions.

Reverting to FIG. 51, a reference value 3-1 to be used for the correction of the scanner gamma table and a machine difference correction value 3-1 used for the previous correction are read from a non-volatile RAM or a ROM (Step S1515), and a machine difference correction value 3-2 used in the correction of the scanner gamma table is calculated (Step S1516).

It is determined whether an absolute difference between the machine difference correction value 3-1 and the machine difference correction value 3-2 is smaller than or equal to a correction threshold value 3 (Step S1517). If the absolute difference is smaller than or equal to the correction threshold value 3 (No at Step S1517), the updated machine difference correction value 3-2 is stored in the non-volatile RAM as the new machine difference correction value 3-1 (Step S1518) and the scanner gamma table is updated (Step S1519).

Figure 56:
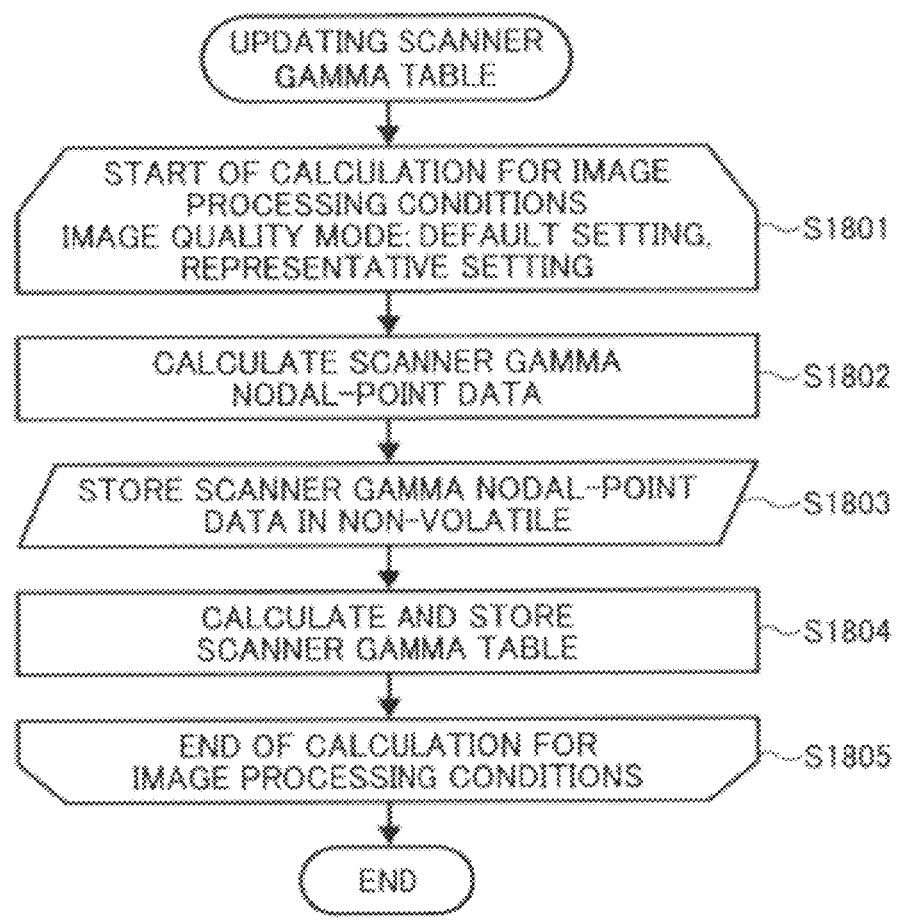
FIG. 56 is a flowchart for explaining a process of updating a scanner gamma table.

FIG. 56 is a flowchart for explaining a process of updating the scanner gamma table. Step S1801 represents the start of an iteration process (loop) for calculating the scanner gamma table corresponding to each image processing condition. Herein, an image processing condition is, e.g., an image quality mode such as a default mode (printing paper mode) or a representative mode.

Subsequently, scanner gamma nodal-point data is calculated (Step S1802). More particularly, nodal points in the scanner gamma nodal-point data are generated for spline interpolation as in the case of ACC for a printer gamma table.

The scanner gamma nodal-point data is stored in a non-volatile RAM (Step S1803).

Subsequently, the scanner gamma table is obtained by performing spline interpolation on the scanner gamma nodal-point data and is stored in a volatile RAM (Step S1804).

Step S1805 represents the end of the iteration process (loop) for calculating the scanner gamma table corresponding to the image processing conditions.

In this way, the intermediate calculation results (scanner vectors, printer vectors, inverse matrices of scanner vectors, linear masking coefficients, etc.) are calculated and stored in a memory unit. Moreover, it is also possible to update the intermediate calculation results.

Figure 57:
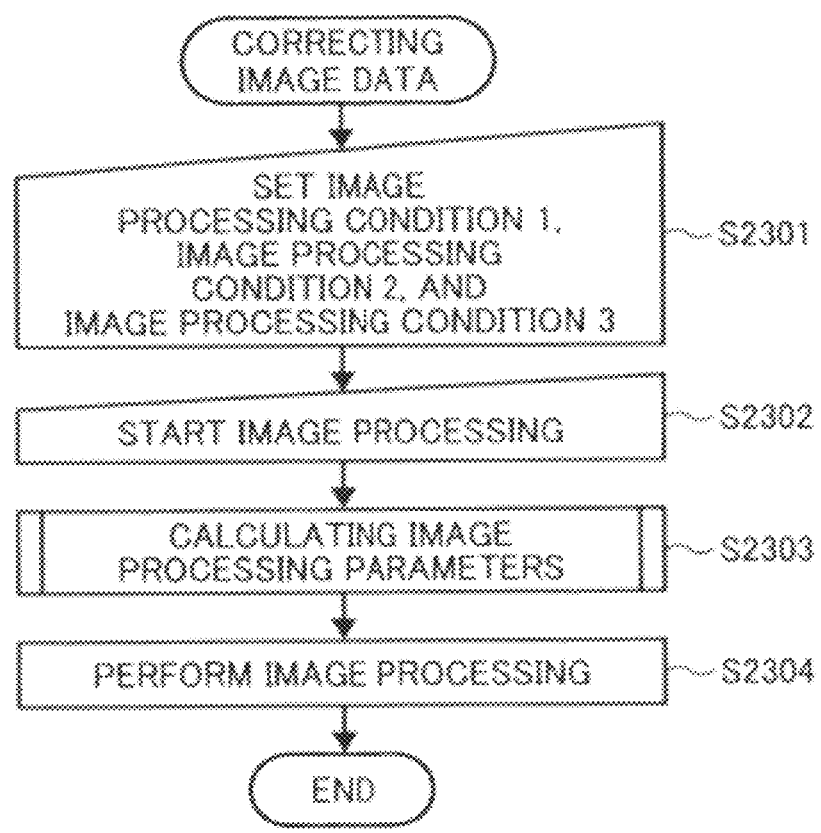
FIG. 57 is a flowchart for explaining a process of image data correction.

FIG. 57 is a flowchart for explaining a process of image data correction. First, the user sets image processing conditions directly from the operating panel 500 or from the host computer 740 via the network (Step S2301). For example, an image processing condition 1 is set as a condition for determining whether to update the inverse matrices of scanner vectors, an image processing condition 2 is set as a condition for determining whether to update the printer vectors, and an image processing condition 3 is set as a condition for determining whether to update the scanner gamma table.

Subsequently, the user instructs the image processing apparatus 1 to start image reading or image processing directly from the operating panel 500 or from the host computer 740 via the network (Step S2302). The image processing apparatus 1 then calculates the image processing parameters (Step S2303) and performs image processing (Step S2304).

FIG. 58 is a flowchart for explaining a process of calculating the image processing parameters corresponding to the image processing condition 1, the image processing condition 2, and the image processing condition 3. First, the image processing condition 1, the image processing condition 2, and the image processing condition 3 set at Step S2301 in FIG. 57 are retrieved (Step S2401).

Upon retrieving the image processing condition 1, it is stored in a memory unit (Step S2402). Then, depending on whether Step S1604 in FIG. 52 is executed, it is determined whether the scanner vectors are updated (Step S2403). For example, if Step S1604 in FIG. 52 is not yet executed, then it can be determined that the scanner vectors are not updated. Another way of determining whether the scanner vectors are updated is to newly calculate scanner vectors based on the image processing condition 1 and compare them with the stored scanner vectors. In that case, if the new scanner vectors and the stored scanner vectors match, then it can be determined that the scanner vectors are not updated. Still another way of determining whether the scanner vectors are updated is to check the image processing condition stored at Step S2109 in FIG. 53. In that case, if the image processing condition 1 is different from the stored image processing condition, then it can be determined that the scanner vectors are updated.

When it is determined that the scanner vectors are not updated (No at Step S2403), it is determined whether the image processing condition 1 is different from the image processing condition 1-1 used to calculate the inverse matrices of scanner vectors (Step S2404).

When it is determined that the image processing condition 1 is different from the image processing condition 1-1 (Yes at Step S2404), and when it is determined that the scanner vectors are updated (Yes at Step S2403), then the inverse matrices of scanner vectors corresponding to the image processing condition 1 are updated and stored in a memory unit (Step S2405).

Upon retrieving the image processing condition 2, it is stored in a memory unit (Step S2406). Then, depending on whether Step S1703 in FIG. 55 is executed, it is determined whether the printer vectors are updated (Step S2407). For example, if Step S1703 in FIG. 55 is not yet executed, then it can be determined that the printer vectors are not updated.

When it is determined that the printer vectors are not updated (No at Step S2407), it is determined whether the image processing condition 2 is different from the image processing condition 1-2 (Step S2408).

When it is determined that the image processing condition 2 is different from the image processing condition 1-2 (Yes at Step S2408), and when it is determined that the printer vectors are updated (Yes at Step S2407), then the printer vectors corresponding to the image processing condition 2 are updated and stored in a memory unit (Step S2409).

Subsequently, the linear masking coefficients are calculated by using the inverse matrices of scanner vectors stored at Step S2405 and the printer vectors stored at Step S2409 (Step S2410).

Upon retrieving the image processing condition 3, it is stored in a memory unit (Step S2411). Then, it is determined whether the image processing condition 3 is different from the image processing condition 1-3 or from the image processing condition corresponding to the updated scanner gamma table at Step S1519 in FIG. 51 (Step S2412).

When it is determined that the image processing condition 3 is different (Yes at Step S2412), then the scanner gamma table is updated and stored in a memory unit (Step S2413).

Thus, to sum up, during the process of generating image processing parameters most suitable to correct the machine difference in the scanning device 300, intermediate calculation results are calculated at predetermined operations and stored in a memory unit along with certain information that is useful in determining whether the intermediate calculation results need to be recalculated. Based on that information, it is determined whether to recalculate the intermediate calculation results while generating the image processing parameters. That facilitates in minimizing the number of calculations and the amount of time required for the calculations thereby allowing the user to set more image processing parameters to correct the machine difference in the scanning device. As a result, accurate color reproduction can be achieved in image data read by the scanning device 300 or in a printed image of the image data.

Meanwhile, if the image processing apparatus includes a plurality of scanning devices 300, then the intermediate calculation results can be obtained with respect to each scanning device 300 at the abovementioned predetermined operations. Thus, the overall calculation time decreases even when the scanning device 300 is arranged in plurality.

In this way, according to one aspect of the present invention, it is possible to minimize the amount of time required for calculating image processing parameters thereby allowing a user to set more image processing parameters to correct the machine difference in a scanning device. As a result, accurate color reproduction can be achieved in image data read by the scanning device or in a printed image of the image data.

Moreover, the image processing parameters can be calculated at a plurality of operation timings by dividing the total calculation time into calculation time at each operation timing.

Furthermore, it becomes possible to correct gray balance fluctuation of a scanning device, machine difference in gradation properties, and machine difference in achromatic colors. In addition, the machine difference in color saturation, brightness, and hues of the read chromatic colors is also corrected. Thus, the image signals obtained upon reading are output after correction.

Moreover, while calculating linear masking coefficients of each of the 12 hue areas, difference information is used to determine whether to recalculate intermediate calculation results at each level for each hue. That reduces the calculation time of the linear masking coefficients.

Furthermore, because color temperature and output of the scanning device becomes stable when a predetermined time has elapsed since turning the power ON, a reference chart is read after the elapsed time to obtain appropriate correction values.

Moreover, when an image processing apparatus includes a volatile memory such as RAM with sufficient memory space, various intermediate calculation results can be maintained in the volatile memory. In that case, image processing parameters corresponding to conditions set in an operating panel can be calculated in a shorter time as compared to a case when memory space is not sufficient. On the other hand, when a small-capacity memory is installed to reduce manufacturing cost of the image processing apparatus, the memory space can be efficiently used by either reducing the intermediate calculation results to be maintained, or reducing the number of the intermediate calculation results, or selecting values from a predetermined table.

Furthermore, even when the image processing apparatus includes a plurality of image reading units, it is possible to reduce the overall calculation time by maintaining intermediate calculation results with respect to each image reading unit in a memory.

That also reduces unnecessary calculations during the processing.

Furthermore, previously used correction values are compared with newly calculated correction values and if the difference is smaller than a predetermined threshold, then the intermediate calculation results are not recalculated. That is because, even if the intermediate calculation results are recalculated when the difference is not large, there is no substantial variation in the image processing parameters and the image processing result. Thus, in such a case, the time required for recalculating the image processing parameters can be reduced while maintaining the image quality.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
a color correction unit that performs a conversion of a gradation-converted image signal obtained by using a gradation conversion table of an image-signal conversion unit that performs a gradation conversion of an input image signal from an image reading unit that optically reads an image of an original document, and corrects a color of the gradation-converted image signal based on image processing parameters according to a plurality of hue areas formed by boundary surfaces formed in parallel to a brightness axis in a color space;
a reference data storing unit that stores therein reference data corresponding to patches in a reference chart including a plurality of achromatic patches with different gradation levels and a plurality of chromatic patches with different hues;

a correction parameter generating unit that generates the image processing parameters, based on the reference data and values of the reference chart obtained by the image reading unit reading the reference chart, and intermediate calculation results;

an intermediate result storing unit that stores the intermediate calculation results calculated at each predetermined operation in a stepwise manner in a memory; and a determination information storing unit that stores therein recalculation determination information for determining whether to recalculate the intermediate calculation results, wherein the intermediate result storing unit recalculates the intermediate calculation results based on the recalculation determination information.

2. The image processing apparatus according to claim 1, wherein
the intermediate result storing unit calculates the intermediate calculation results at least one of a power-ON timing, an initialization timing, a reference-chart read timing, an original read timing, and an image data processing timing.

3. The image processing apparatus according to claim 1, wherein
the correction parameter generating unit sets the image processing parameters in either one of the gradation conversion table and the color correction unit.

4. The image processing apparatus according to claim 3, wherein
the color correction unit uses linear masking coefficients corresponding to a plurality of hues, stores intermediate calculation results obtained at each step of calculating the linear masking coefficients, and
the intermediate result storing unit determines whether to recalculate the intermediate calculation results for each of the plurality of hues.

5. The image processing apparatus according to claim 4, wherein
the intermediate result storing unit has the intermediate calculation result results used in calculating the linear masking coefficients for each type of original document, and it is selectable whether to calculate the intermediate calculation result for each type of original.

6. The image processing apparatus according to claim 1, wherein
the intermediate result storing unit restricts, upon calculating the intermediate calculation results at a time of reading the reference chart, reading of the reference chart until a predetermined time elapses after a power-on operation.

7. The image processing apparatus according to claim 1, wherein
the intermediate result storing unit adjusts the intermediate calculation results to be stored depending on an available space of the volatile memory.

8. The image processing apparatus according to claim 1, further comprising:
a plurality of image reading units including said image reading unit,
wherein the intermediate result storing unit stores the intermediate calculation results for each of the image reading units.

9. The image processing apparatus according to claim 1, wherein
the intermediate result storing unit compares a stored intermediate calculation result with a newly calculated intermediate calculation result, and determines whether to recalculate the image processing parameters based on a result of comparison.

10. The image processing apparatus according to claim 1, further comprising:
a memory unit that stores therein a first correction amount used to obtain the image processing parameters;
a difference calculating unit that calculates a difference between the first correction amount and a second correction amount obtained by newly reading the reference chart; and
a threshold storing unit that stores therein a threshold for the difference, wherein
the intermediate result storing unit determines whether to recalculate the intermediate calculation results during generation of the image processing parameters based on a result of comparison between the threshold and the difference.

* * * * *